US011283567B2

(12) United States Patent
Lee et al.

(10) Patent No.: US 11,283,567 B2
(45) Date of Patent: Mar. 22, 2022

(54) PHASE TRACKING REFERENCE SIGNAL TRANSMISSION

(71) Applicant: IDAC HOLDINGS, INC., Wilmington, DE (US)

(72) Inventors: Moon-il Lee, Melville, NY (US); Alphan Sahin, Westbury, NY (US); Erdem Bala, East Meadow, NY (US); Afshin Haghighat, Ile-Bizard (CA); Frank La Sita, Setauket, NY (US); Janet A. Stern-Berkowitz, Little Neck, NY (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/764,258

(22) PCT Filed: Nov. 14, 2018

(86) PCT No.: PCT/US2018/061077
§ 371 (c)(1),
(2) Date: May 14, 2020

(87) PCT Pub. No.: WO2019/099535
PCT Pub. Date: May 23, 2019

(65) Prior Publication Data
US 2021/0058207 A1     Feb. 25, 2021

Related U.S. Application Data

(60) Provisional application No. 62/720,614, filed on Aug. 21, 2018, provisional application No. 62/586,642, filed on Nov. 15, 2017.

(51) Int. Cl.
*H04L 5/00*     (2006.01)

(52) U.S. Cl.
CPC .......... *H04L 5/0048* (2013.01); *H04L 5/0007* (2013.01)

(58) Field of Classification Search
CPC . H04L 5/0048; H04L 5/0007; H04L 27/2613; H04L 5/0053; H04L 5/0051; H04L 5/0044; H04W 56/0035
See application file for complete search history.

(56) References Cited

U.S. PATENT DOCUMENTS 8,261,169 B2    9/2012  Kishigami et al.
10,412,710 B2 *  9/2019  Amuru ................. H04W 72/14
(Continued)

OTHER PUBLICATIONS

Huawei et al., "Further details of PTRS," 3GPP TSG RAN WG1 Meeting #90bis, R1-1717306, Prague, Czech Republic (Oct. 9-13, 2017).

(Continued)

*Primary Examiner* — Kenneth T Lam
(74) *Attorney, Agent, or Firm* — Volpe Koenig

(57) ABSTRACT

A system, method, and device for ensuring a number of Phase Tracking Reference Signal(s) (PT-RSs) are the same for multiple slots. A wireless transmit/receive unit (WTRU) may receive control information including a number of scheduled resource blocks (RBs) then determine a PT-RS density based on the number of scheduled RBs. The WTRU may determine a RB offset value for the WTRU based on a WTRU-ID modulo the maximum RB offset value, where the maximum value for the RB offset value may be based on at least one of the number of the scheduled RBs and the PT-RS density. The WTRU may then transmit or receive a signal with PT-RS based on the RB offset value.

18 Claims, 39 Drawing Sheets

(56) References Cited

U.S. PATENT DOCUMENTS

| | | | |
|---|---|---|---|
| 10,587,446 B2 | 3/2020 | Lee et al. | |
| 2016/0174057 A1* | 6/2016 | Oh | H04W 8/005 |
| | | | 455/434 |
| 2017/0019914 A1 | 1/2017 | Rune et al. | |
| 2017/0034812 A1 | 2/2017 | Deng et al. | |
| 2017/0094543 A1* | 3/2017 | Narasimha | H04W 16/14 |
| 2018/0152274 A1* | 5/2018 | Li | H04L 1/1854 |
| 2018/0205522 A1* | 7/2018 | Wang | H04L 5/0053 |
| 2018/0270713 A1* | 9/2018 | Park | H04W 74/0833 |
| 2018/0359069 A1* | 12/2018 | Nam | H04L 5/0048 |
| 2019/0215118 A1* | 7/2019 | Moles | H04L 41/0803 |
| 2019/0349240 A1* | 11/2019 | Saito | H04L 27/26 |
| 2020/0008102 A1* | 1/2020 | Yokomakura | H04L 1/0003 |
| 2020/0092032 A1* | 3/2020 | Zhang | H04L 5/0051 |
| 2020/0099500 A1* | 3/2020 | Huang | H04L 5/10 |
| 2020/0186311 A1* | 6/2020 | Xu | H04W 72/044 |
| 2020/0196332 A1* | 6/2020 | Yokomakura | H04W 72/1268 |
| 2020/0260418 A1* | 8/2020 | Xue | H04W 72/0446 |
| 2020/0396047 A1* | 12/2020 | Gao | H04L 5/0094 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital et al., "WF on PT-RS RB offset," 3GPP TSG RAN WG1 Meeting RAN1#91, R1-1721530, Reno, USA (Nov. 27-Dec. 1, 2017).

Interdigital, Inc., "Remaining issues on PT-RS," 3GPP TSG RAN WG1 Meeting #91, R1-1720634, Reno, USA (Nov. 27-Dec. 1, 2017).

LG Electronics, "On PT-RS design," 3GPP TSG RAN WG1 Meeting 90bis, R1-1717947, Prague, Czech Republic (Oct. 9-13, 2017).

Mitsubishi Electric, "WF on pre-DFT PT-RS pattern for DFTsOFDM," RAN1#91, R1-1721487, Reno, NV (Nov. 2017).

Nokia Networks et al., "WF on the UE-SS Starting Subframe for eMTC," 3GPP TSG RAN WG1 Meeting #84, R1-161378, St Julian's, Malta (Feb. 15-19, 2016).

Research in Motion et al., "On Remaining Details of Association between DMRS Port and E-PDCCH Transmission," 3GPP TSG RAN WG1 Meeting #71, R1-125064, New Orleans, USA (Nov. 12-16, 2012).

Spreadtrum Communications, "Remaining issues on PT-RS for CP-OFDM," 3GPP TSG RAN WG1 Meeting 90bis, R1-1717746, Prague, Czech Republic (Oct. 9-13, 2017).

Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).

Third Generation Partnership Project, "Technical Specification Group Radio Access Network; Evolved Universal Terrestrial Radio Access (E-UTRA); Physical channels and modulation (Release 14)," 3GPP TS 36.211 V14.4.0 (Sep. 2017).

Third Generation Partnership Project, "Technical Specification Group Radio Access Network; Evolved Universal Terrestrial Radio Access (E-UTRA); Physical channels and modulation (Release 14)," 3GPP TS 36.211 V14.8.0 (Sep. 2018).

Third Generation Partnership Project, "Technical Specification Group Radio Access Network; Evolved Universal Terrestrial Radio Access (E-UTRA); Physical channels and modulation (Release 15)," 3GPP TS 36.211 V15.3.0 (Sep. 2018).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.6.0 (Sep. 2015).

Third Generation Partnership Project, "Technical Specification Group Radio Access Network; Evolved Universal Terrestrial Radio Access (E-UTRA); Multiplexing and channel coding (Release 14)," 3GPP TS 36.212 V14.4.0 (Sep. 2017).

Third Generation Partnership Project, "Technical Specification Group Radio Access Network; Evolved Universal Terrestrial Radio Access (E-UTRA); Multiplexing and channel coding (Release 14)," 3GPP TS 36.212 V14.7.0 (Sep. 2018).

Third Generation Partnership Project, "Technical Specification Group Radio Access Network; Evolved Universal Terrestrial Radio Access (E-UTRA); Multiplexing and channel coding (Release 15)," 3GPP TS 36.212 V15.3.0 (Sep. 2018).

Third Generation Partnership Project, "Technical Specification Group Radio Access Network; NR; Physical layer procedures for data (Release 15)," 3GPP TS 38.214 V1.0.0 (Sep. 2017).

Third Generation Partnership Project, "Technical Specification Group Radio Access Network; NR; Physical layer procedures for data (Release 15)," 3GPP TS 38.214 V15.3.0 (Sep. 2018).

Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).

Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).

Third Generation Partnership Project, "Technical Specification Group Radio Access Network; Evolved Universal Terrestrial Radio Access (E-UTRA); Physical layer procedures (Release 14)," 3GPP TS 36.213 V14.8.0 (Sep. 2018).

Third Generation Partnership Project, "Technical Specification Group Radio Access Network; Evolved Universal Terrestrial Radio Access (E-UTRA); Physical layer procedures (Release 15)," 3GPP TS 36.213 V15.3.0 (Sep. 2018).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.7.0 (Sep. 2015).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.4.0 (Sep. 2017).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.8.0 (Sep. 2018).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.3.0 (Sep. 2018).

(56) References Cited

OTHER PUBLICATIONS

Third Generation Partnership Project, "Technical Specification Group Radio Access Network; NR; Physical channels and modulation (Release 15)," 3GPP TS 38.211 V1.0.0 (Sep. 2017).
Third Generation Partnership Project, "Technical Specification Group Radio Access Network; NR; Physical channels and modulation (Release 15)," 3GPP TS 38.211 V15.3.0 (Sep. 2018).
Third Generation Partnership Project, "Technical Specification Group Radio Access Network; NR; Multiplexing and channel coding (Release 15)," 3GPP TS 38.212 V1.0.0 (Sep. 2017).
Third Generation Partnership Project, "Technical Specification Group Radio Access Network; NR; Multiplexing and channel coding (Release 15)," 3GPP TS 38.212 V15.3.0 (Sep. 2018).
Ericsson, "Remaining details on PTRS design," 3GPP TSG RAN WG1 Meeting 90bis, R1-1718449, Prague, CZ (Oct. 9-13, 2017).

\* cited by examiner

US 11,283,567 B2

PHASE TRACKING REFERENCE SIGNAL TRANSMISSION

CROSS-REFERENCE TO RELATED APPLICATIONS

This application claims the benefit of Provisional U.S. Application No. 62/586,642 filed on Nov. 15, 2017, and U.S. Application No. 62/720,614 filed on Aug. 21, 2018, the contents of which is hereby incorporated by reference herein.

BACKGROUND

In advanced wireless systems there may be high data requirements for spectrum above 6 GHz frequency in order to leverage the large bandwidth available. One challenge of using these frequencies may be the significant propagation loss especially in an outdoor environment due to higher free space path loss in higher frequencies. Systems, methods, and devices may be used to address these issues.

SUMMARY

A system, method, and device for ensuring a number of Phase Tracking Reference Signal(s) (PT-RSs) are the same for multiple slots. A wireless transmit/receive unit (WTRU) may receive control information including a number of scheduled resource blocks (RBs) then determine a PT-RS density based on the number of scheduled RBs. The WTRU may determine a RB offset value for the WTRU based on a WTRU-ID modulo the maximum RB offset value, where the maximum value for the RB offset value may be based on at least one of the number of the scheduled RBs and the PT-RS density. The WTRU may then transmit or receive a signal with PT-RS based on the RB offset value.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
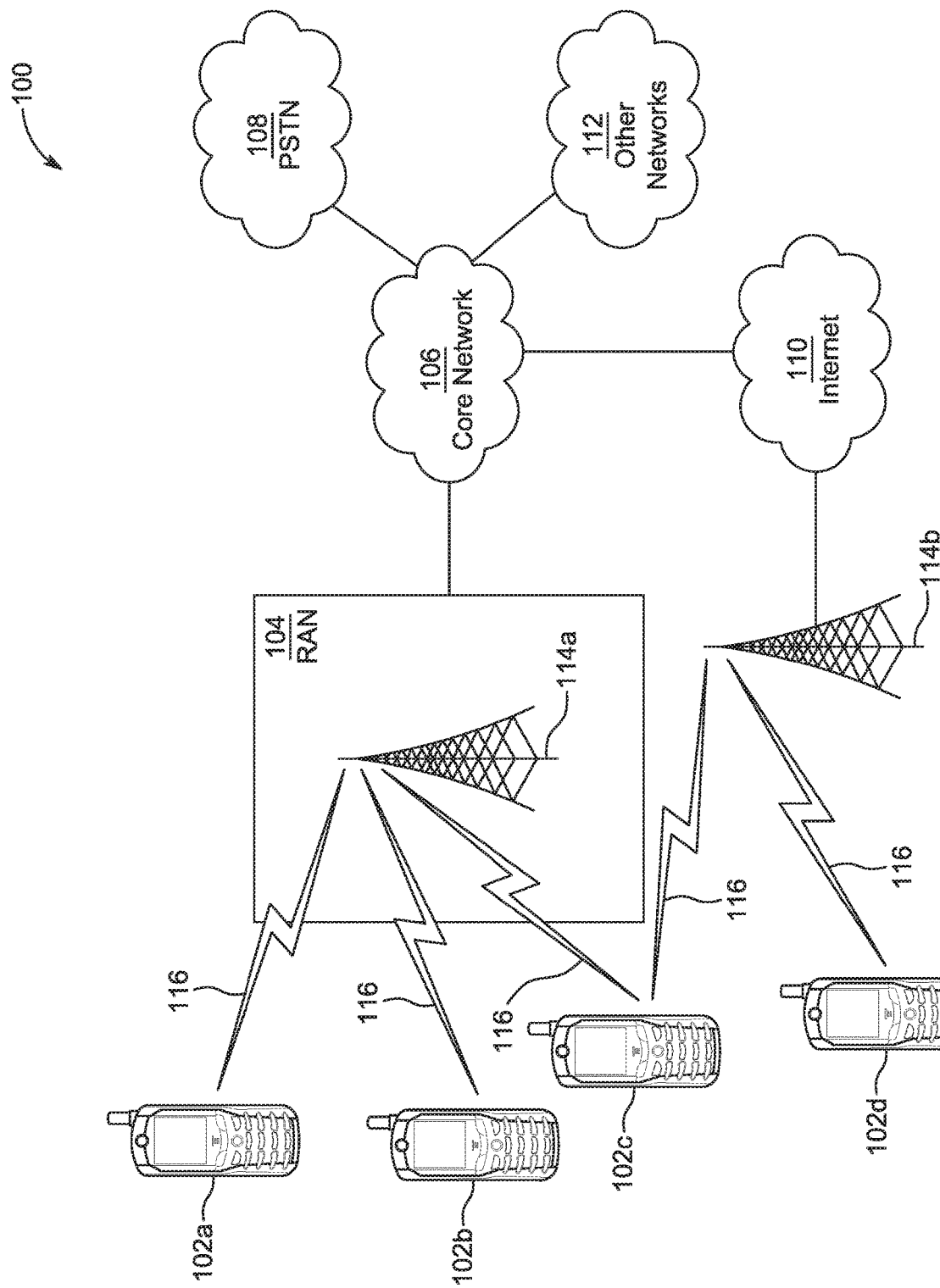
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

As discussed herein, a wireless device may be any node on a network carrying out wireless communication, such as a WTRU or a based station as described herein.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
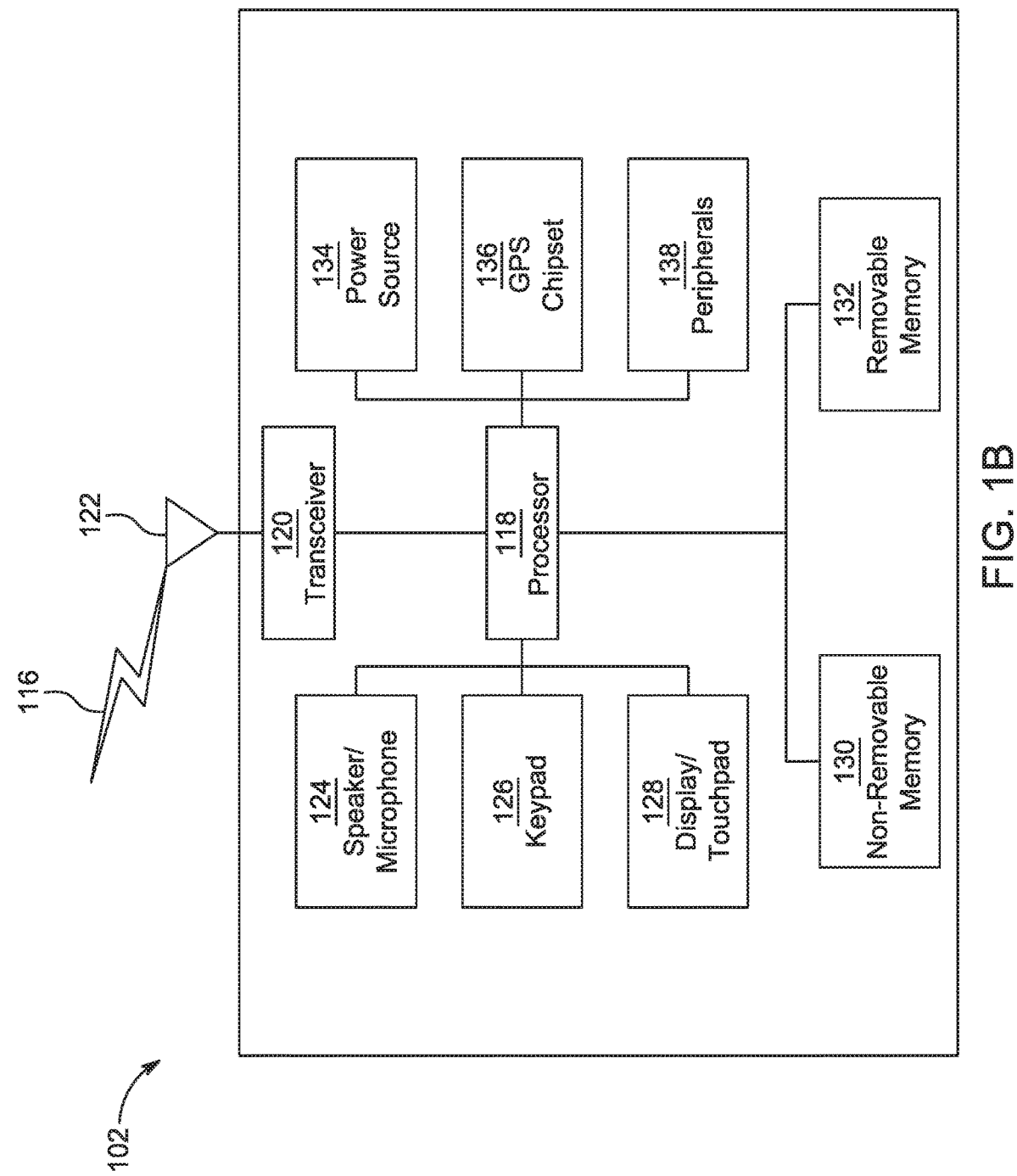
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
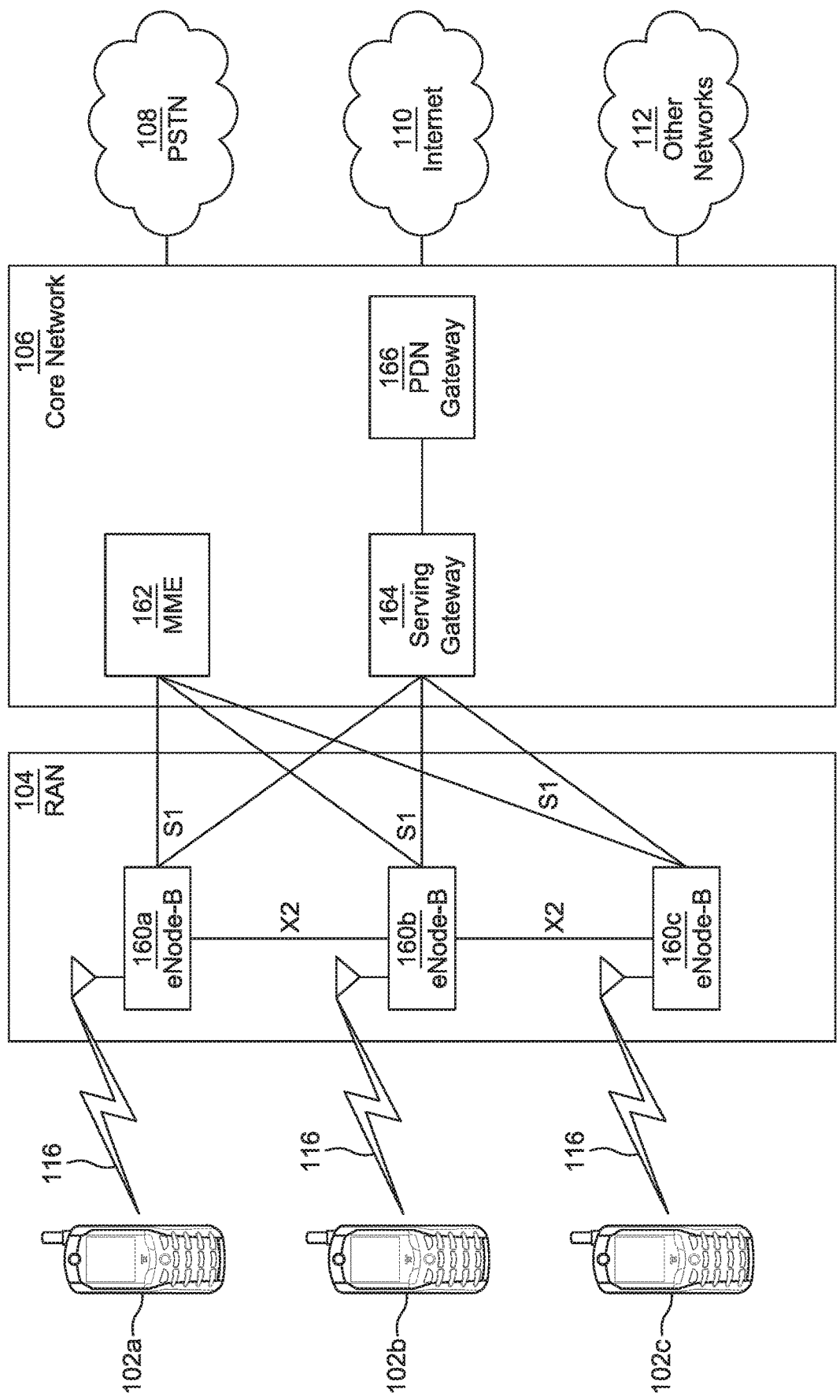
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
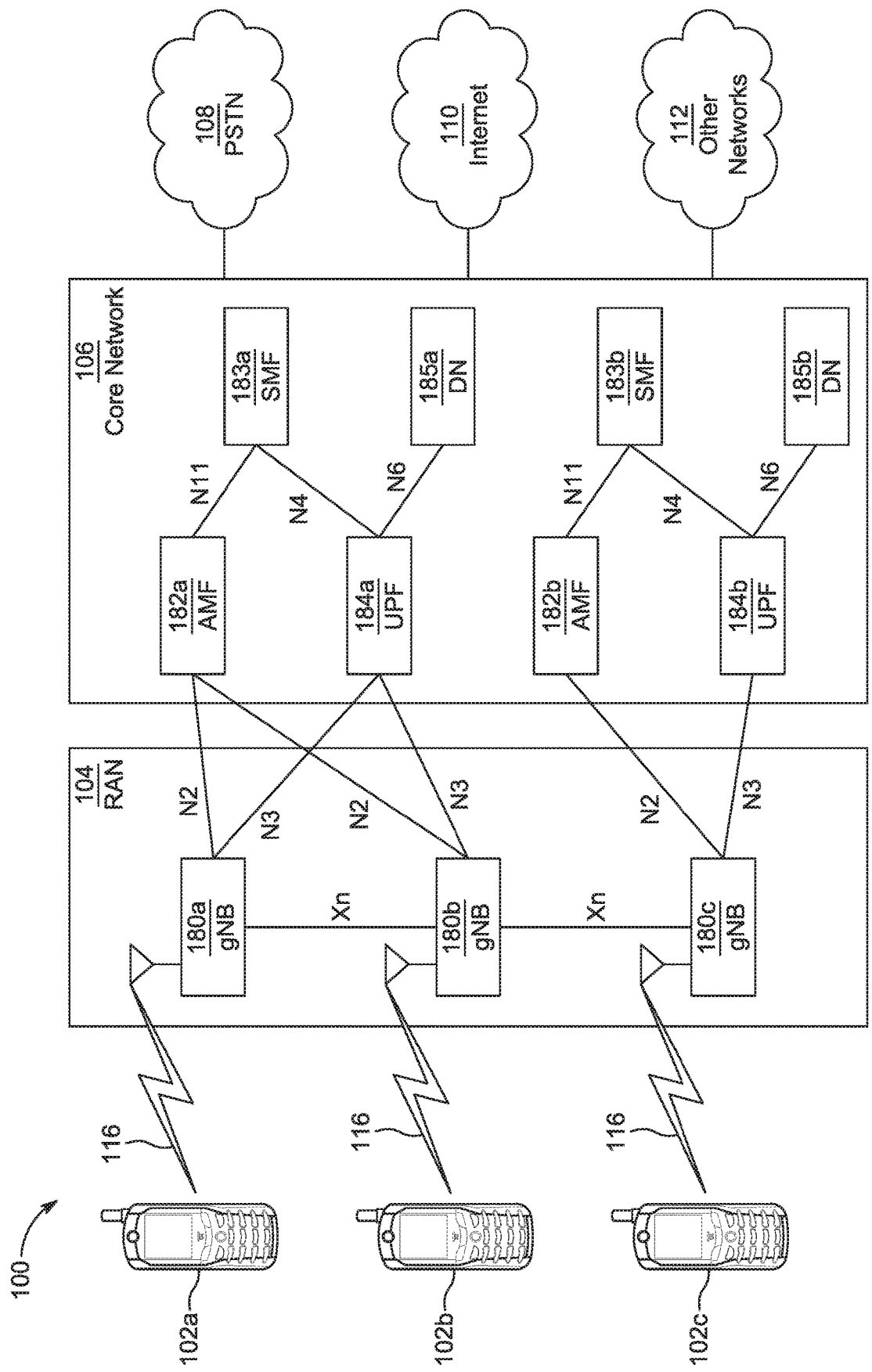
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Generally, in LTE Orthogonal frequency-division multiplexing (OFDM) may be used for the downlink (DL) transmission while a discrete Fourier transformation (DFT)-s-OFDM may be used for uplink (UL) transmission. In conventional Cyclic Prefix (CP) DFT-s-OFDM (sometimes referred to as single carrier frequency-division multiple access (SC-FDMA) with multiple accessing), the data symbols may be spread with a DFT block, and then mapped to the corresponding inputs of an IDFT block. The CP may be prepended to the beginning of the symbol in order to avoid inter-symbol interference (ISI) and allow one-tap frequency domain equalization (FDE) at the receiver.

In the downlink transmission, reference symbols may be scattered over specific subcarriers, (i.e., one OFDM symbol may have subcarriers loaded with data and reference symbols). Common reference symbols may be transmitted on subcarriers distributed over the system bandwidth while WTRU-specific reference signals may be distributed over the subband that is allocated to a specific WTRU.

3GPP may address an advanced wireless communication system called New Radio (NR). Applications of NR may be summarized under several categories: Enhanced mobile broadband (eMBB), Massive machine-type communications (mMTC), and Ultra-reliable-and-low-latency communications (URLLC). Under each category, there may be a wide set of applications that are considered for various needs and deployment scenarios that mandate specific performance requirements. For example, mMTC and URLLC applications range from automotive to health, agriculture, utilities and logistics industries.

To fulfill the high data rate requirements, spectrum above 6 GHz frequency may be used to leverage the large bandwidth of that spectrum. One challenge of using these higher frequencies may be the significant propagation loss especially in an outdoor environment due to higher free space path loss in a higher frequency.

Beamforming (e.g., analog beam) may be a solution to address the significant path loss in a higher frequency since it can compensate path loss without increasing transmission power. As beams are used to compensate the path loss, all downlink and uplink channels may be based on beams.

In one situation, Device to Device (D2D) and/or Vehicle to Everything (V2X) communication may employ LTE. One or more of the following physical channels may be used for sidelink transmission and/or reception: SPSS (sidelink primary sync signal) and/or SSSS (sidelink secondary sync signal); PSBCH (physical sidelink broadcasting channel); PSCCH (physical sidelink control channel); PSSCH (physical sidelink shared channel); and/or PSDCH (physical sidelink discovery channel).

A sidelink may support one or more modes (e.g., up to 4 Modes). A first and/or second mode (e.g., Mode 1 and/or Mode 2) may be used for D2D communication. D2D communication may require power efficient reliable transmission. D2D communication may be delay tolerant and/or may be used for low mobility. Mode 1 may be based on or may use eNB scheduling for sidelink transmission, where a resource for a sidelink transmission may be scheduled by the eNB via a DCI. Mode 2 may be based on or may use WTRU resource selection (e.g., autonomous resource selection) within a resource pool that may be configured. Mode 1 may be used when WTRUs for sidelink transmission are located under or within an eNB coverage so that the WTRUs may be able to receive the control signal from the eNB. Mode 2 may be used when WTRUs for sidelink transmission are out of the eNB coverage and/or when they are within coverage.

A third and/or fourth mode (e.g., Mode 3 and/or Mode 4) may be used for V2X communication, for example to support high mobility and/or low latency. Mode 3 may use eNB scheduling for sidelink resource determination. Mode 4 may use WTRU resource selection (e.g., autonomous resource selection).

For a mode using scheduling (e.g., Mode 1 and/or Mode 3), a sidelink WTRU may receive a resource grant for sidelink transmission. The WTRU may monitor (e.g., monitor for) the resource grant in a search space configured for a Uu interface.

In one or more embodiments, a phase tracking reference signal (PT-RS) may be used to measure, track, and/or estimate phase noise to compensate the phase noise before the demodulation of a Physical Downlink Shared Channel (PDSCH) and/or a Physical Uplink Shared Channel (PUSCH). The PT-RS may be interchangeably used with phase noise reference signal (PNRS), and reference signal (RS).

The PT-RS may be transmitted within a scheduled bandwidth for PDSCH or PUSCH. The transmission of PT-RS in the scheduled bandwidth for PDSCH or PUSCH may be turned on/off by a node, such as a gNB, via higher layer signaling. If the transmission of a PT-RS in the scheduled bandwidth is turned on, the presence of the PT-RS and/or density of the PT-RS (e.g., time and/or frequency) in a scheduled bandwidth for PDSCH or PUSCH may be determined based on one or more of the following: scheduled number of resource blocks (RBs) (e.g., a.k.a. scheduled bandwidth and/or physical resource blocks (PRBs)); modulation coding scheme (MCS) level indicated for the scheduled PDSCH and/or PUSCH; numerology (e.g., subcarrier spacing, slot length, etc.); WTRU capability (e.g., support PT-RS or not); demodulation reference signal (DM-RS) density which may be used for demodulation; number of layers scheduled (e.g., transmission rank of PDSCH or PUSCH); and/or presence of UCI in the PUSCH and its associated UCI type (e.g., HARQ-ACK or CSI).

When PT-RS is present in a scheduled bandwidth for PDSCH or PUSCH, a subset of scheduled RBs may include, contain, or transmit the PT-RS. The subset of PT-RS RBs may be determined based on one or more of the RB offset or scheduled bandwidth.

For RB offset, the subset of RBs that have PT-RSs may be located every K-th RB within the scheduled bandwidth, where the RB is indexed from the lowest RB index within the scheduled RBs to a RB with a higher index regardless of whether the scheduled RBs contiguous or distributed. The RB offset may be the starting RB index to include PT-RS. As discussed herein RB offset, PRB offset, starting RB offset, and starting RB index may be interchangeably used.

For scheduled bandwidth, the number of RBs that may include, contain, or transmit PT-RS may be determined based on the scheduled bandwidth. A first number of RBs may include PT-RS if the scheduled bandwidth is smaller than a first threshold and a second number of RBs may include PT-RS if the scheduled bandwidth is equal to or greater than the first threshold and smaller than a second threshold, and so forth. The subset may include the situation where all scheduled RBs (or RBs) may contain, include, or transmit PT-RS.

When PT-RS is present in a scheduled bandwidth for PDSCH or PUSCH, a subset of symbols (e.g., CP-OFDM symbols or DFT-s-OFDM symbols) may include PT-RS. The presence of PT-RS in a symbol may be determined based on one or more of the following: the MCS level (or modulation order) of the scheduled PDSCH or PUSCH; presence of DM-RS in the symbol (e.g., if a symbol includes DM-RS, PT-RS may not be transmitted in the symbol); and/or PT-RS density determined based on one or more scheduling parameters. The PT-RS density, time/frequency location, and/or use of DFT precoding or not may be dependent on the waveform used.

In one scenario, PT-RS may be used for PDSCH or PUSCH transmission when a CP-OFDM waveform is used. One or more subcarriers in a RB may be used for a PT-RS transmission; the same subcarrier location over consecutive OFDM symbols, which may be determined for PT-RS transmission, may also be used.

Figure 2:
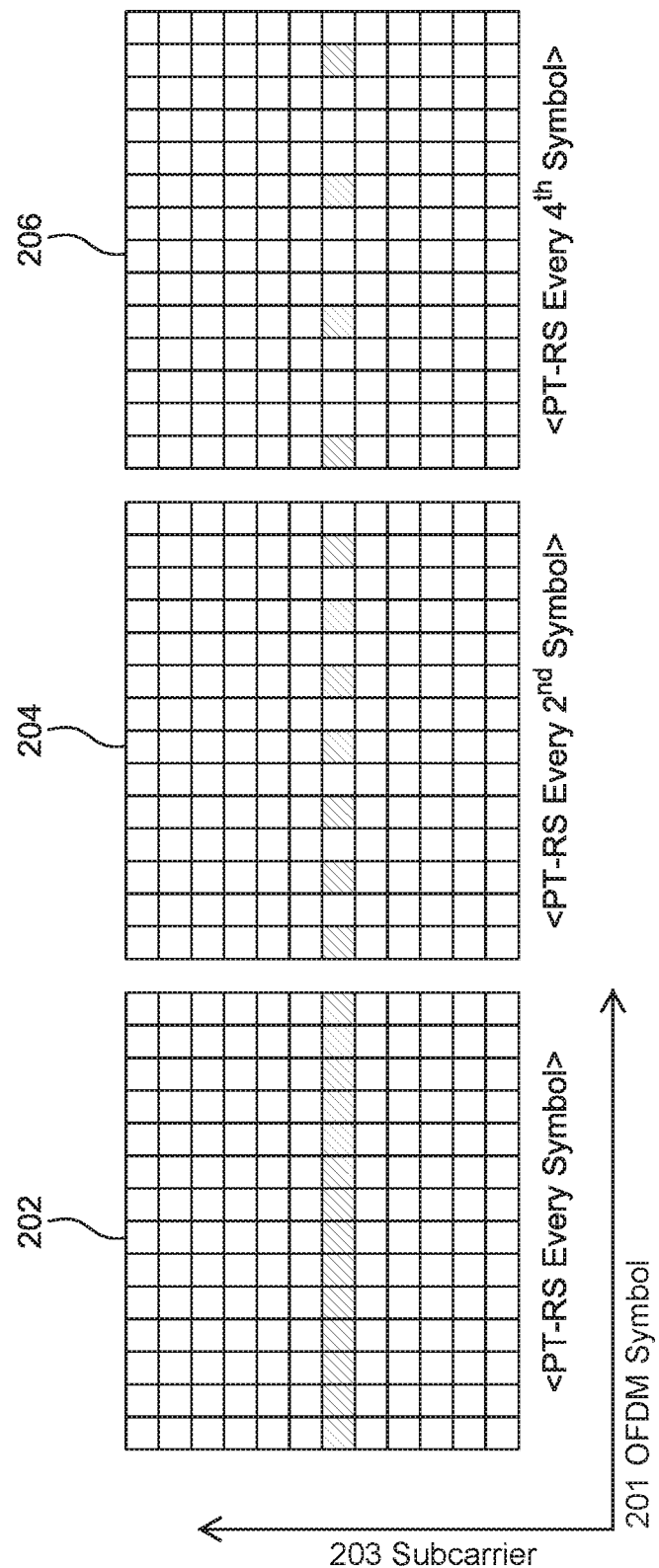
FIG. 2 is an illustration of an example PT-RS time density.

FIG. 2 illustrates several examples of PT-RS time density. There are three example grids 202, 204, and 206 where the horizontal axis 201 for each grid may be OFDM symbols and the vertical axis 203 is subcarriers. For each example there is a grid of Resource Elements (REs) where shaded blocks may represent REs containing PT-RS. Looking from left to right, in example 202 there may be a PT-RS located in every symbol (e.g., OFDM symbol), in example 204 there may be a PT-RS every $2^{nd}$ symbol, and/or in example 206 there may be a PT-RS every $4^{th}$ symbol. PT-RS time density may be determined based on MCS threshold, for example as shown in Table 1 below. $I_{MCS}$ may be a MCS level used, determined, or indicated for PUSCH or PDSCH in an associated DCI. PT-RSthMCS1, PT-RSthMCS2, PT-RSthMCS3, and PT-RSthMCS4 may be configured via higher layer signaling or a DCI and referred to as thresholds to determine the time density of PT-RS. A default configuration may be used (e.g., every symbol) if there is no configuration or indication

TABLE 1

Example time density of PT-RS as a function of scheduled MCS

| Scheduled MCS | Time density($l_{PTRS}^{step}$) |
| --- | --- |
| $I_{MCS}$ < PT-RSthMCS$_1$ | PT-RS is not present |
| PT-RSthMCS1 <= $I_{MCS}$ < PT-RSthMCS2 | present on every $4^{th}$ symbol |
| PT-RSthMCS2 <= $I_{MCS}$ < PT-RSthMCS3 | present on every $2^{nd}$ symbol |
| PT-RSthMCS3 <= $I_{MCS}$ | present on every symbol |

For CP-OFDM and DFT-s-OFDM, when PT-RS is present, the PT-RS mapping pattern may start at the first symbol containing PDSCH/PUSCH in the slot and may then map to every L_{PT-RS} symbol. A PT-RS mapping pattern may be restarted at each symbol containing a DMRS and then mapped to every L_{PT-RS}symbol relative to the symbol containing PT-RS. In the case of two adjacent DMRS symbols, the PT-RS pattern may be restarted using the second of the two DMRS symbols as a reference. When PT-RS time density is lower than 1, the symbol right after front-loaded DMRS and the symbol right after additional DMRS, if it exists, may not contain PT-RS. The PT-RS according to the mapping pattern may not be transmitted in OFDM symbols that contain PDSCH/PUSCH DMRS. The PT-RS according to the mapping pattern may not be transmitted in a Resource Element (RE) that overlaps with a configured control channel resource sets (CORESETs).

PT-RS frequency density may be determined based on the number of RBs scheduled as shown in Table 2 below. NRB may be the number of RB scheduled. PT-RSthRB0, PT-RSthRB1, PT-RSthRB2, PT-RSthRB3, and PT-RSthRB4 may be the thresholds to determine frequency density of PT-RS and it may be configured via RRC signaling or indicated in an associated DCI. A default configuration may be used (e.g., 2nd RB) if there is no configuration or indication.

TABLE 2

Frequency density of PT-RS as a function of scheduled bandwidth

| Scheduled bandwidth | Frequency density (every $K^{th}$ RB) |
| --- | --- |
| $N_{RB}$ < PT-RSthRB0 | PT-RS is not present |
| PT-RSthRB0 <= $N_{RB}$ < PT-RSthRB1 | present on every RB |
| PT-RSthRB1 <= $N_{RB}$ < PT-RSthRB2 | present on every $2^{nd}$ RB |
| PT-RSthRB2 <= $N_{RB}$ < PT-RSthRB3 | present on every $4^{th}$ RB |
| PT-RSthRB3 <= $N_{RB}$ < PT-RSthRB4 | present on every $8^{th}$ RB |

Figure 3:
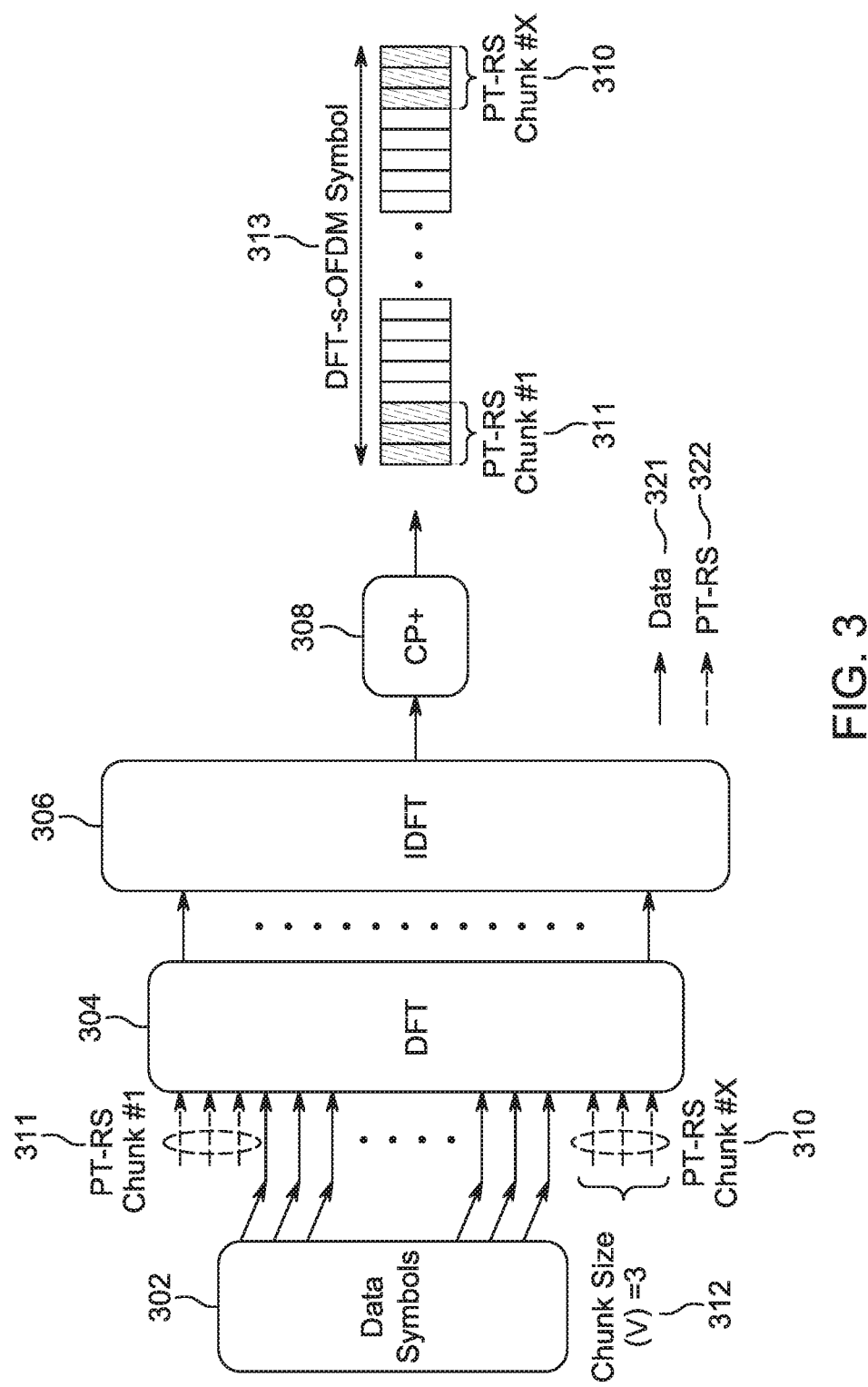
FIG. 3 is a diagram of an example chunk-based pre-DFT PT-RS for DFT-s-OFDM with N chunks.

FIG. 3 illustrates an example process where a chunk-based pre-DFT PT-RS insertion may be used for generating a DFT-s-OFDM waveform. PT-RS input/output 322 is shown with arrows and grey shading, and data input/output 321 is shown with black arrows. Generally in LTE, the process of forming a waveform may involve the data symbols 302 initially spread with a DFT block 304, and then mapped to the corresponding inputs of an IDFT block 306. The CP 308 may be prepended to the beginning of the symbol in order to avoid inter-symbol interference (ISI) and allow one-tap frequency domain equalization (FDE) at the receiver.

A PT-RS pattern (e.g., chunk-based pre-DFT PT-RS pattern) may be determined based on a number of chunks (X) 310, chunk size (V) 312, and the location of chunks. The X PT-RS chunks 310, such as PT-RS chunk #1 311 may be inserted prior to the DFT block 304. The PT-RS chunks and data would proceed along the same process as described above for forming a waveform. A chunk is comprised of tones, and for each chunk, and its size may be V PT-RS tones. For each chunk, there may be V PT-RS tones before the DFT input; in the example of FIG. 3 the chunk size may be V=3 as shown with three long dotted arrows for each PT-RS chunk; this is also shown in the resulting waveform in a DFT-S-OFDM symbol 313 where the PT-RS chunk #1 311 is in the first three shaded blocks and PT-RS chunk # X is at the end.

The location of the chunks of a DFT input may be determined based on the scheduled RB, chunk size (V) 312, and/or the number of chunks (X) 310. For example, two values of V, $V_1$ and $V_2$, may be used and the location of the chunks may be determined based on the V value as follows: when V=$V_1$, the samples in DFT domain may be divided in X intervals, and the chunks may be located in the Head (first V samples), Middle (middle V samples), or Tail (last V samples) in each interval; and when V=$V_2$, the samples in DFT domain are divided in X intervals, where in the first interval the chunk is placed in the Head (first V samples), in the last interval the chunk is placed in the Tail (last V samples), and in the rest of intervals the chunk is placed in the middle of each of the two intervals.

A PT-RS pattern may be determined based on scheduled bandwidth (BW) with a set of thresholds $N_{RBn}$, n=0,1,2,3,4, per BWP that indicates the values of X and V that the WTRU should use depending on the scheduled BW according to the Table 3 below. Y represents any value. In one example, the value of Y may be 8.

TABLE 3 pre-DFT PT-RS pattern (X, V) based on scheduled BW

| Scheduled BW | X × V |
|---|---|
| $N_{RB0} < N_{RB} \le N_{RB1}$ | 2 × 2 |
| $N_{RB1} < N_{RB} \le N_{RB2}$ | 2 × 4 |
| $N_{RB2} < N_{RB} \le N_{RB3}$ | 4 × 2 |
| $N_{RB3} < N_{RB} \le N_{RB4}$ | 4 × 4 |
| $N_{RB} > N_{RB4}$ | Y × 4 |

Figure 4:
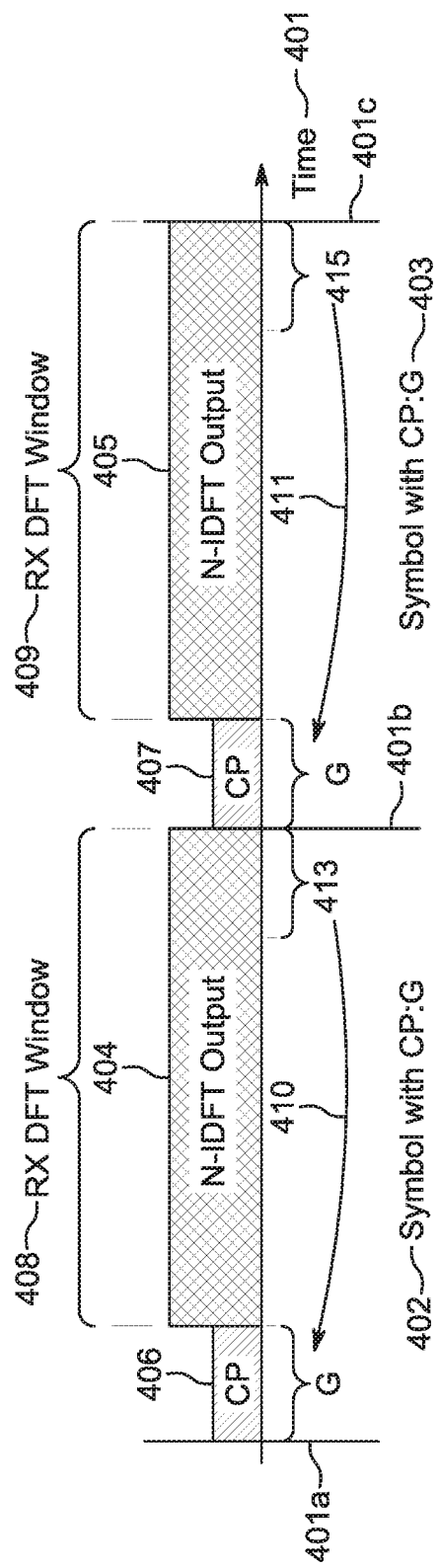
FIG. 4 is a diagram of an example normal cyclic prefix (CP)

FIG. 4 illustrates a diagram of a signal with a normal Cyclic Prefix (CP). Time 401 is shown on the horizontal axis. For any of the figures discussed herein, each portion of any given symbol shown in a time domain signal diagram may be shaded with a pattern to indicate similarity. As shown there are two symbols of a signal (i.e., DFT-s-OFDM, OFDM), symbol 402 and symbol 403 with a CP 406 and CP 407 respectively. In normal CP operation the size of each CP may be G and the Inverse Discrete Fourier Transformation (IDFT) output may be extended by prepending a replica of the last part of IDFT output: CP 406 and CP 407 may replicate the end and follow N-IDFT Output 404 and N-IDFT Output 405 respectively, where the last part portion is 413 and 415 respectively and indicated by arrows 410 and 411 respectively. At the receiver side, the location of the DFT window may be on the first symbol and may not capture a sample from the subsequent symbol: each N-IDFT Output 404, 405 may be within a receiver (RX) DFT window 408, 409 respectively. However, if the CP size G is not less than the number of taps for the multipath channel, the receiver may suffer from ISI. In some cases, the normal CP size may not be sufficient. For example, if the communication environment is outdoors or the link is established on non-line-of-sight (LOS) paths, the maximum excess delay of the multipath channel may increase substantially. In these cases, the duration of the CP may not be large enough to handle the delay spread of the channel and this insufficient CP size may lead to inter-symbol-interference (ISI).

Figure 5:
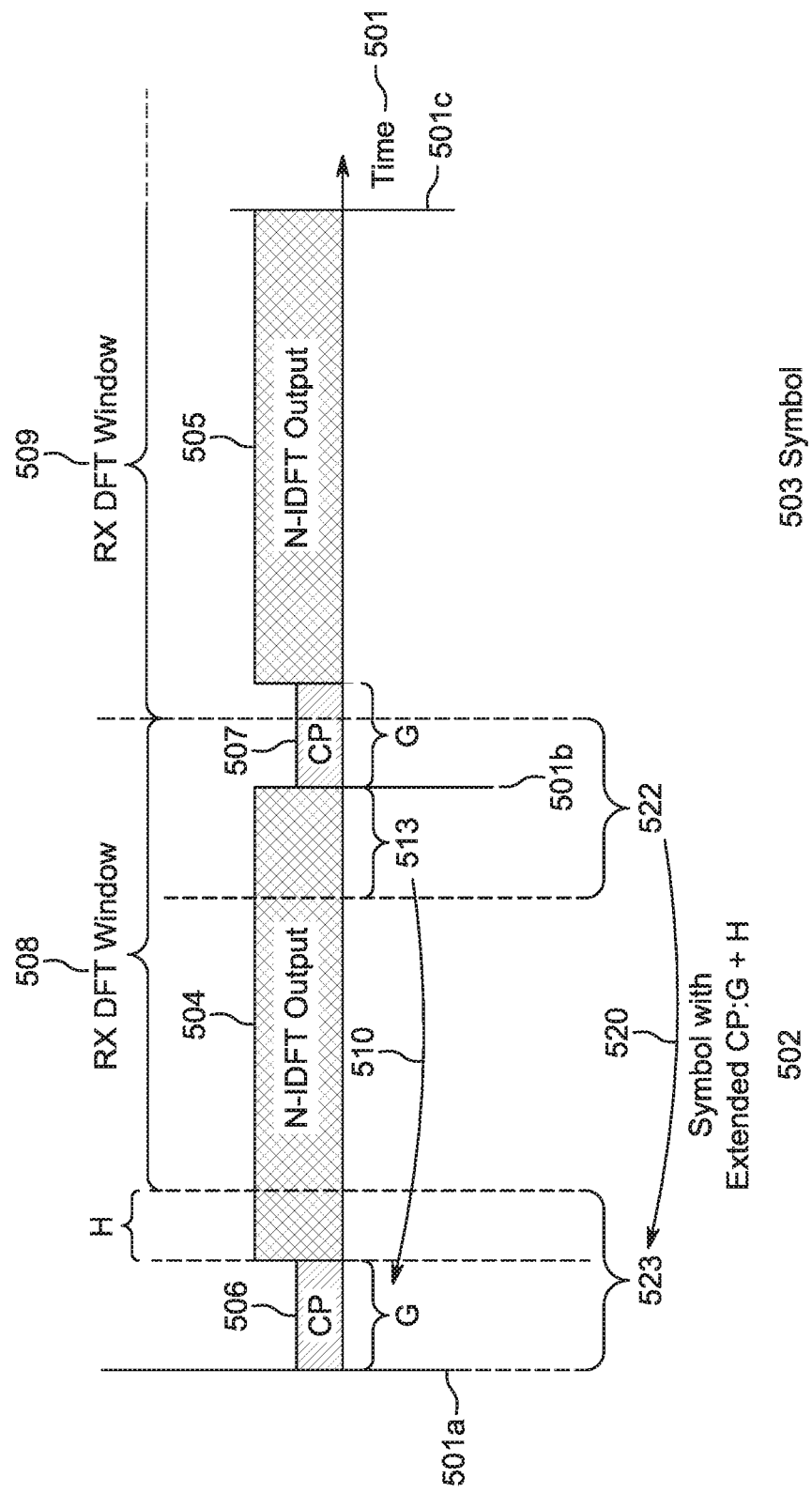
FIG. 5 is a diagram of an example extended CP (Virtual CP)

FIG. 5 illustrates a diagram of a signal with an extended CP (e.g., virtual CP). Time 501 is shown on the horizontal axis. As shown there is a symbol 502 of a signal with a CP 506 that may be extended to length 523. Note that a second symbol 503 with N-IDFT Output 505 and CP 507 is shown to provide context for where the extension comes from with respect to the entire signal. CP Extension (a.k.a., virtual CP) may be used to address when the CP size is not long enough. The goal of a virtual CP may be to increase the effective CP length of the block-based symbols (e.g., DFT-s-OFDM, OFDM) to increase their robustness against multipath channel. In the example shown in FIG. 5 the CP 506 of length G may be extended by H samples to a total extended CP length 523. The N-IDFT Output 504 of the IDFT may be extended by prepending a replica 522 of the last part of the N-IDFT Output 504, similar to the example shown in FIG. 4, however, the extended CP regions may be forced to be identical due to the special structure of IDFT-output. Also note that the RX DFT-Window 508 may be shifted by H samples.

Since this approach may not change the basic receiver operations, it may also be beneficial to maintain the hardware-complexity at the receiver side. Another benefit of virtual CP may be the reduced out-of-band emission (OOBE) due to the fact that two subsequent symbols are forced to be continuous as the samples in the RX DFT window should be continuous to decode the symbols without interference.

Figure 6:
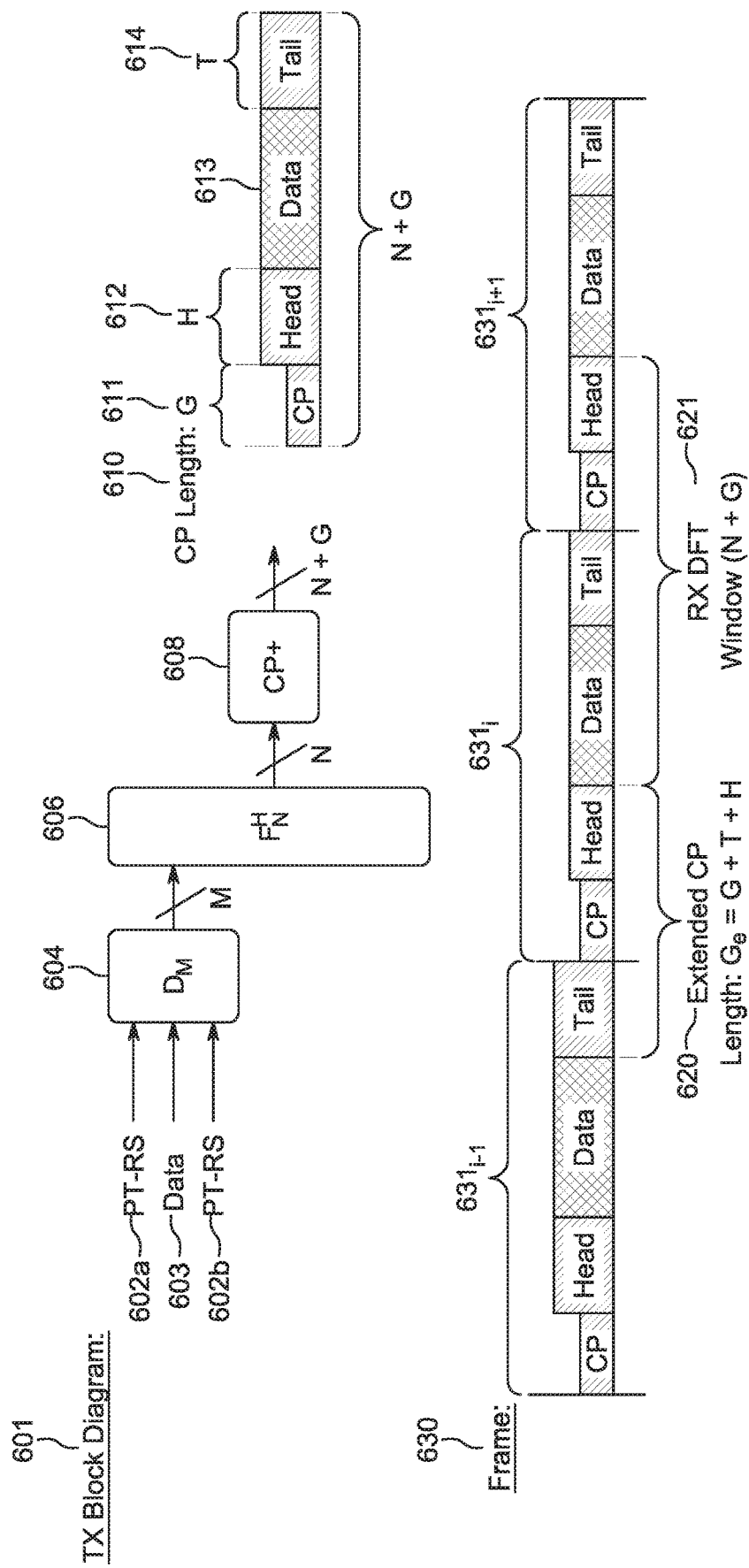
FIG. 6 is a set of diagrams of an example plain UW and CP combination.

FIG. 6 illustrates an example of plain unique word (UW) and cyclic prefix (CP) combination. In one approach, UW and CP may be combined as illustrated. Looking at the Transmission (TX) Block Diagram 601, PT-RS 602a and 602b may be mapped to both ends of M-DFT 604 (denoted by $D_M$) to generate the head 612 and tail 614 portions in time at the output N-IDFT 606 (denoted by $F_N^H$ where $(\cdot)^H$ is the Hermitian operation and $F_N$ is the N-DFT). Without any special design on the reference symbols, if the CP 611 of duration G is less than the tail 614 of duration T, the indicated portions may become approximately identical and may be considered to be an extended CP duration.

For example looking at the Frame 630 of the resulting time domain signal, the Extended CP 620 of length $G_e$ may have the concatenation of the tail of a previous symbol $631_{i-1}$ and the CP and head portions of the current symbol $631_i$. Although this approach seems to achieve the goal of virtual/extended CP 620, the receiver (RX) may suffer because the RX DFT window 621 size changes from N to N+G, therefore, the receiver structure may be affected for the sake of the extended CP reception, which may not be desirable. The receiver may also suffer because the transition between the tail of a current symbol $631_i$ and the CP of a next symbol $631_{i+1}$ may not be continuous without any special design; therefore, the data symbols, such as 613, may be interfered. Thus, the receiver may need to perform extra operations to recover the data, which may not be ideal.

Figure 7:
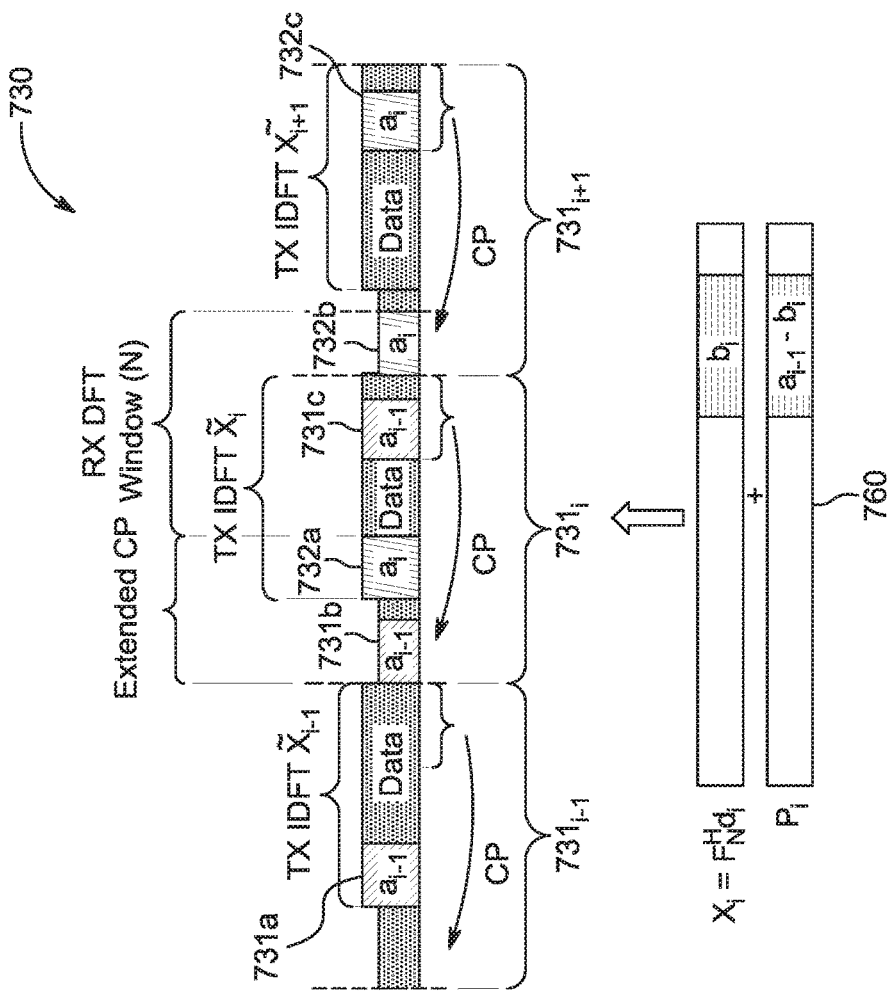
FIG. 7 is a diagram of an example perturbation approach.
Figure 7:
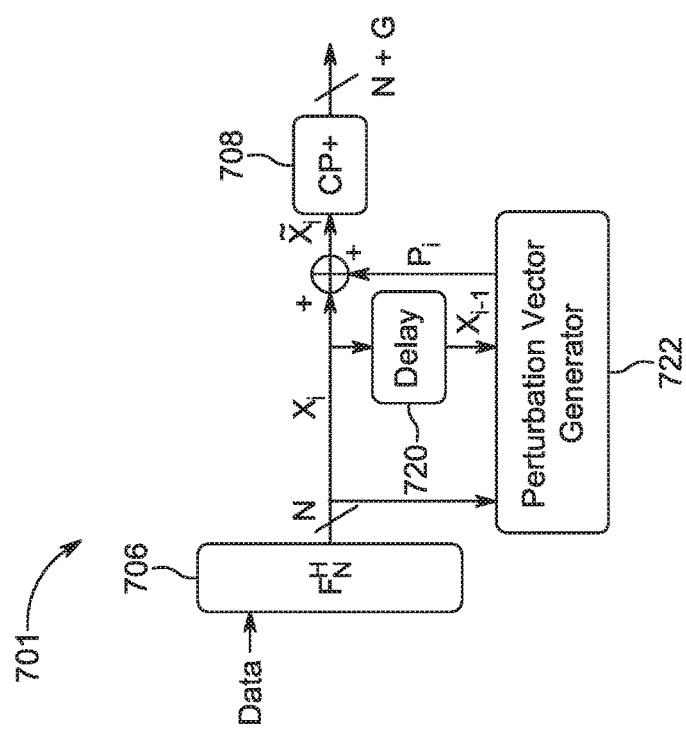

FIG. 7 illustrates an example of a perturbation approach. In this approach, each OFDM symbol may be perturbated to achieve continuity between the adjacent symbols by some perturbation vector (i.e., which also achieves CP extension). The transmitter diagram 701 and corresponding time domain signal 730 of the proposed approach is illustrated on the left and right, respectively, in the example shown in FIG. 7. As with other transmission processes discussed herein, data may enter an IDFT block (denoted by $F_N^H$) 716 resulting in a symbol of length N. A symbol may go through a Perturbation Vector Generator block 722, and/or a delay may be introduced in block 720. CP may be added at block 708 resulting in a symbol of length N+G.

The resulting signal 730 may have a previous symbol $731_{i-1}$, a current symbol $731_i$, and a next symbol $731_{i+1}$ for illustration purposes. Note that each portion of any given symbol shown in the time domain signal 730 may be shaded with a pattern to indicate similarity. Further, there are also three TX IDFT $\tilde{X}_{i-1}, \tilde{X}_i, \tilde{X}_{i+1}$ for each symbol, respectively. $b_i$ may be a portion of the unperturbed signal $X_i$ to be manipulated. Element 760 may be the output of the perturbation vector generator which replaces $b_i$ with $a_{i-1}$. The head of a previous perturbated OFDM symbol $\tilde{X}_{i-1}$ may be denoted as $a_{i-1}$ at 731a. To maintain the continuity between the previous (i.e., TX IDFT $\tilde{X}_{i-1}$) and the current symbol (TX IDFT $\tilde{X}_i$), the head of the CP of the current, or ith, perturbated OFDM symbol may also be $a_{i-1}$ as shown at

731b. Since the CP is a replica of the last portion of the symbol TX IDFT $\tilde{X}_i$, the vector $\tilde{X}_i$ may include $a_{i-1}$ at the tail corresponding location at 731bc. To this end, the IDFT 706 output, (i.e., $X_i$), may be perturbated as a function of $a_{i-1}$ of the i-1$^{th}$ perturbated OFDM symbol.

This approach may work for any CP duration size, but may also present some issues. One issue may be that it is a dynamic method (i.e., the perturbation is a function of data) and therefore it may need to be calculated for each individual OFDM symbol, which can be processing intensive. Also, since it is a dynamic method, it may not be compatible for reference signals (RSs). Another issue may be that the perturbation signal may not be used as a RS. Another issue may be that the perturbation vector follows an arbitrary structure, and hence the receiver may need to perform an extra operation to remove the impact of interference due to the perturbation vector.

Figure 8:
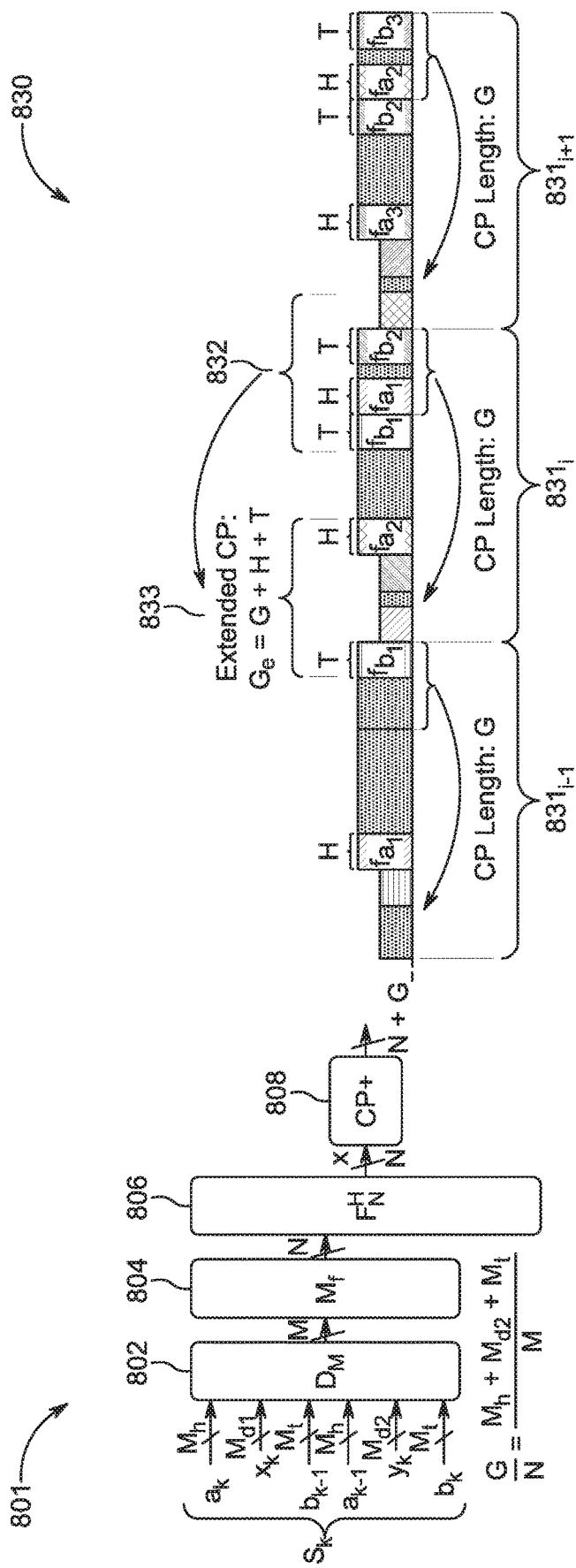
FIG. 8 is a diagram of an example dynamic approach for DFT-s-OFDM.

FIG. 8 illustrates an example of a dynamic approach for DFT-s-OFDM. The example transmitter diagram 801 and the corresponding time domain signal 830 can be seen on the left and right of the figure, respectively. In this approach, the single carrier structure of DFT-s-OFDM may be exploited and the CP extension may be achieved by shifting the location of data symbols and reusing them in the previous and next DFT-s-OFDM symbols based on a certain rule for certain CP length and DFT-spread sizes. As with other transmission processes discussed herein, the transmitter diagram 801 carries out a process involving blocks $D_M$ (DFT) 802, Mf 804, $F_N^H$ (IDFT) 806, and CP 808, in that order. $M_f$ 804 may be a subcarrier mapping operation that maps the output of $D_M$ 802 to the inputs of $F_N^H$ 806. In this approach, the symbol at the input of DFT-s-OFDM block 802 $s_k$ may be ordered as follows:

$$s_k = [a_k^T x_k^T b_{k-1}^T a_{k-1}^T y_k^T b_k^T]^T$$

where $a_k \in \mathbb{C}^{M_h \times 1}$, $b_k \in \mathbb{C}^{M_t \times 1}$, $x_k \in \mathbb{C}^{M_{d1} \times 1}$, and $y_k \in \mathbb{C}^{M_{d2} \times 1}$ are the data symbols, k is the DFT-s-OFDM symbol index, and the CP length should be set to $$G = N \times \frac{M_h + M_{d2} + M_t}{M}.$$

In the resulting time domain signal 830, there may be a previous symbol 831$_{i-1}$, a current symbol 831$_i$, and a next symbol 831$_{i+1}$ for illustration purposes. Note that each portion of any given symbol shown in the time domain signal 830 may be shaded with a pattern to indicate similarity. For the example shown, if $a_k$ where k=2 for symbol 831$_i$, then $b_{k-1}$ is $b_1$ and so on for the other inputs at the beginning of the transmitter diagram 801. It may follow then that for each element in a symbol there is a corresponding input, such as f sub $a_2$ is the head (H) of the current symbol 831$_i$ still using the example where k=2. As shown, this method may achieve the Extended CP 833 which shows a CP length (G) plus the Tail (T) and the (H) result in $G_e$ which is taken from the other end 832 (note the similar patterns in the extended CP 833 and the other end 832); this may be achieved without any complex operation both at the transmitter and receiver, nevertheless, it may also introduce an undesirable constraint on the CP size G. Therefore, this approach may only be compatible with certain numerologies. Another possible issue of this approach may be generating the CP extension based on data symbols. Hence, this approach may only be compatible with certain PT-RS structures.

Figure 9:
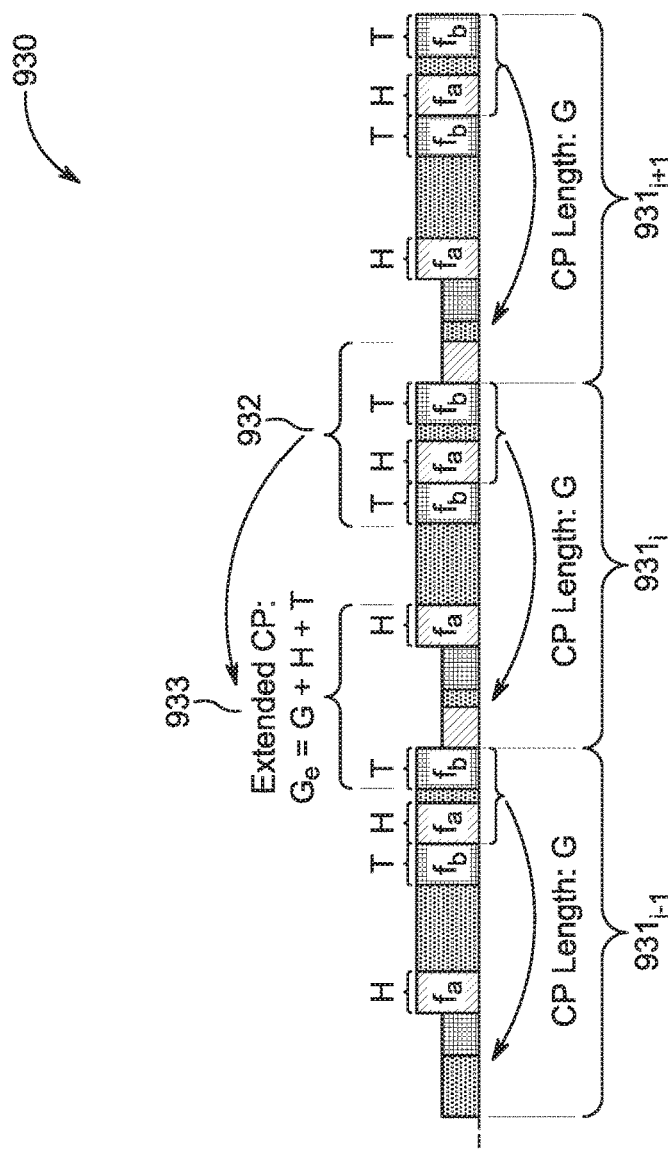
FIG. 9 is a diagram of an example dynamic approach for DFT-s-OFDM.
Figure 9:
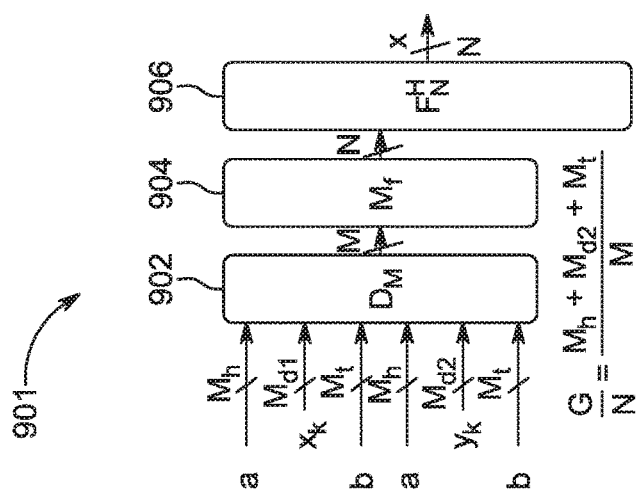

FIG. 9 illustrates an example of a static approach for DFT-s-OFDM. The example transmitter diagram 901 and the corresponding time domain signal 930 can be seen on the left and right of the figure, respectively. As with other transmission processes discussed herein, the transmitter diagram 801 carries out a process involving blocks $D_M$ (DFT) 902, $M_f$ 904, and $F_N^H$ (IDFT) 906, in that order. In this approach, the single carrier structure of DFT-s-OFDM may be exploited and the CP extension shown in the signal diagram 901 may be achieved with a CP block in the transmitter by replacing the input data symbol with fixed RSs as $a_k = a \in \mathbb{C}^{M_h \times 1}$, $b_k = b \in \mathbb{C}^{M_t \times 1}$.

In the resulting time domain signal 830, there may be a previous symbol 931$_{i-1}$, a current symbol 931$_i$, and a next symbol 931$_{i+1}$ for illustration purposes. Note that each portion of any given symbol shown in the time domain signal 930 may be shaded with a pattern to indicate similarity. Just as in the example shown in FIG. 8, this method may achieve the Extended CP 933 which shows a CP length (G) plus the Tail (T) and the (H) result in $G_e$ which is taken from the other end 932 (note the similar patterns in the extended CP 933 and the other end 932). While this static method addresses the PT-RS design, it may have the disadvantage of the dynamic method, such as where the CP length should be set to $$G = N \times \frac{M_h + M_{d2} + M_t}{M}.$$

Figure 10:
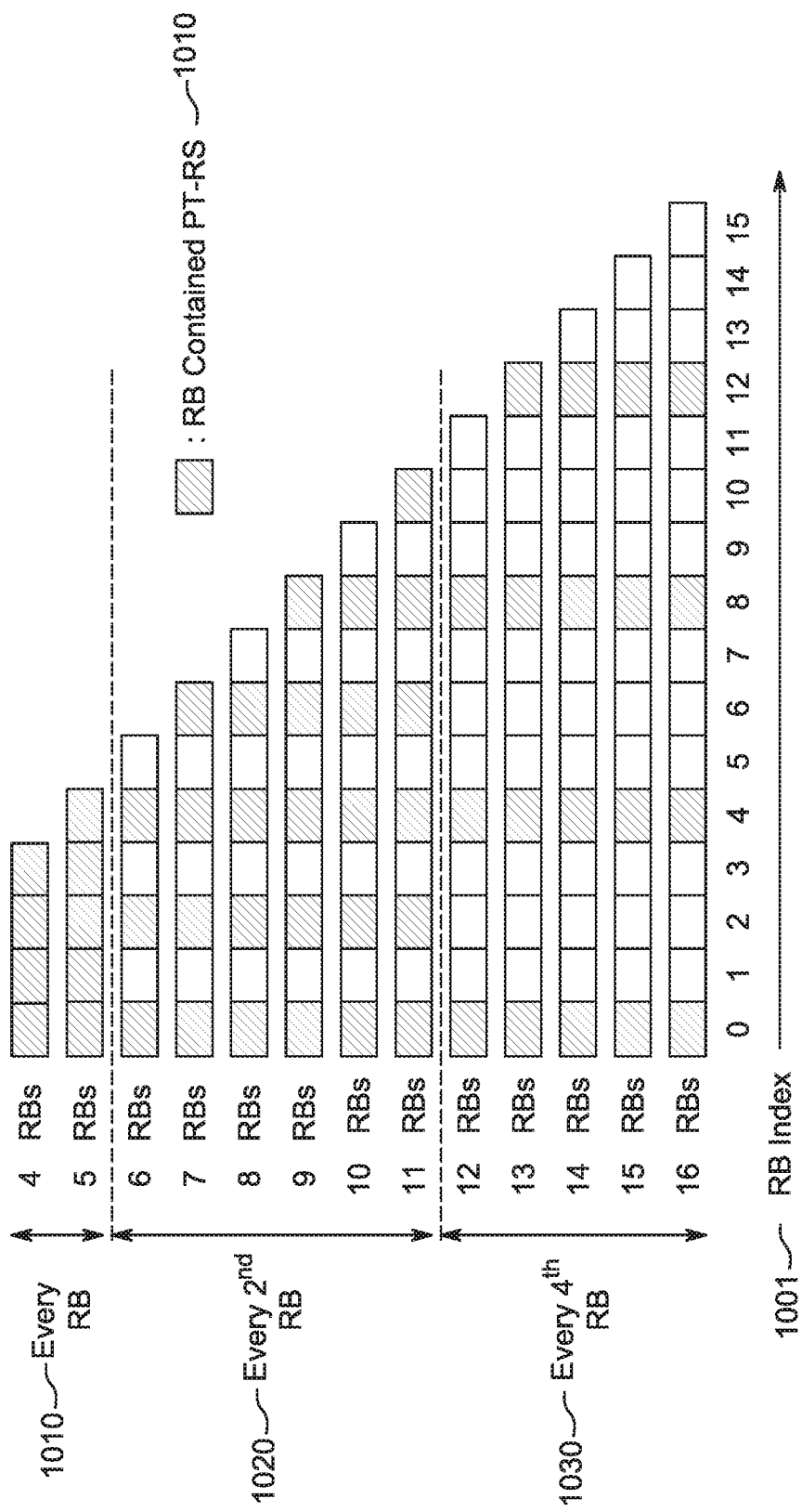
FIG. 10 is a diagram of an example of PT-RS frequency density.

FIG. 10 illustrates an example of how PT-RS frequency density (K) may work with different bandwidth schedules. Specifically, the PT-RS frequency density may be based on the number of scheduled RBs when RB offset is '0' (i.e., starting from the first RB scheduled) and the following thresholds are configured: {PT-RSthRB0=2, PT-RSthRB1=6, PT-RSthRB2=12, PT-RSthRB3=16}. RB Index 1001 on the bottom shows what number RB the PT-RS 1010 is in for any given configuration. There are three example scenarios with different PT-RS densities shown: Every RB 1010 (i.e., K=1); Every 2$^{nd}$ RB 1020 (i.e., K=2); and Every 4th RB 1030 (i.e., K=4). The PT-RS frequency density may not be linearly increased as the number of scheduled RB becomes larger. Also, the PT-RS frequency density may be different based on the RB offset. For example, the total number of PT-RS may be different for a WTRU with RB offset=0 and another WTRU with RB offset=1 although the number of scheduled RBs for both WTRUs may be the same.

An RB offset (e.g., the starting RB index) may be used to randomize the PT-RS interference (e.g., due to collisions between PT-RSs) from co-scheduled WTRUs. The RB offset may be determined based on one or more WTRU-specific parameters. One such parameter may be a WTRU-ID (e.g., temporary C-RNTI, C-RNTI, IMSI) where one or more WTRU-ID may be used. For example, when a WTRU is in RRC idle mode, the IMSI may be used as the WTRU-ID and the C-RNTI may be used when a WTRU is in RRC connected mode. The Temporary C-RNTI may be used to determine RB offset for RACH msg 2, 3, and/or 4 transmission/reception and C-RNTI may be used after the WTRU received C-RNTI configuration.

The RB offset may also/alternatively be determined based on the WTRU-specific parameter of scrambling ID (e.g., scrambling ID configured or indicated for DM-RS) where the scrambling ID may be configured in a WTRU-specific RRC signaling or indicated in an associated DCI for PDSCH or PUSCH scheduling.

The RB offset may also/alternatively be determined based on the WTRU-specific parameter of cell-ID (e.g., physical cell-ID) where a physical cell-ID which may be determined during initial access procedure or detected from a synchronization signal (SS).

The RB offset may also/alternatively be determined based on the WTRU-specific parameter of an SS block time index (e.g., SS/PBCH block index) where the SS block index may be determined during initial access procedures; as discussed herein, SS block index, SS block time index, SS/PBCH block index, SS/PBCH block time index may be used interchangeably.

The RB offset may also/alternatively be determined based on the WTRU-specific parameter of bandwidth part (BWP) index, such as where a WTRU may be configured with one or more BWPs and a subset of configured BWPs may be active at a time. The active BWP index on which a WTRU may be configured or indicated to transmit and/or receive PDSCH or PUSCH may be used to determine the RB offset value. As discussed herein, BWP and carrier may be interchangeably used.

A default RB offset may be used before RRC connection setup, or before a WTRU may be configured with a WTRU-specific parameter. The default RB offset may be determined by at least one of the following: a fixed RB offset (e.g., RB offset=0); and/or, a RB offset determined based on one or more cell-specific parameters (e.g., physical cell-ID).

In order to determine an RB offset value, a maximum RB offset value may be determined, used, configured, or predefined. For example, if a WTRU-ID is used for RB offset value determination, a modulo (mod) operation of WTRU-ID with a maximum RB offset value (max_RB_offset) may be used (mod stands for the modulus after division). As discussed herein, a modulo operation results in the remainder, where the modulo operation with A and B is where A may be the dividend and B may be divisor and interchangeably expressed as A mod B, (A) mod B, and/or mod (A, B).

For example, the RB offset value=$(n_{RNTI})$ mod max_RB_offset, where $n_{RNTI}$ may be C-RNTI or temporary C-RNTI, or alternatively, $n_{RNTI}$ may be the most significant bit (MSB) or the least significant bit (LSB) of C-RNTI or temporary C-RNTI. In either case, the max_RB_offset may be a maximum RB offset value. In some cases the max_RB_offset value may be implicitly determined based on one or more of the following: scheduled BW (e.g., number of RBs scheduled); PT-RS frequency density (e.g., PT-RS located in every K RBs), where K may be interchangeably used with $K_{PTRS}^{step}$ as discussed herein; and/or WTRU-specific parameters. In some cases the max_RB_offset value, which may be determined implicitly, may be overridden by a higher layer configured max_RB_offset value.

The RB offset value may be limited to a set of RB offsets that may be configured, determined, or used. Further, a subset of the set of RB offsets may be determined or used based on at least one of scheduled BW, frequency density, and/or WTRU-specific parameters. The RB offset may be limited to a set/subset and determined and/or configured in one or more methods as discussed herein.

In one method, a RB offset set may be defined, determined, or used based on the max_RB_offset value. For example, an RB offset set may be {0, 1, . . . , max_RB_offset} which would constitute the full set of possible values. In one instance, the max_RB_offset may be the frequency density K, where max_RB_offset=K, which would make the RB offset set {0, 1, . . . , K}.

In another method, a set and/or subset of the RB offset may be determined based on the scheduled bandwidth $N_{RB}$ and PT-RS frequency density K. In one example, a first subset may be {0} if a first condition is met where the first condition is $(N_{RB}+1)$ mod K=0. In another example, a second subset {0, 1} may be used if a second condition is met, where the second condition is $(N_{RB}+2)$ mod K=0. In another example, a set (i.e., full) of RB offset {0, 1, . . . , max_RB_offset}) may be used if a third condition is met, where the third condition is $(N_{RB})$ mod K=0.

In another method, the RB offset value may be determined based on the RB offset value=$(n_{RNTI})$ mod max_RB_offset_S, where max_RB_offset_S may be the number of RB offset values within a subset.

In another method, a subset of the RB offset set may be configured via higher layer signaling. For example, a bitmap may be used to indicate the subset of RB offset values.

In another approach for limiting the RB offset value, the max_RB_offset value for the RB offset set, where the RB offset set is the full set of values {0, 1, . . . , max_RB_offset}, may be determined based on the number of RBs that do not contain PT-RSs after the last RB containing a PT-RS where the RB offset=0. For example, referring back to FIG. 10, in scenario 1030 there are 16 RBs scheduled where the max_RB_offset value may be 3 since all of the RBs after the last RB 12 (i.e., RBs 13, 14, and 15) do not contain PT-RSs. In another example shown in scenario 1030, when 15 RBs are scheduled the max_RB_offset value may be 2 since that is the number RBs after the $12^{th}$ RB, RB 13 and 14, that do not contain a PT-RS. In this approach, one method be where the max_RB_offset is determined as max_RB_offset=K−$N_{RB}$ mod K−1, where K may be determined based on the frequency density (e.g., where PT-RS is located every K RBs) and/or $N_{RB}$ may be number of scheduled RBs. In another method, the RB offset value=$(n_{RNTI})$ mod max_RB_offset.

Figure 11A:
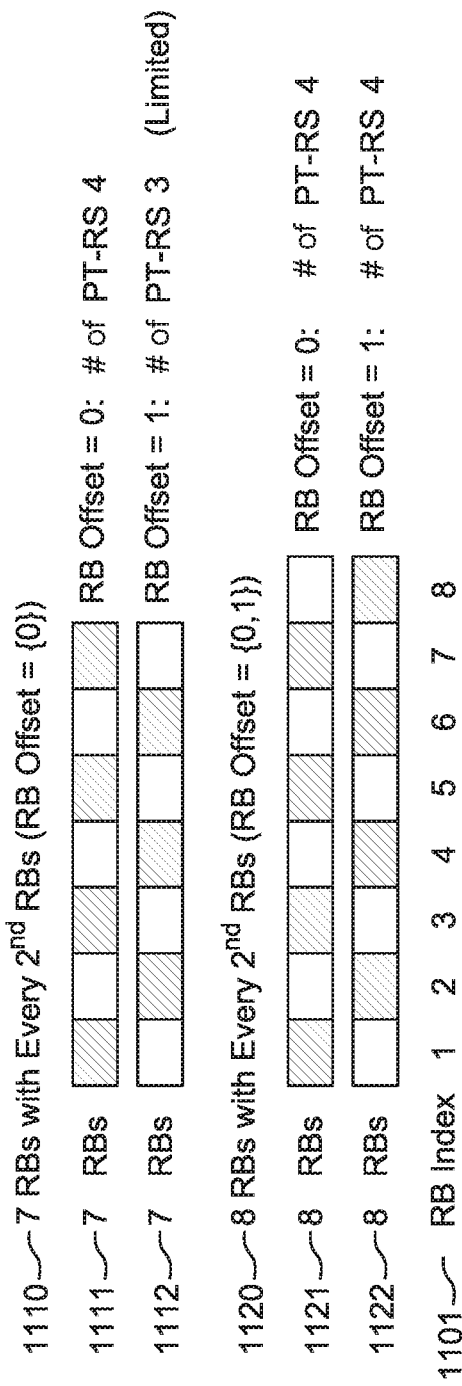
FIG. 11A is a diagram of an example of RB offset values.

FIG. 11A shows an example of max_RB_offset value determination (or limitation/restriction) based on scheduled RBs and PT-RS frequency density. Just as in FIG. 10, the shaded blocks may represent a PT-RS in a RB. In scenario 1120 there may be 8 RBs and a PT-RS in every $2^{nd}$ RB (i.e., K=2): as shown in line 1121, when the offset is 0 the total number of PT-RS may be 4; and as shown in line 1122, when the offset is 1 the number of PT-RS may still be 4. Note, that in scenario 1120 the PT-RS density divides evenly into the number of scheduled RBs with no remainder (i.e., $N_{RB}$ mod K=0), which results in the max_RB_offset being equal to the PT-RS density K=2; said another way, when K=2, then the RB offset would be the first two possible values, where the values start at 0, therefore the set of values would be {0,1}. More generally, this may be written as when $N_{RB}$ mod K=0, then max_RB_offset=K.

In scenario 1110 there may be 7 RBs and a PT-RS density of one in every $2^{nd}$ RB (i.e., K=2). Note here that the PT-RS density does not divide evenly into the number of scheduled RBs (i.e., $N_{RB}$ mod K≠0). Consequently, when the RB offset is 0 the total number of PT-RS may be 4 as shown in line 1111; and when the offset is 1 the total PT-RS decreases to 3 (i.e., the RB offset value has limited the number of PT-RS).

In some cases, the number of PT-RS for a scheduled bandwidth would preferably be the same to avoid performance degradation for a WTRU. Therefore, situations where a different number of PT-RSs exist for the same scheduled bandwidth as shown in the line 1112 may want to be avoided. In order to ensure the number of PT-RS stays the same, the full possible set of RB offset values, max_RB_offset, may need to be limited. For example, where the RB offset may be based on the WTRU-ID as discussed herein (i.e., $n_{RNTI}$ mod max_RB_offset), limiting the max_RB_offset may enable the ability to keep the number of PT-RS the same for a given number of scheduled RBs. As shown with scenario 1120, limiting the max_RB_offset may only be necessary when the PT-RS density does not divide evenly into the number of scheduled RBs (i.e., $N_{RB}$ mod K≠0). In the scenario of 1110, the max_RB_offset may be limited to a function of the PT-RS density and the number of scheduled RBs; specifically, the max_RB_offset may be limited to the remainder of the PT-RS density divided into the number of scheduled RBs, which would be 7 mod 2, which equal 1. As discussed above, a numerical value for max_RB_offset, such as 1, results in a limited set (i.e., subset) of RB offset values, where any RB offset value starts at 0. It follows then, if max_RB_offset is limited to 1, then the subset of max_RB_offset would be {0}, meaning, that any RB offset greater than 0, such as shown in line 1112 with RB offset values {0,1}, would result in having a different number of total PT-RSs. More generally, this may be written as when $N_{RB}$ mod K≠0, then max_RB_offset=$N_{RB}$ mod K.

Figure 11B:
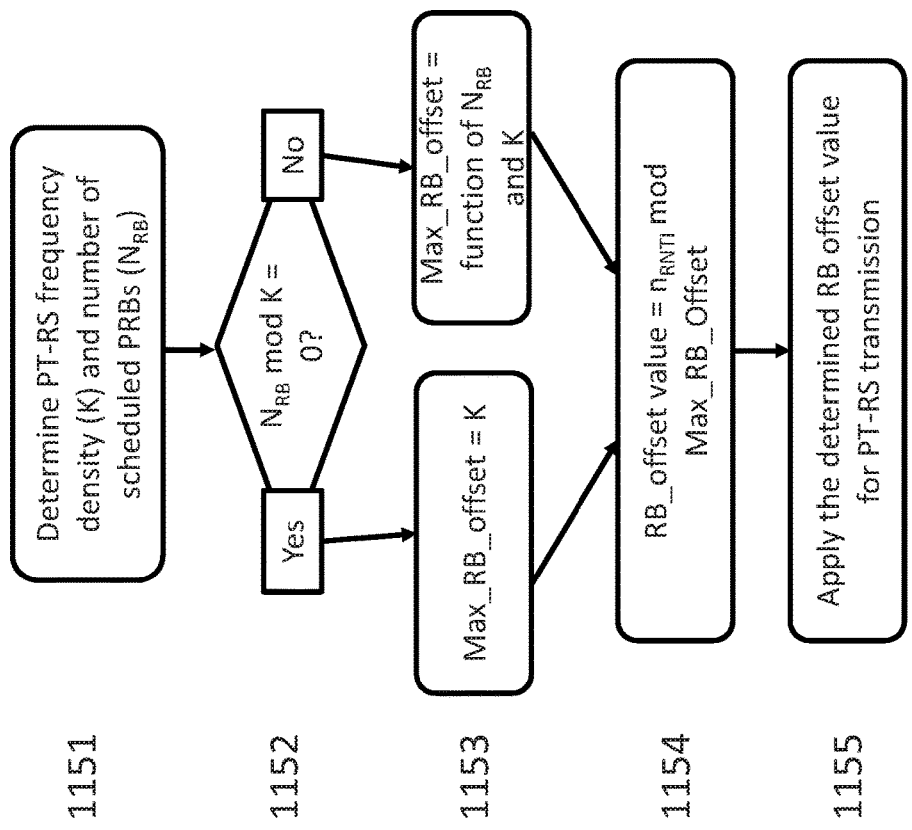
FIG. 11B is a diagram of an example process for maintaining the same number of PT-RSs for a scheduled bandwidth.

FIG. 11B illustrates an example process of sending a PT-RS transmission to ensure the PT-RS density K remains the same to address possible issues discussed with regard to FIG. 11A. In a first step 1151 the PT-RS density K and the number of scheduled RBs $N_{RB}$ may be determined. In one case, a device, such as a WTRU, may have a certain bandwidth scheduled (i.e., control information is received on a control channel). The WTRU may determine the PT-RS density K based on the scheduled bandwidth. If At step 1152, if PT-RS density K divides evenly into the number of scheduled RBs NRB, then at step 1152 the max_RB_offset may be equal to the PT-RS density, or if it does not, then the max_RB_offset may be a function of the PT-RS density and the number of scheduled RBs. At step 1154, the RB offset value may be determined depending on the result of step 1153. At step 1155, once the RB offset is determined, this information can be used to transmit and/or receive a transmission with PT-RS.

In another approach for limiting the RB offset value, if the max_RB_offset value is smaller than K, there may be one or more methods that apply to randomize interference with a restricted/limited set of RB offset values. There may be one or methods that can follow this approach.

In one method an RE location, or a subframe location, of a PT-RS within a RB may be determined based on one or more WTRU-specific parameters. For example, when the RB offset values are restricted/limited the RE location of a PT-RS within an RB may be determined on WTRU-specific parameters, and when the RB offset values are not restricted/limited (e.g., max_RB_offset=K), an RE location of a PT-RS within an RB may be determined based on non-WTRU-specific parameters (e.g., fixed, predefined, cell-specific parameters).

In another method, a PT-RS scrambling sequence may be determined based on one or more WTRU-specific parameters. For example, a PT-RS scrambling sequence may be initialized based on non-WTRU-specific parameters when the RB offset values are not restricted and the PT-RS scrambling sequence may be initialized based on one or more WTRU-specific parameters when the RB offset values are restricted.

In another method, a PT-RS time location (e.g., start symbol index) may be determined based on one or more WTRU-specific parameters. For example, a first symbol index may be used as a starting symbol for PT-RS transmission when the RB offset values are not restricted, and a second symbol index may be used as a starting symbol for PT-RS transmission when the RB offset values are restricted. The first symbol index may be fixed, configured, and/or predefined and the second symbol index may be determined based on one or more WTRU-specific parameters.

Figure 12:
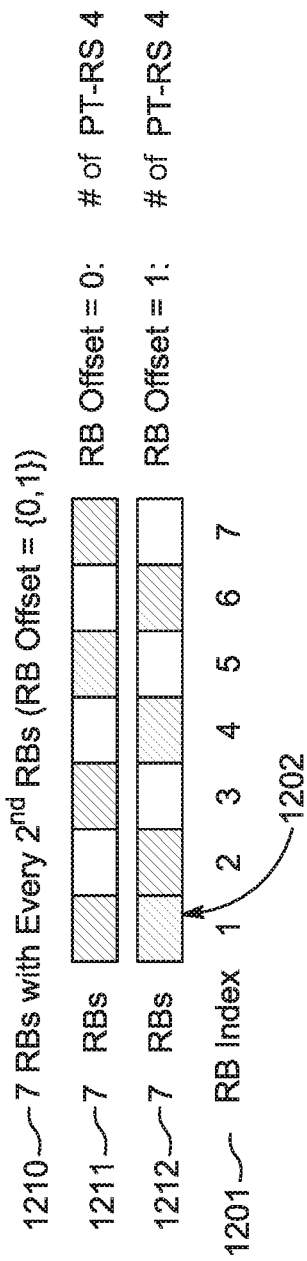
FIG. 12 is a diagram of an example cyclic shift of RBs containing PT-RS.

FIG. 12 illustrates an example of cyclic shifting RBs containing PT-RS. In this approach a RB offset set may be defined, determined, or used with set {0, 1, . . . , max_RB_offset} where the max_RB_offset may be K (e.g., the PT-RS density); the RBs that contain PT-RS may be cyclically shifted based on the RB offset value. Therefore, the number of RBs containing PT-RS may be the same irrespective of the RB offset value. Scenario 1210 shows several instances of slots with 7 RBs with a PT-RS in every $2^{nd}$ RB. In one instance 1211 the RBs containing PT-RS may be evenly distributed where the RB offset is 0, which results in a PT-RS density of 4. In another instance 1212 the RB offset may be 1 and the RBs containing PT-RS may not be evenly distributed where one PT-RS RB 1202 has been shifted and is adjacent to another PT-RS RB but the PT-RS density is still 4. Additionally, the cyclic shift value may be determined based on one or more WTRU-specific parameters. For example, the PT-RS not assigned to a RB due to RB offset value may be located in one of the RBs not containing PT-RS, wherein the RB location may be determined based on a WTRU-ID (e.g., C-RNTI).

In some cases, the reference locations of RBs containing PT-RS may be based on RB offset=0, where the number of RBs containing PT-RS may be the same as the case of RB offset=0 irrespective of the RB offset value determined and where the PT-RS density may be 4.

In one approach, power boosting PT-RS may be used when the number of RBs used for PT-RS for an RB offset is smaller than that for a reference RB offset. For example, a reference RB offset may be defined, configured, or used with RB offset=0 and the number of RBs used for PT-RS may be $K_p$ when RB offset=0. If the number of RBs used for PT-RS for a certain RB offset is smaller than $K_p$, power boosting of PT-RS may be used. In this approach, a first power level may be used for PT-RS when the number of RBs containing PT-RS is the same as $K_p$ for a first RB offset value; a second power level (e.g., higher than the first power level) may be used for PT-RS when the number of RBs containing PT-RS is smaller than $K_p$ for a second RB offset value. The second power level may be determined based on the ratio between the number of RBs containing PT-RS for a certain RB offset value and $K_p$.

Also in this approach constellation points may be correlated to the offset value, first constellation points (e.g., QPSK constellation) may be used for the PT-RS sequence when the number of RBs containing PT-RS is the same as $K_p$ for a first RB offset value; second constellation points (e.g., outermost constellation points of 16QAM, 64QAM, or 256QAM) may be used when the number of RBs containing PT-RS is smaller than $K_p$ for a second RB offset value. The modulation order (e.g., 16QAM, 64QAM, or 256QAM) for outermost constellation points may be determined based on the ratio between the number of RBs containing PT-RS for a certain RB offset value ($K_a$) and $K_p$. For example, a first modulation order (e.g., 16QAM) may be used if $K_a/K_p$ is larger than a predefined threshold; a second modulation order (e.g., 64QAM) may be used if $K_a/K_p$ is less than predefined threshold. The modulation order for the outermost constellation points may be determined based on the modulation order indicated, determined, or scheduled for the associated data channel (e.g., PDSCH or PUSCH).

In one scenario, RB offset values may be used to shift the PT-RS from a default RB location to a different RB, such as a fixed number of RB away from the default RB location, to avoid a source of intra or inter cell interference from other transmitters of PT-RS in the same RB location. If significant PT-RS based interference is present, the time and frequency of the PT-RS density may be modified or changed to avoid or reduce the interference level. For example, the following Table 4 illustrates the combinations of RB offset and PT-RS frequency density possible assuming both transmitters use PT-RS time density=1 (e.g., PT-RS transmitted every symbol).

TABLE 4

An example of PT-RS time/frequency density based on RB offset

| PT-RS Frequency Density | | |
| --- | --- | --- |
| Interfering PT-RS | Serving PT-RS | RB Offset |
| 1 | 1 | 0 |
| 1 | 2 | 0 |
| 1 | 4 | 0 |
| 2 | 1 | 0 |
| 2 | 2 | 1 |
| 2 | 4 | 1 |
| 4 | 1 | 0 |
| 4 | 2 | 1 or 3 |
| 4 | 4 | 1, 2, or 3 |

For this scenario, the frequency density of one or more interference sources (e.g., co-scheduled WTRU or neighbor cell) may be indicated to a WTRU via higher layer signaling or L1 signaling (e.g., DCI). For this indication to the WTRU, one or more approaches may be applicable.

In one approach, a WTRU may receive the frequency density of an interfering PT-RS in an associated DCI for data scheduling and the PT-RS density (e.g., serving PT-RS time and/or frequency density) for the WTRU may be determined based on the frequency density of the interfering PT-RS. If the interfering PT-RS density is increased, the serving PT-RS density may also be increased. Alternatively, if the interfering PT-RS density is increased, the serving PT-RS density may be decreased.

In another approach, a set of RB offset values may be limited based on the interfering PT-RS density. For example, a smaller set of RB offset values may be used if the interfering PT-RS density is lower and a larger set of RB offset values may be used if the interfering PT-RS density is higher. In a further example, if an interfering PT-RS density is low (e.g., 1), a first subset of RB offset values (e.g., {0}) may be used and if an interfering PT-RS density is medium (e.g., 2), a second subset of RB offset values (e.g., {0, 1}) may be used; if an interfering PT-RS density is high (e.g., 4), a third subset of RB offset values (e.g., {0, 1, 2, 3}) may be used.

In another approach, a set of RB offset values may be limited based on an interfering PT-RS density and a serving PT-RS density.

Similar options for RB offset may be possible if either one of the transmitters uses a PT-RS time density <1 (e.g., an OFDM symbol offset). Also, an OFDM symbol offset may be needed to handle $D_M$-RS based interference to PT-RS. Another possibility is to use subcarrier offsets for PT-RS within a RB.

Figure 13:
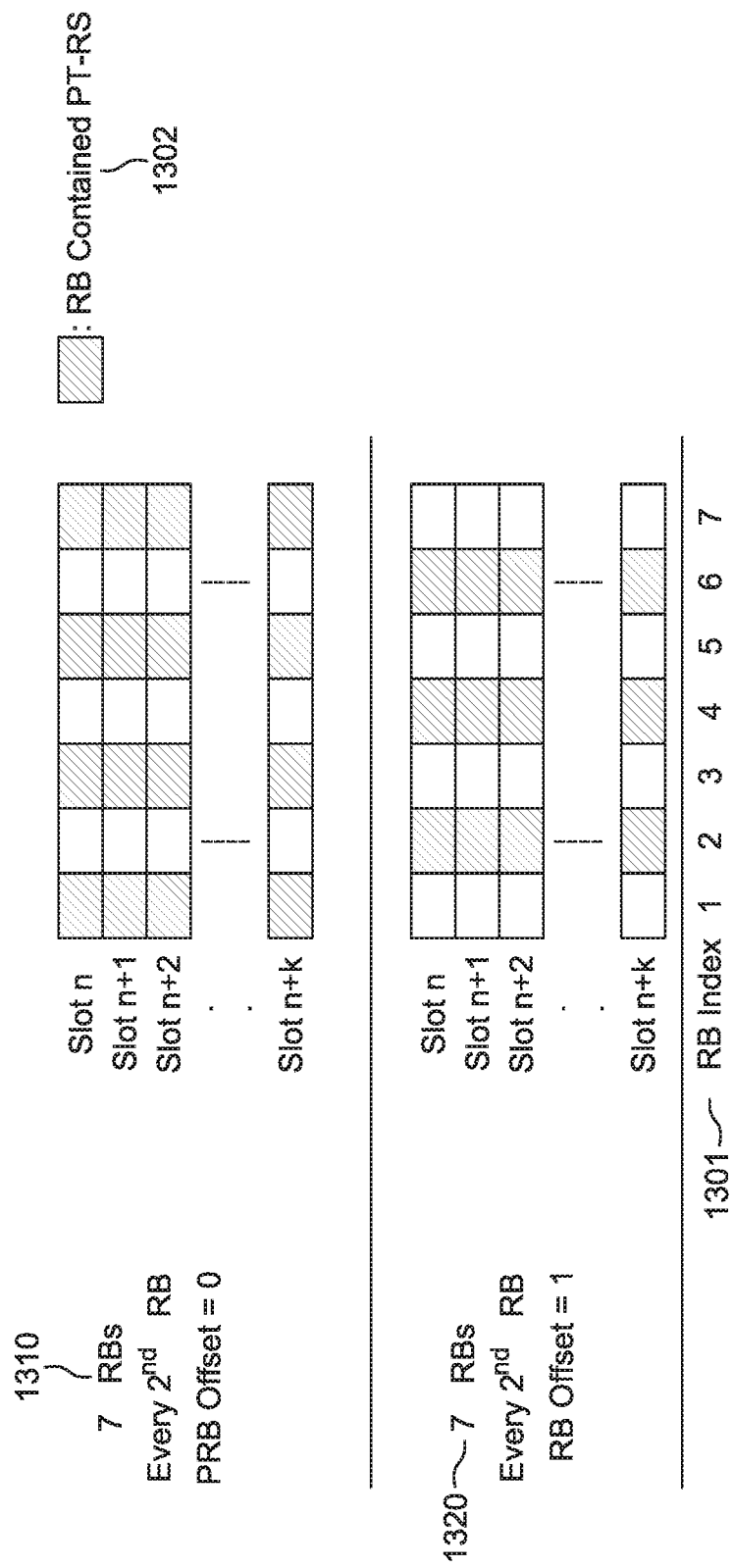
FIG. 13 is a diagram of an example of PT-RS mapping for 7 RBs with different RB offset values.

FIG. 13 illustrates an example of a PT-RS mapping for 7 RB with different RB offset values. In this approach, an RB offset may be determined based on a C-RNTI and/or a subframe/slot number or index. For perspective, referring back to FIG. 2 for the PT-RS mapping with different PT-RS densities of $K_{PTRS}^{step}$=1, 2, and 4 RBs was shown; since there was a PT-RS in the starting scheduled RB location the RB offset may be assumed to be 0 since there is a PT-RS RB in the first index. Therefore, for any configuration where rem($N_{RB}/K_{PTRS}^{step}$)≠0, the PT-RS density per slot may vary based on the RB offset value. Now looking at the examples shown in FIG. 13, there are PT-RS mappings for each for $N_{RB}$=7 RBs each with different RB offset values of 0 RB in scenario 1310 and 1 RB in scenario 1320. For scenario 1310 there is a RB every $2^{nd}$ RB and the RB offset may be 0, which may results in a PT-RS density of 4; for scenario 1320 there is a RB every $2^{nd}$ RB and the RB offset may be 1, which may result in a PT-RS density of 3. As demonstrated, in the configuration with RB offset=1, the overall number of PT-RS will become less than the case when RB offset=0, which may lead to some performance degradation.

Figure 14:
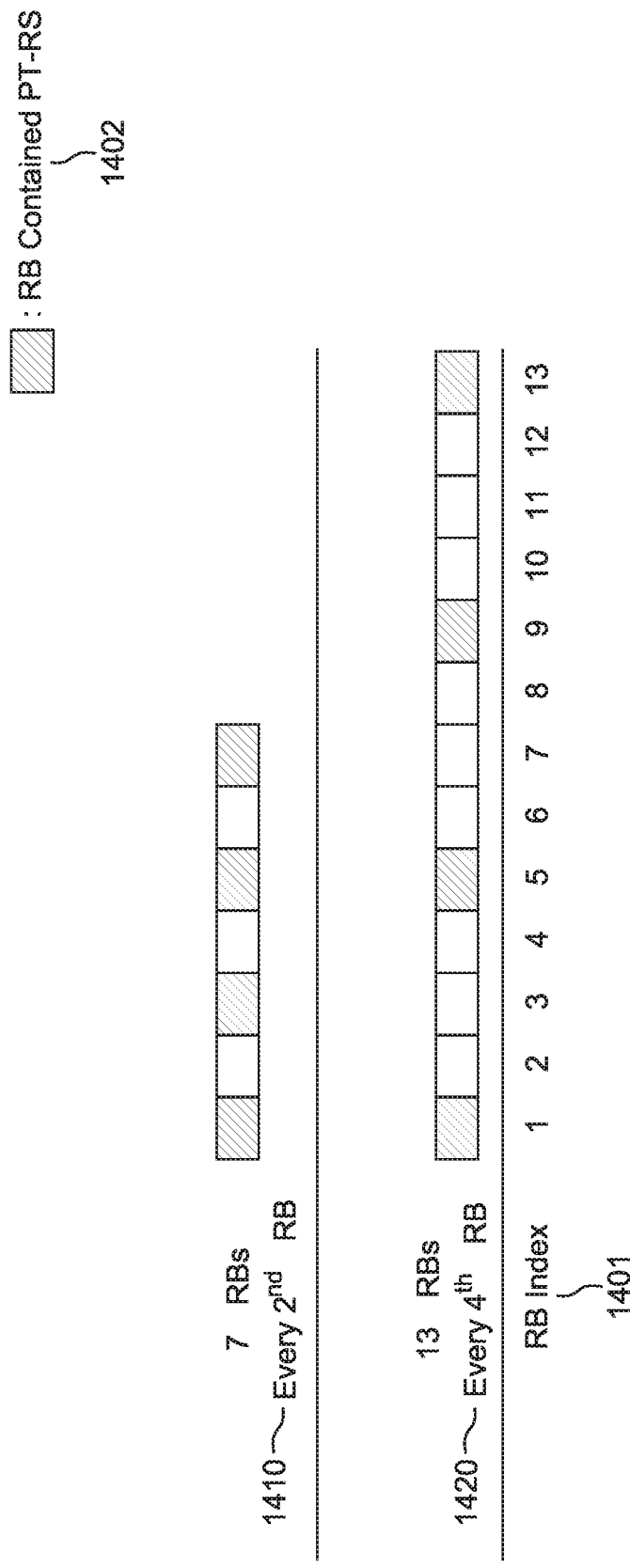
FIG. 14 is a diagram of an example PT-RS mapping for 7 RBs and 13 RBs wide scheduling.

FIG. 14 illustrates an example of a PT-RS mapping with different RB widths of schedules. In a scenario 1410 there may be 7 RBs with a PT-RS every $2^{nd}$ RB resulting in a density of 4. In scenario 1420 there may be 13 RBs with a PT-RS every 4th RB resulting in a density of 4; such a configuration may have even more impact on the performance since the scheduling is so spread out.

Figure 15:
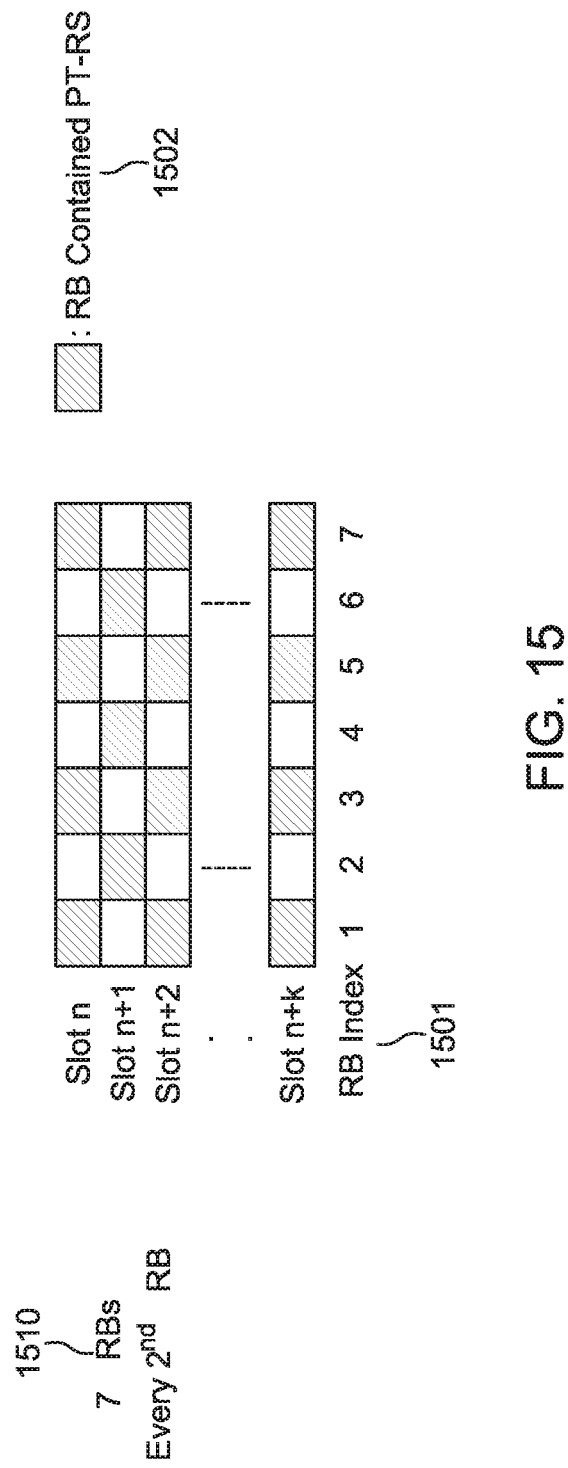
FIG. 15 is a diagram of an example PT-RS mapping for 7 RBs with dynamic RB offset values.

FIG. 15 illustrates an example PT-RS mapping for 7 dynamic RB offset values. In this approach the RB offset value may be adjusted or determined dynamically based on a time index to have an equal average of PT-RS over the duration of the transmission. For the scenario 1510, there may be 7 RBs with a PT-RS every $2^{nd}$ RB. The time index may be at least one of frame number ($n_{Frame}$), slot number ($n_{Slot}$), or symbol number ($n_{Sym}$). For example, an initial RB offset may be determined based on the C-RNTI, and then an additional RB offset may be applied based on the $n_{slot}$ where $n_{slot}$ is the slot number corresponding to the current transmission. Scenario 1510 shows an exemplary implementation based on setting the offset value based on off/even slot number that results in each increment in slot (i.e., slot n, slot n+1, slot n+2, ... slot n+k) alternating the RB offset value which also effects the PT-RS density (i.e., the density alternating between 4 and 3, based on an offset value of 0 and 1, respectively). The slot number may be a slot number within a radio frame or an absolute number. In an alternative example, the RB offset value may jointly be defined based on the C-RNTI and a time index or the like. In another example, the RB offset adjustment may be applied only to the configurations that exhibit unequal distribution, or universally applied on all configurations regardless of the impact of the offset value.

Figure 16:
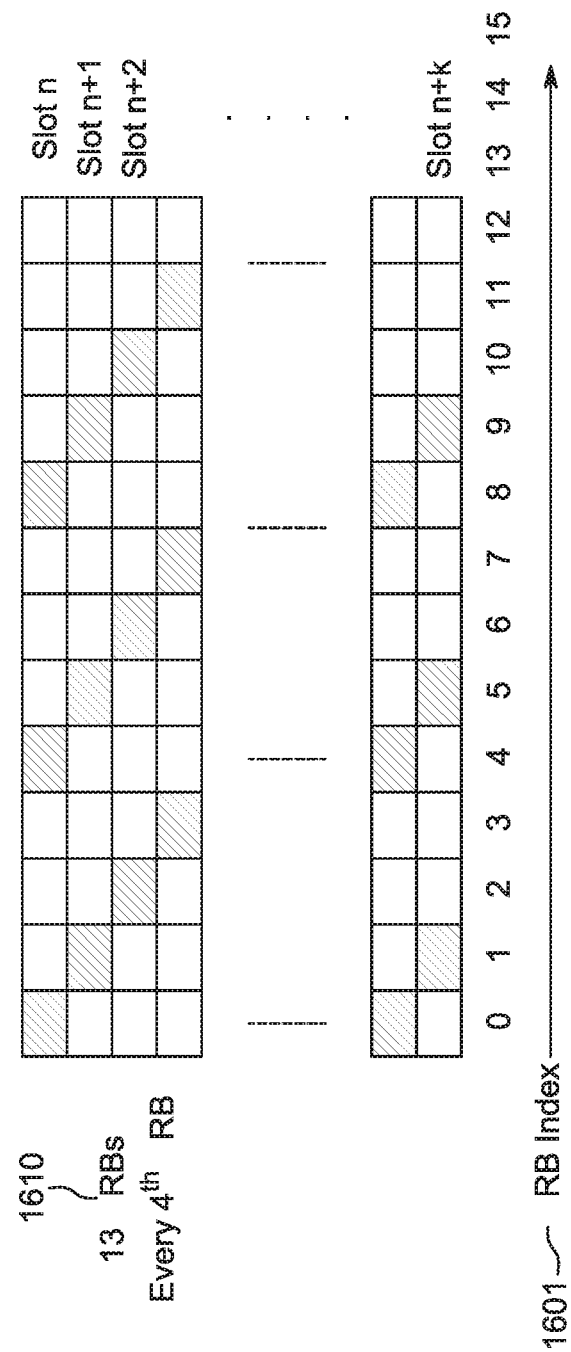
FIG. 16 is a diagram of an example of PT-RS mapping for 13 RBs transmission with dynamic RB offset values.

FIG. 16 illustrates an example of PT-RS mapping for 13 RBs per slot and with dynamic RB offset values. In this case, the RB offset value may be adjusted dynamically based on a time index to counter the impact of frequency selective fading. As such, regardless of the impact of the PT-RS density, the RB offset may be dynamically changed for all configurations to avoid experiencing long fading. The scenario 1610 shows 13 RBs for each slot with every 4th a PT-RS RB (i.e., where $K_{PTRS}^{step}$=4). The time index may be based on $n_{Frame}$, $K_{PTRS}^{step}$, $n_{slot}$, or $n_{sym}$, etc., or a combination there of. For example, an initial RB offset may be determined based on the C-RNTI, and then an additional RB offset may be applied to shift the location of the PT-RS RB per slot or based on slot number. The RB offset may be determined based on $n_{slot}$ and $K_{PTRS}^{step}$, where the additional offset may be defined as $\text{rem}(n_{slot}/K_{PTRS}^{step})$. As shown, the RB offset increases with each slot number: so slot n the RB offset is 0, slot n+1 the offset is 1, slot n+2 the RB offset is 2, and slot n+3 the RB offset is 3. Note that once the RB offset is 3, in the next slot, n+4, the RB offset would go back to 0 since the PT-RS density is only 4 and you cannot have an RB offset of 4 without having a PT-RS density of at least 5, which is not envisioned in this example.

In an embodiment, the PT-RS density may be dependent on frequency resource allocation type. Modulated information symbols may sometimes be mapped to time and frequency resources before transmission. Multiple information symbols may be mapped to discrete, contiguous time and frequency blocks. In LTE and NR, a modulated information symbol may be mapped to a time and frequency unit called a Resource Element (RE). A RE may comprise one subcarrier in one OFDM symbol. A block REs including 12 contiguous subcarrier (i.e., in frequency) by 7 OFDM symbols (i.e., a slot may comprise a RB). When individual, or multiple RBs are mapped contiguously or non-contiguously in time and frequency, they are considered to have a localized or distributed resource allocation type, respectively. Since PT-RS may be mapped within allocated RBs that can have a localized or distributed resource allocation type, PT-RS density in time and frequency may be dependent upon that type. Therefore, in at least some circumstances there is a need to make PT-RS time and frequency density also dependent upon whether localized or distributed resource allocation type is used.

Figure 17:
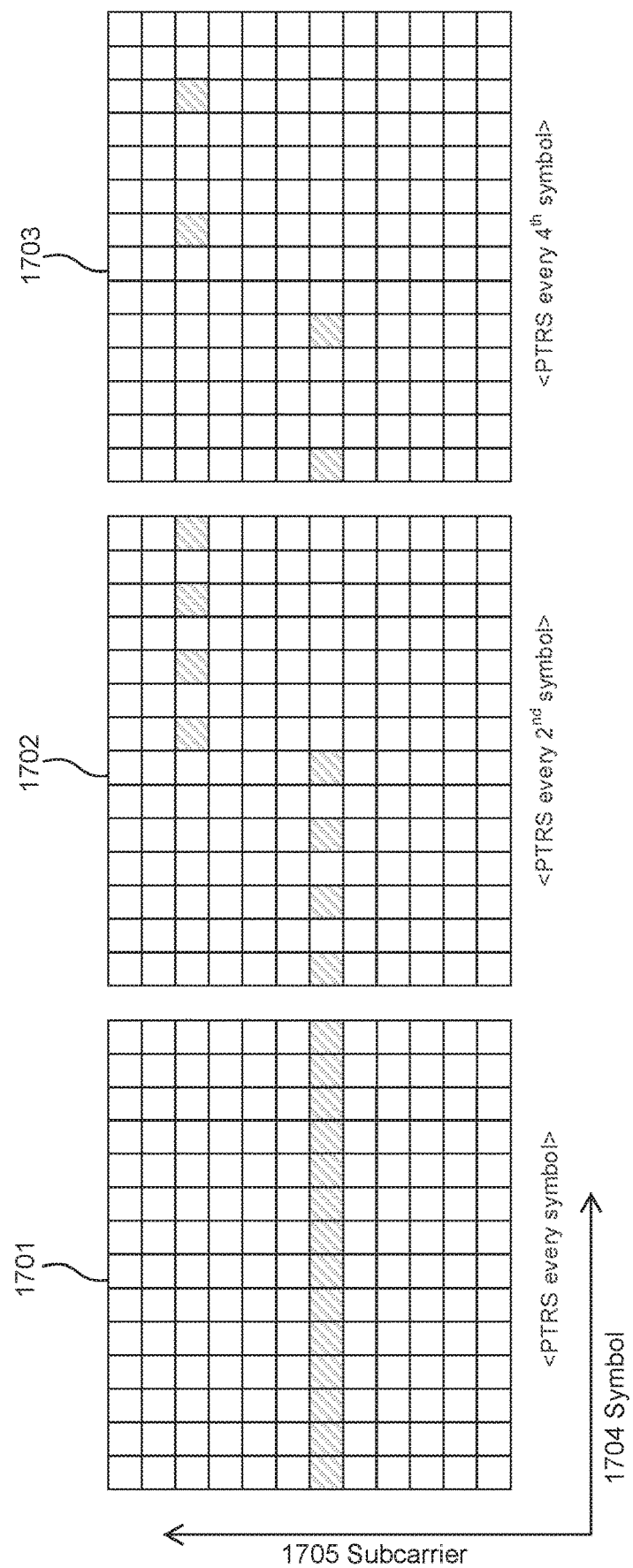
FIG. 17 is a diagram of an example PT-RS frequency location based on symbol location.

FIG. 17 illustrates an example of PT-RS frequency location based on symbol location. Just as in FIG. 2, the horizontal axis 1704 is symbols (i.e., OFDM) and the vertical axis 1705 is subcarriers. Regardless of whether the NR resource allocation types 0 and 1 indicate that a localized or distributed allocation is required, PT-RS time and frequency densities may be maintained. If RBs are distributed in time during a transmission interval, the PT-RS time density, which may in some cases apply for a localized allocation, may apply to each time region separately as shown in FIG. 17. If RBs are distributed in frequency during a transmission interval, the PT-RS frequency density, which may in some cases apply for a localized allocation, may apply to each frequency region of continuously allocated resource blocks or a Resource Block Group (RBG) separately (i.e., for the carrier bandwidth part used). For example 1701 there may be a PT-RS every symbol which does not exhibit any change. For example 1702 there may be a PT-RS density of every other symbol (i.e., every $2^{nd}$ symbol), which may restart when the frequency changes due to a different frequency region beginning at the halfway 1712. For example 1703, there may be a PT-RS symbol every $4^{th}$ symbol, which may restart when the frequency changes due to a different frequency region beginning at the halfway 1713.

Figure 18:
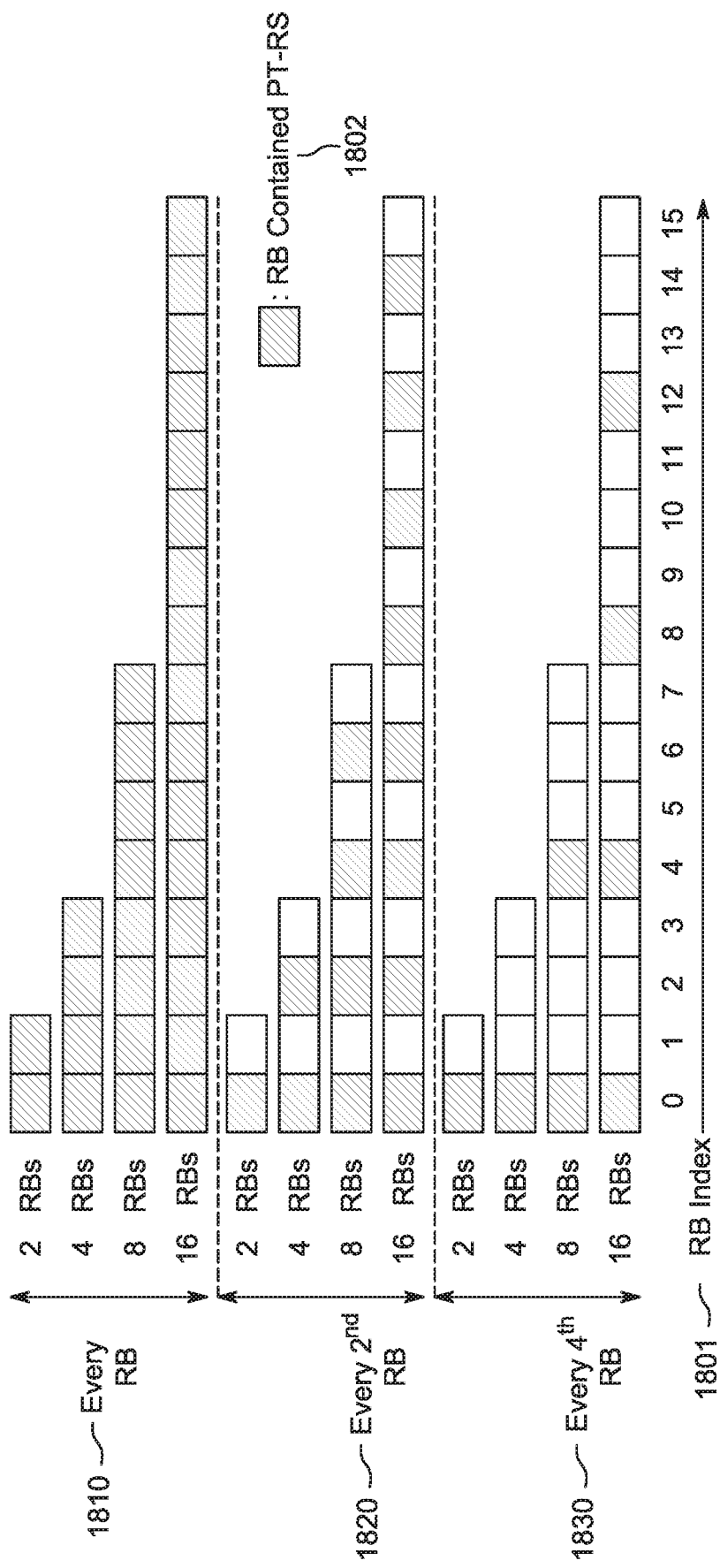
FIG. 18 is a diagram of an example PT-RS frequency density based on RBG.

FIG. 18 illustrates an example of PT-RS frequency density based on RBG. The frequency density may be determined based on RBG size that has been configured or determined, and for each scenario of FIG. 18 there may be a different RBG. In scenario 1810, there may be a PT-RS every RB with a density of every RB. For Scenario 1820 there may be a different RBG with a different density of every $2^{nd}$ RB. For scenario 1830, there may again be a different RBG with a different density of every $4^{th}$ RB.

In an embodiment, the RE location (e.g. subcarrier location, RE offset) of PT-RS within a RB containing PT-RS may be determined based on at least one of the physical cell-ID, WTRU-ID (e.g., C-RNTI, temporary C-RNTI, or IMSI), frequency density of PT-RS, time density of PT-RS, and max_RB_offset value. For example, if the max_RB_offset value is a first value (e.g., 0), the RE location (or RE offset) may be determined based on the WTRU-ID and if the max_RB_offset value is a second value (e.g., >0), the RE location (or RE offset) may be determined based on cell-ID. Alternatively, if the max_RB_offset value is a first value, the RE location (or RE offset) may be determined based on frequency density of PT-RS and if the max_RB_offset value is a second value, the RE location (or RE offset) may be determined based on cell-ID.

Figure 19:
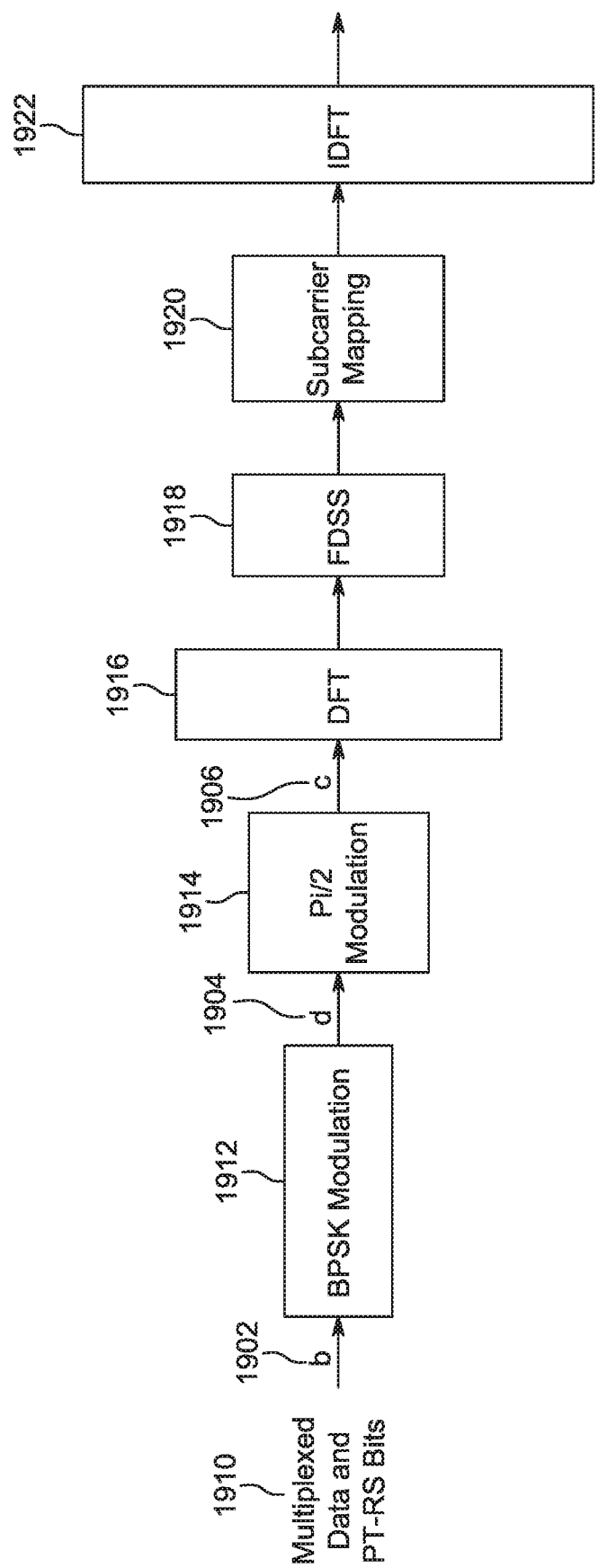
FIG. 19 is a diagram of an example PT-RS generation for pi/2 BPSK data modulation.

FIG. 19 illustrates an example of PT-RS generation for of π/2-BPSK data modulation. For binary phase shift keying (BPSK) modulation 1912, bit sequence b(n) may be mapped to a complex-valued modulation symbol x based on $$x = \frac{1}{\sqrt{2}}[(1-2b(n)) + j(1-2b(n))]$$

In case of π/2-BPSK modulation 1914, bit sequence b(n), where n is the index (i.e., location), may be mapped to a complex-valued modulation symbol x based on $$x = e^{jn\pi/2}\frac{1}{\sqrt{2}}[(1-2b(n)) + j(1-2b(n))]$$

where $j = \sqrt{-1}$.

As discussed herein, π and pi may be interchangeably used. As seen in FIG. 19, there may be a PT-RS sequence design where the modulation order for the associated data (e.g., PDSCH or PUSCH) may be pi/2 BPSK. PT-RS bits consisting of zeros and ones may be multiplexed 1910 with data bits according to a predefined pattern. The resulting multiplexed bits b 1902 may go through BPSK modulation 1912 resulting in d 1904 and then pi/2 modulation 1914 resulting in c 1906. Decoupling the BPSK and pi/2 modulations may be beneficial if an orthogonal cover code (OCC) is to be applied over the PT-RS bits. After the pi/2 modulation 1914, the resultant symbols may be processed by a DFT block 1916 and an optional frequency domain spectral shaping (FDSS) 1918, which may be implemented either after or before the DFT 1916. Then, the shaped symbols may be mapped 1920 to the allocated subcarriers, and go through IDFT processing block 1922 to be ready for transmission in an OFDM symbol.

FIG. 19 may be further elaborated with the following example: assume that the DFT size is set to N=12 (e.g., total number of data and PT-RS bits) due to the allocated resources and that the PT-RS bits will be inserted in two chunks at the head and tail of a sequence b 1902, and that each chunk consists of 2 bits; then, the multiplexed vector of data and PT-RS bits 1910 may be written as b=[X, X, 8 data bits, Y, Y] where X, Y, and data bits are either 0 or 1. Note, that in general the PT-RS bits in each chunk do not have to be the same, so in this example it could be values X1, X2, Y1, and Y2, where there are different X values and Y values. For the sake of illustration, there may be values for b=[1, 1, 0, 0, 1, 1, 0, 1, 0, 1, 11] and after BPSK modulation 1912 of b 1902, the modulated sequence may become d 1904 as shown in Table 5 below, where the following notation is used: $1i = \sqrt{-1}$.

TABLE 5

Example of data and PT-RS bits after BPSK modulation

−0.7071 − 0.7071i
−0.7071 − 0.7071i
0.7071 + 0.7071i
0.7071 + 0.7071i
−0.7071 − 0.7071i
−0.7071 − 0.7071i
0.7071 + 0.7071i
−0.7071 − 0.7071i
0.7071 + 0.7071i
−0.7071 − 0.7071i
−0.7071 − 0.7071i
−0.7071 − 0.7071i

Then, the sequence d 1904 is multiplied element-to-element (Hadamard product) with the vector $$p(n) = e^{(\frac{j\pi}{2})n},$$

n=0, . . . , N−1 to perform pi/2 modulation 1914 resulting in c 1906. Note, that p(n) may be written slightly differently, so long as it represents the pi/2 modulation. An example of the calculated values for p(n) is given in Table 6 below.

TABLE 6

Example of p(n)

1.0000 + 0.0000i
0.0000 + 1.0000i
−1.0000 + 0.0000i
−0.0000 − 1.0000i
1.0000 − 0.0000i
0.0000 + 1.0000i
−1.0000 + 0.0000i
−0.0000 − 1.0000i
1.0000 − 0.0000i
0.0000 + 1.0000i
−1.0000 + 0.0000i
−0.0000 − 1.0000i

Then, we get c=d⊙p as shown in Table 7 below.

TABLE 7

Example of pi/2 BPSK modulated PT-RS/data bits

−0.7071 − 0.7071i
0.7071 − 0.7071i
−0.7071 − 0.7071i
0.7071 − 0.7071i
−0.7071 − 0.7071i
0.7071 − 0.7071i
−0.7071 − 0.7071i
−0.7071 + 0.7071i
0.7071 + 0.7071i
−0.7071 − 0.7071i
0.7071 + 0.7071i
−0.7071 + 0.7071i

Figure 20:
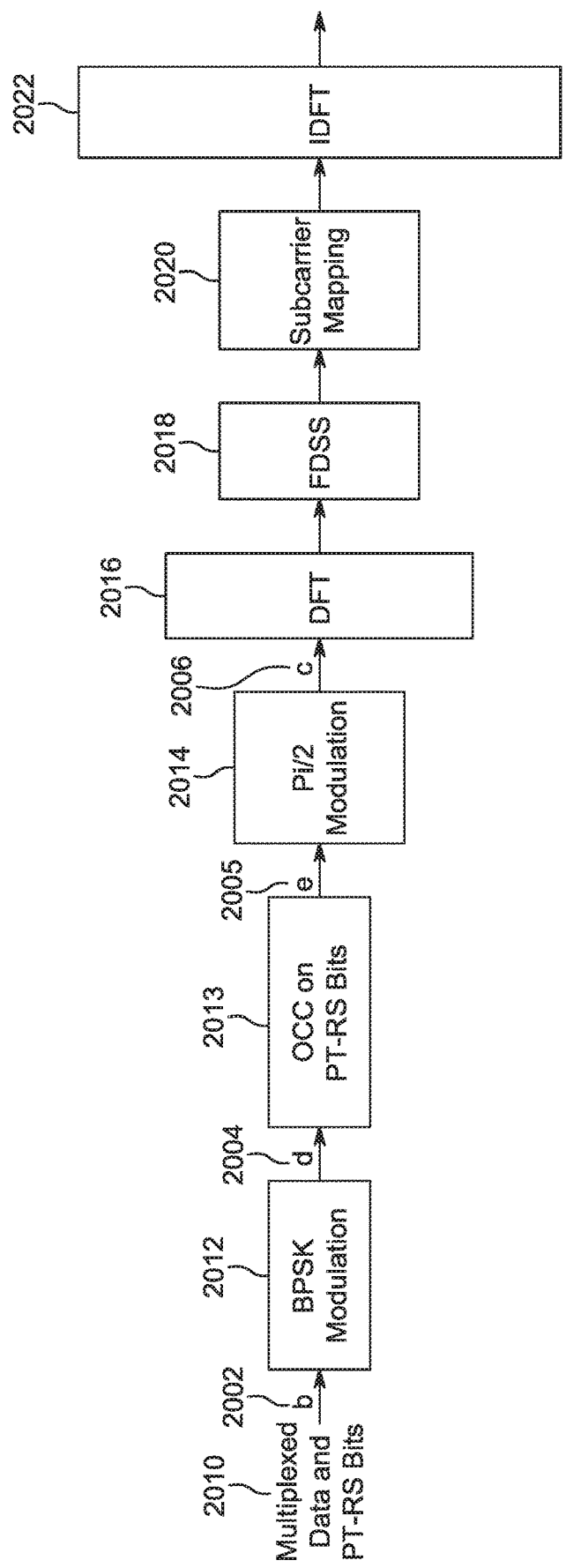
FIG. 20 is a diagram of an example PT-RS generation for pi/2 BPSK data modulation and OCC.

FIG. 20 illustrates an example of PT-RS generation for pi/2 BPSK data modulation and OCC. As discussed herein, some elements may be interpreted to be similar if they use the same last two digits, such as in FIG. 19 and FIG. 20. Further, FIG. 20 may be similar to FIG. 19 but for when the PT-RS bits are transmitted in chunks, an orthogonal cover code (OCC) may be applied over the PT-RS bits within the chunk. Note that the bits which are multiplied by the OCC may be the same. In such a scenario, the OCC may be applied to the PT-RS bits after the BPSK modulation 2012 but before the pi/2 modulation 2013 (i.e., on the sequence d 2004) resulting in OCC'd PT-RS bits e 2005 (i.e., vector e). Note that applying the OCC after the pi/2 modulation may destroy the phase continuity of the signal and result in a signal with a larger peak to average power ratio.

To further elaborate, assume for an example that the chunk size is 2 and the OCCs to be applied are [1 1] and [1 −1]. The two PT-RS bits in each chunk in d 2004 may be multiplied with one of these OCCs 2013. Continuing with the example if the OCC is [1 1], then the vector e 2005 will be as shown in Table 8 below.

TABLE 8

Example of applying [1 1] OCC on PT-RS bits after BPSK modulation (−0.7071 − 0.7071i) × 1
(−0.7071 − 0.7071i) × 1
0.7071 + 0.7071i
0.7071 + 0.7071i
−0.7071 − 0.7071i
−0.7071 − 0.7071i
0.7071 + 0.7071i
−0.7071 − 0.7071i
0.7071 + 0.7071i
−0.7071 − 0.7071i
(−0.7071 − 0.7071i) × 1
(−0.7071 − 0.7071i) × 1

If the OCC is [1 −1], then the vector e 2005 will be as shown in Table 9 below.

TABLE 9

Example of applying [1 −1] OCC on PT-RS bits after BPSK modulation (−0.7071 − 0.7071i) × 1
(−0.7071 − 0.7071i) × −1
0.7071 + 0.7071i
0.7071 + 0.7071i
−0.7071 − 0.7071i
−0.7071 − 0.7071i
0.7071 + 0.7071i
−0.7071 − 0.7071i
0.7071 + 0.7071i
−0.7071 − 0.7071i
(−0.7071 − 0.7071i) × 1
(−0.7071 − 0.7071i) × −1

The OCCs applied to each chunk of PT-RS bits by a given WTRU may be the same for all chunks or different for one or more chunks. As an example, with two chunks and two bits, the OCC codes applied by a WTRU may be {[1 1], [1 1]} or {[1 −1], [1 −1]}, or {[1 1], [1 −1], or {[1 −1], [1 1]}.

If the same OCC is applied over all chunks, the index of the code may be signaled or determined implicitly using another parameter, for example the WTRU ID. As an example, mod(WTRU ID, 2) may determine one of the two OCCs while mod(WTRU ID, 4) may determine one of the four OCCs. In general, mod (WTRU ID, k) may determine one of the k OCCs.

The indices of the OCCs to be applied over the chunks may be determined by a rule such as cycling through the codes. As an example, assume there are 4 chunks and each chunk has 2 PT-RS bits. Then, a WTRU may apply the following codes on the four chunks in the given order: {[1 1], [1 −1], [1 1], [1 −1]} or {[1 −1], [1 1], [1 −1], [1 1]}. The index of the first code may be signaled or determined implicitly, for example by the WTRU ID.

Figure 21:
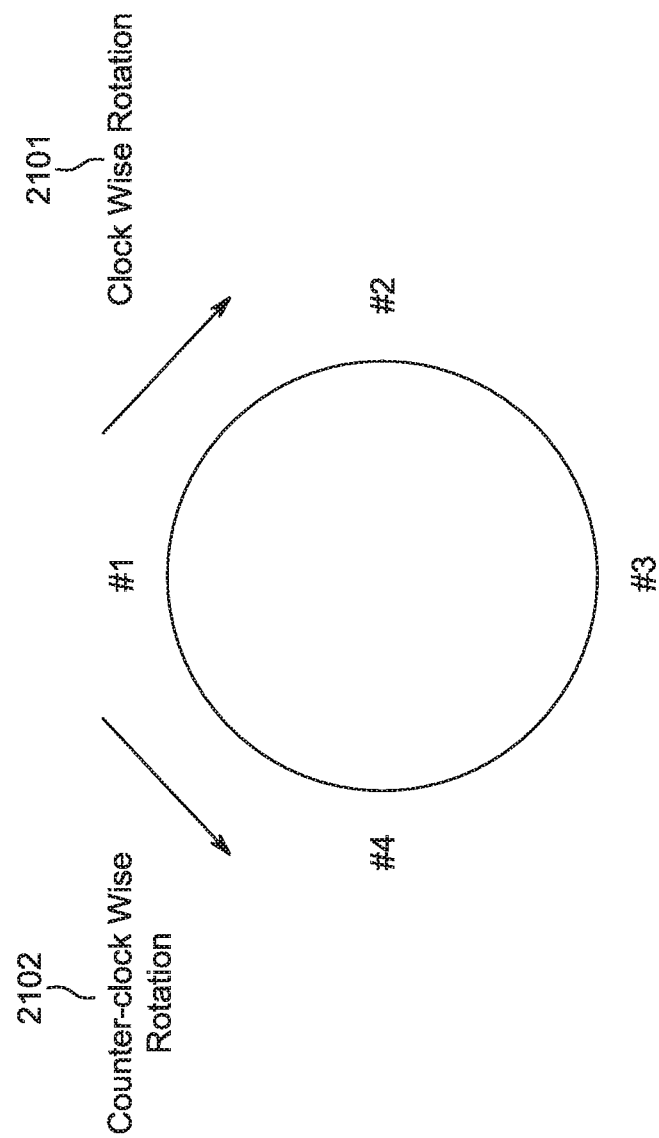
FIG. 21 is an illustration of example of cycling through OC does.

FIG. 21 illustrates an example of cycling through OCC. The cycling operation may be performed clockwise 2101 or counter clock wise 2102, where the indices of the OCCs are placed on a circle. For example, OCC #1=[1 1 1 1]; OCC #2=[1 1 −1 −1]; OCC #3=[1 −1 1 −1]; OCC #4=[1 −1 −1 1].

In one approach, OCC may be used for a reference signal sequence (e.g., within a chunk) based on the modulation order of the reference signal (e.g., PT-RS). For example, if a first modulation order (e.g., pi/2 BPSK) is used for a reference signal, OCC may not be used (e.g., OCC with all '1' entry may be used); if a second modulation order (e.g., QPSK) is used for a reference, OCC may be used and the OCC may be determined based on one or more of the following: one or more WTRU-specific parameters (e.g., WTRU-ID (e.g., C-RNTI), scrambling ID, etc.); higher layer configured parameter; layer (e.g., transmission layer); number of layers; one or more cell-specific parameters (e.g., cell-ID); and/or use of a specific OCC (e.g., all '1' entry) may be referred to as no use of OCC.

Concerning common PT-RS design for all modulation types, such as QPSK modulation, pairs of bits b(n) and b(n+1) may be mapped to complex-valued modulation symbols x according to $$x = \frac{1}{\sqrt{2}}[(1-2b(n)) + j(1-2b(n+1))]$$

Figure 22:
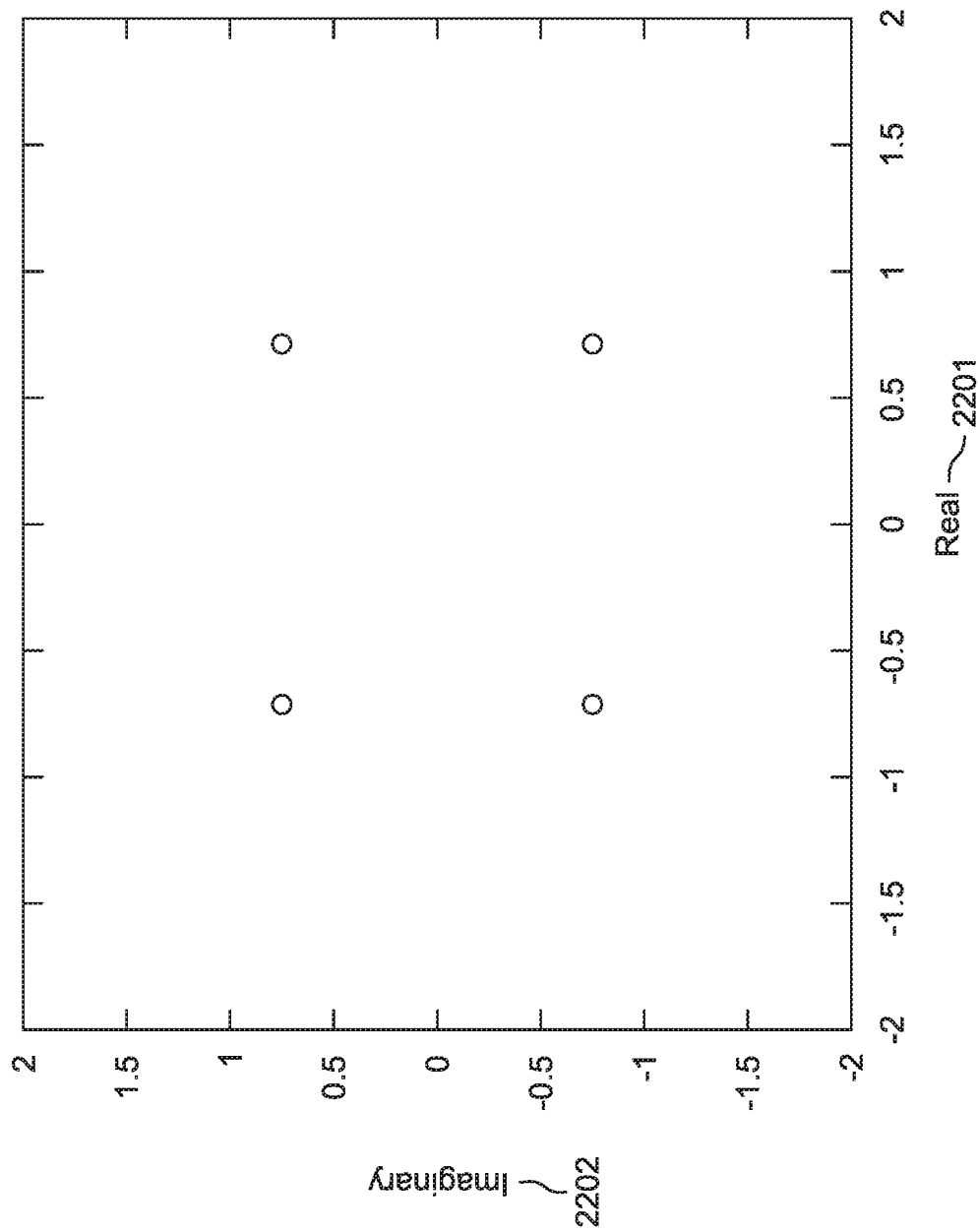
FIG. 22 is an example constellation of pi/2 BPSK and QPSK constellation.

FIG. 22 illustrates an example of pi/2BPSK and QPSK constellation. Note that both the pi/2 BPSK modulation described above and QPSK modulations may have the same constellation as shown in FIG. 22. Measured on the horizontal axis are real numbers 2201 and on the vertical axis are imaginary numbers 2202. Given that pi/2 BPSK and QPSK have the same constellation, it may be desirable to have a sequence design for PT-RS that is common for all types of data modulation including pi/2 BPSK as well as QPSK, 16QAM, and others. This way, in general, the number of bits required for PT-RS in one DFT-s-OFDM symbol may be equal to V*X (V multiplied by X) where V is the chunk size and X is the number of chunks.

Figure 23:
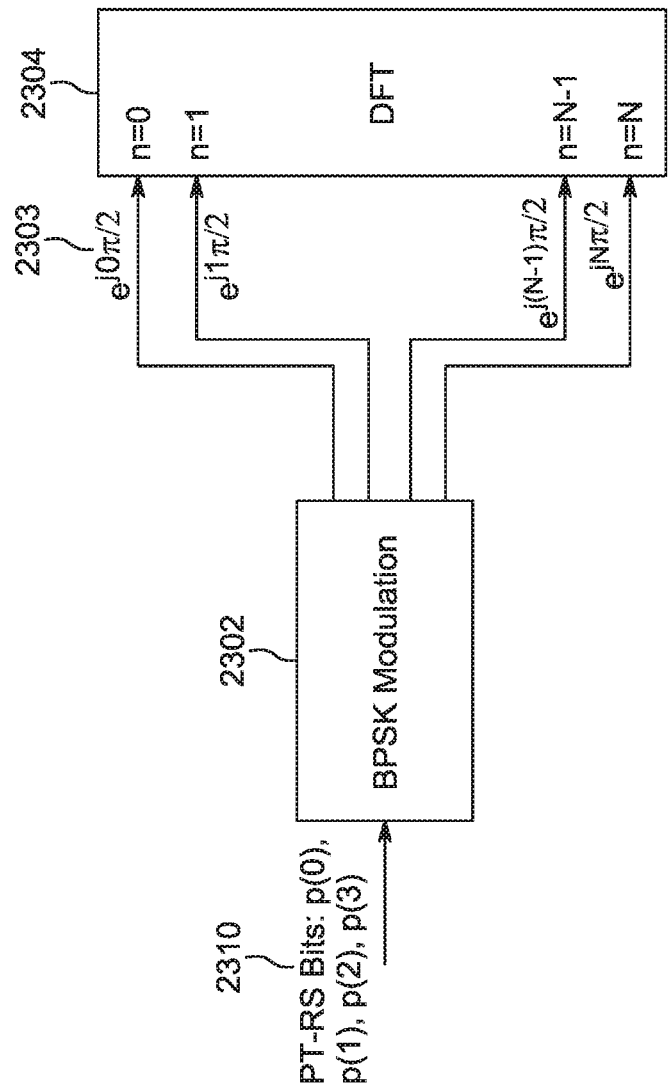
FIG. 23 is a diagram of an example of common PT-RS design.

FIG. 23 illustrates a common PT-RS design sample. For this example, PT-RS bits 2310 may have values of p(0), p(1), p(2), and p(3). Once processed through the BPSK Modulation 2302, the PT-RS sequence may be generated according to $$x(n) = e^{\frac{jn\pi}{2}} \frac{1}{\sqrt{2}}[(1-2p(i)) + j(1-2p(i))], i = 0, 1, \ldots VX-1$$

which is shown at 2303, and n is the index of the DFT 2304 input (n=0,1, . . . , N−1) in which the i'th PT-RS bit pa) will be inserted.

As an example, if the DFT size is 12 and the PT-RSs are inserted into the DFT 2304 inputs n=0,1 (Head) and n=10, 11 (Tail); then the PT-RS that will be inserted into these DFT 2304 inputs may be written as $$x(0) = e^{\frac{j0\pi}{2}} \frac{1}{\sqrt{2}}[(1-2p(0)) + j(1-2p(0))]$$

$$x(1) = e^{\frac{j1\pi}{2}} \frac{1}{\sqrt{2}}[(1-2p(1)) + j(1-2p(1))]$$

-continued $$x(10) = e^{\frac{j10\pi}{2}} \frac{1}{\sqrt{2}}[(1-2p(2)) + j(1-2p(2))]$$

$$x(11) = e^{\frac{j11\pi}{2}} \frac{1}{\sqrt{2}}[(1-2p(3)) + j(1-2p(3))]$$

Figure 24:
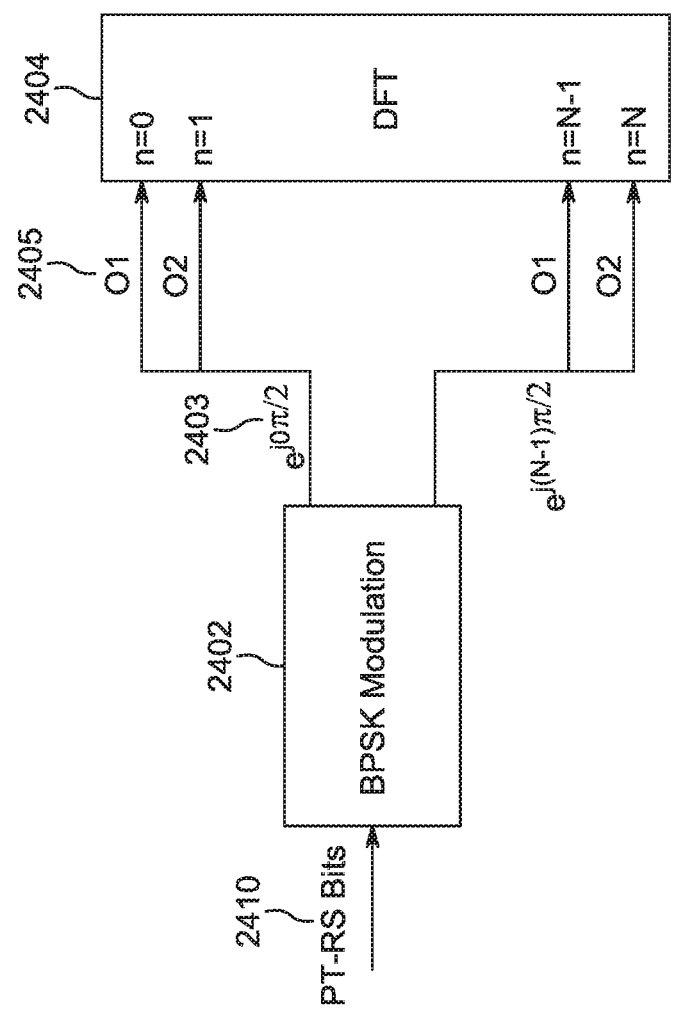
FIG. 24 is a diagram of an example OCC application.
Figure 25:
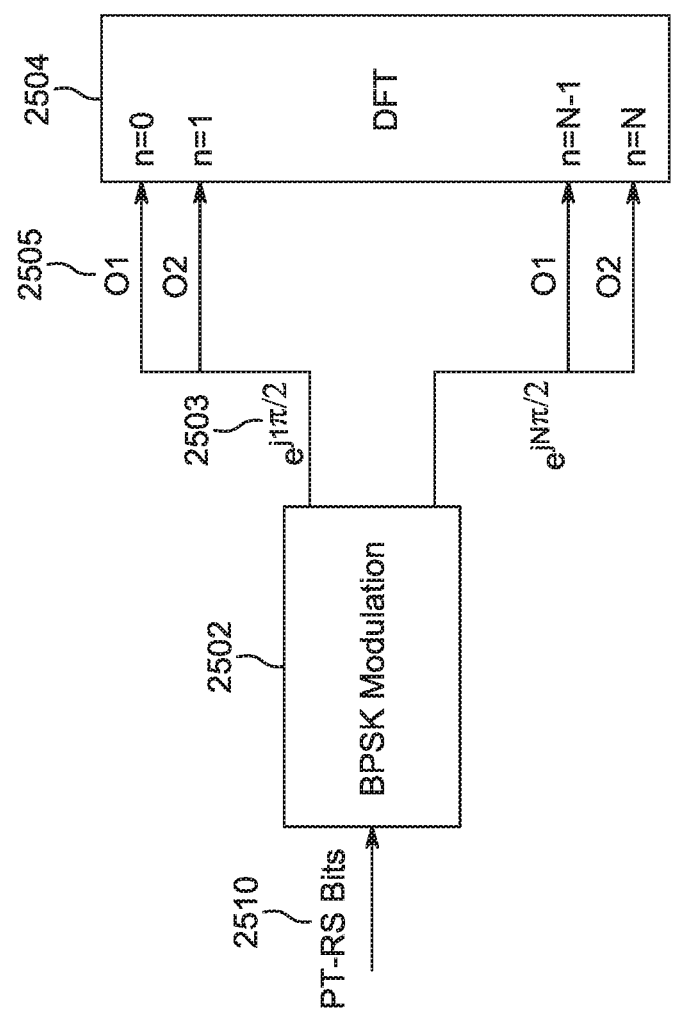
FIG. 25 is a diagram of an example OCC application.

FIG. 24 illustrates an example of OCC application to PT-RS design for the lowest n in a group, and FIG. 25 illustrates the same except with the largest n in the group. Note that as explained with regard to FIG. 21, if OCC is to be applied over the PT-RS bits in a chunk and if the modulation type for data is pi/2 BPSK, then OCC may be applied after BPSK modulation but before pi/2 modulation. The same method may also be used when the data modulation type is not pi/2 BPSK. Alternatively, when the data modulation type is not pi/2 BPSK, OCC may be applied over the pi/2 BPSK modulated PT-RS bits as shown in the example of FIG. 24. Also in FIGS. 24, O1 and O2 2405 may denote the OCC bits (e.g., [O1 O2]=[1 1]; or [1 −1]).

With OCC, the number of PT-RS bits 2410 required may be (X*V)/L where L is the length of the OCC. After these bits are BPSK modulated 2402, each bit may be repeated L times and mapped to the corresponding inputs of the DFT 2404. The example in FIG. 24 uses L=2. The bits in each L-size group may then be multiplied with the same coefficient $e^{jm\pi/2}$ 2403 where m may be determined based on the indices of the DFT 2404 inputs corresponding to the L-size group. For example, m may be the lowest n in that group as shown in FIG. 24 (i.e., $e^{jm\pi/2}$ goes to $e^{j(0)\pi/2}$ and $e^{j(N-1)\pi/2}$), or the largest n in that group as shown in FIG. 25 (i.e., $e^{jm\pi/2}$ goes to $e^{j(1)\pi/2}$ and $e^{j(N)\pi/2}$). The process described with respect to FIG. 24 may be similar to FIG. 25 but for the n value. Alternatively, m may be set to be equal to i (the PT-RS bit index, i=0, 1, . . . , (X*K)/L).

The PT-RS bits p(i) may be generated using a pseudo-random number generator, for example the Gold sequence generator used in LTE.

In one scenario, the OCC may depend on the data modulation order. For pi/2 BPSK modulation of the data bits, a default OCC vector may be applied over the PT-RS chunks (e.g., a vector of all the ones such as [1 1], or [1 1 1 1]).

Figure 26:
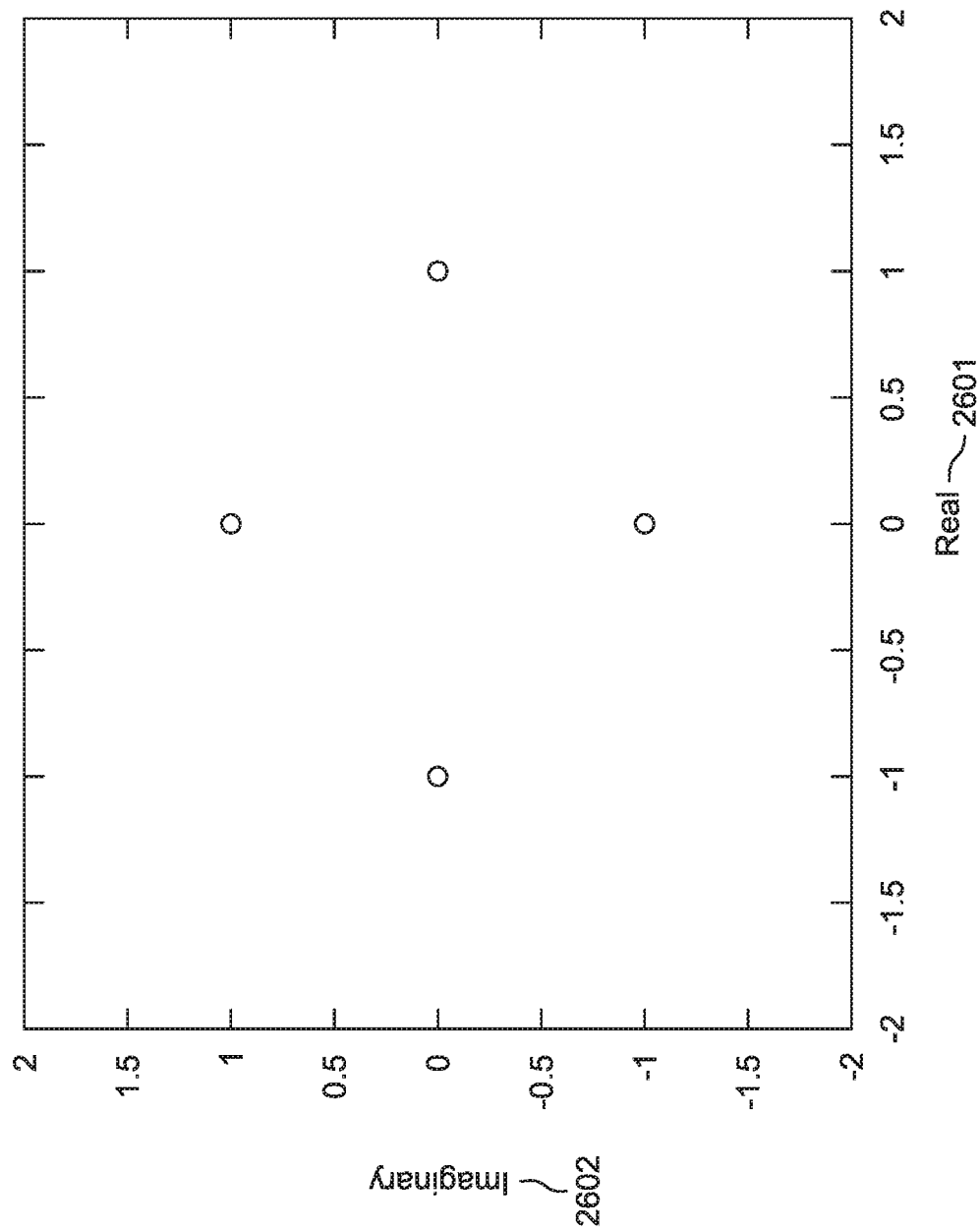
FIG. 26 is an example constellation of an alternative pi/2 BPSK constellation.

If pi/2 BPSK modulation is defined as follows $$x = e^{jn\pi/2} \frac{1}{\sqrt{2}}[2b(n)-1]$$

then, the constellation becomes as shown in the example of FIG. 26, where the horizontal axis shoes Real numbers 2601 and the vertical axis shows Imaginary numbers 2602. In such a case, pi/2 BPSK modulated PT-RS may be used when data modulation is QPSK or a higher order QAM modulation after multiplying the PT-RS symbols by e^(jπ/4) to create a constellation as shown in FIG. 26.

In another scenario a first RS sequence may be based on pi/2 BPSK and a second RS sequence may be a phase shifted version of the first RS sequence. In such a scenario, one or more of the following may apply: a first RS sequence may be used when a modulation order of its associated data channel is a first modulation order (e.g., pi/2 BPSK); and/or a phase shifted version of the first RS sequence (e.g., a second RS sequence) may be used when a modulation or its associated data channel is a second modulation order (e.g., a modulation order higher than pi/2 BPSK), where the phase shift value may be predefined, preconfigured, or determined based on constellation of pi/2 BPSK and QPSK.

In an embodiment, PT-RS for virtual CP (i.e., extended CP) in NR may be considered, where waveforms and frame structure may be standardized: CP DFT-s-OFDM and CP OFDM may be waveforms in the uplink direction; pre-DFT PT-RSs may be used for DFT-s-OFDM; and, there may be multiple numerologies that have subcarrier spacing defined as $\Delta f=2^{\mu} \cdot 15$ [kHz] which is also tabulated in Table 10 below. For different subcarrier spacing, the CP size may be based on the formula given by $$N_u^{\mu} = 2048\kappa \cdot 2^{-\mu}$$

$$N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal cyclic prefix, } l = 0 \text{ or } l = 7 \cdot 2^{\mu} \\ 144\kappa \cdot 2^{-\mu} & \text{normal cyclic prefix, } l \neq 0 \text{ and } l \neq 7 \cdot 2^{\mu} \end{cases}$$

TABLE 10

Example of Subcarrier spacing in NR

| μ | $\Delta f = 2^{\mu} \cdot 15$ [kHz] |
| --- | --- |
| 0 | 15 |
| 1 | 30 |
| 2 | 60 |
| 3 | 120 |
| 4 | 240 |
| 5 | 480 |

Based on these considerations, the CP size may reduce exponentially for larger subcarrier spacing in NR. This means that OFDM or DFT-s-OFDM symbols may be susceptible to multipath delay spread for higher subcarrier spacing and the receiver may suffer ISI for higher subcarrier spacing in certain cases (e.g., outdoor scenarios or cases with NLOS links). Existing solutions may either increase the complexity of both the transmitter and receiver (e.g., UW and CP combination, perturbation approach) or may not be compatible with the numerologies that are used for NR (i.e., dynamic method and static method for DFT-s-OFDM). For example, the static method, which inherently allows pre-DFT PT-RSs, may dictate the CP length to be $$G = N \times \frac{M_h + M_{d2} + M_t}{M}.$$

However, this may not be feasible with one or more of the possible numerologies for NR. Hence, it may be useful to consider virtual CP solutions that allow CP extensions while being compatible with possible constraints on CP sizes, such as for NR.

Figure 27:
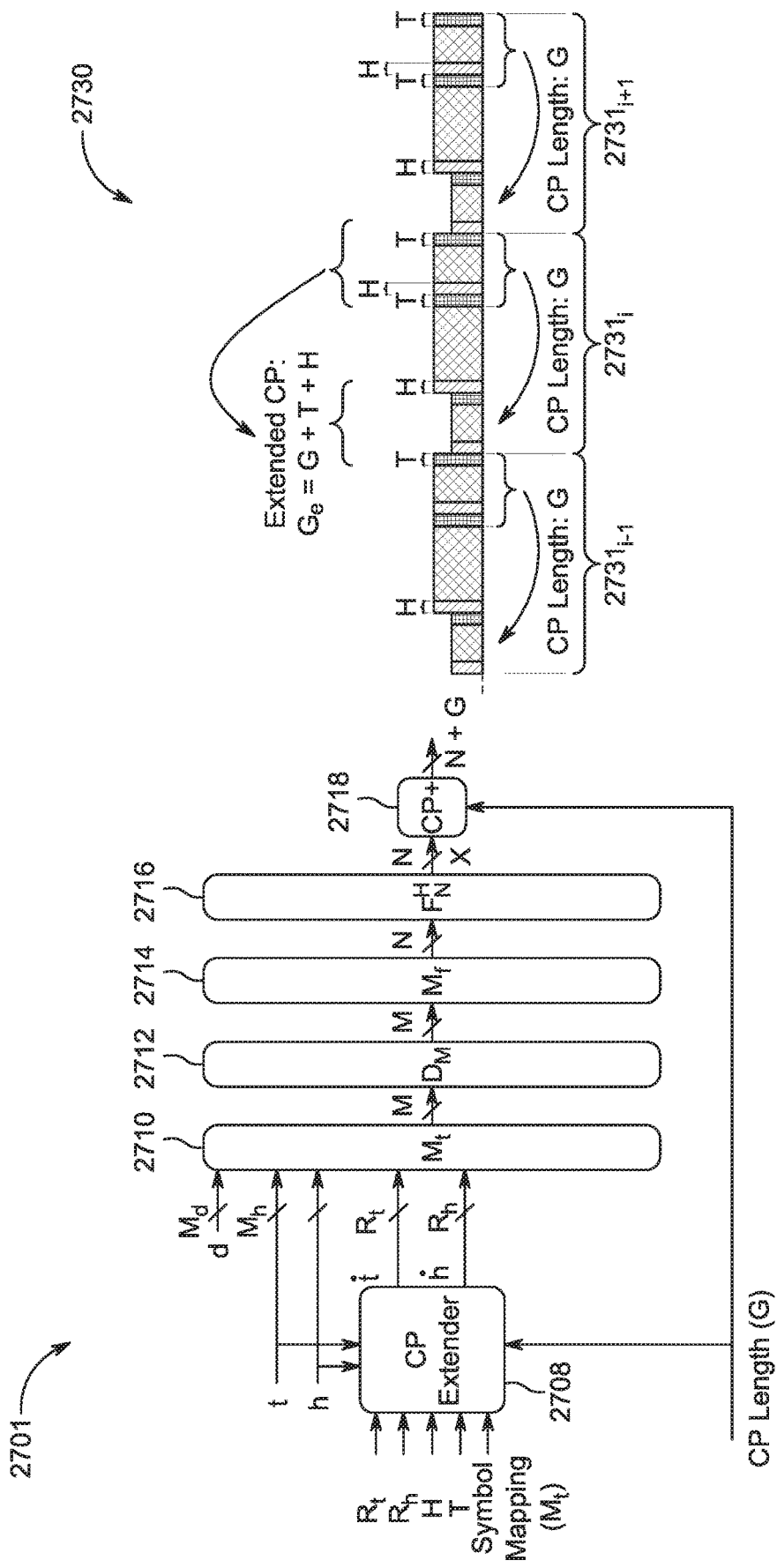
FIG. 27 is a diagram of an example generating CP extending RSs based on predetermined RSs with a CP extender block.

FIG. 27 illustrates an example approach to generating CP extending RSs based on predetermined RSs with a CP extender block. In this approach, CP extending RSs may be calculated based on other pre-determined RSs by using a CP extender block 2708 and mapping to the input of DFT-s-OFDM to extend the normal CP duration. The detailed transmitter block diagram and the corresponding time domain symbols (i.e., three DFT-s-OFDM symbols back-to-back 2731$i$-1, 2731$i$, and 2731$_{i+1}$) for this method may be seen in the example diagram shown in FIG. 27. In the TX block diagram 2701, $d \in \mathbb{C}^{M_d \times 1}$ is the data vector that contains the data symbols, $h \in \mathbb{C}^{M_h \times 1}$ and $t \in \mathbb{C}^{M_t \times 1}$ that may comprise predetermined RSs, or PT-RSs, and $\dot{h} \in \mathbb{C}^{R_h \times 1}$ and $\dot{t} \in \mathbb{C}^{R_t \times 1}$ are the vectors that may comprise the CP extending RSs generated through a CP extender block 2708. The inputs of the CP extender block may be the size of $\dot{h}$ and $\dot{t}$ (i.e., $R_h$ and $R_t$), the amount of extension in time domain (i.e., T and H), the pre-determined RSs, or PT-RSs (i.e., h and t) the normal CP size G, and/or the symbol mapping matrix $M_t \in \mathbb{C}^{M \times M}$, which maps the vectors d, h, t, $\dot{h}$, and $\dot{t}$ to the inputs of M-point DFT matrix $D_M$.

Looking at the FIG. 27, the CP extender block 2708 may generate the vector $\dot{h}$ and $\dot{t}$ based on a minimization criterion to achieve virtual CP. Since the CP extender block 2708 works on fixed values in this approach, the output of the CP extender block 270 may be calculated offline and may be stored in a memory in the transmitter (not shown). After $\dot{h}$ and $\dot{t}$ are generated, d, h, t, $\dot{h}$, and $\dot{t}$ may be mapped to the input of M-DFT via symbol mapping matrix $M_t$ 2710. Then, the M-DFT of the mapped vectors d, h, t, $\dot{h}$, and $\dot{t}$ may be calculated. In the following steps, $D_M$ 2712 results in output of DFT of size M (M-DFT), which may be mapped to the subcarriers via frequency domain mapping matrix denoted by $M_f \in \mathbb{C}^{N \times M}$ 2714 and the N-IDFT of the mapped output of M-DFT may be calculated by an IDFT matrix $F_N^H \in \mathbb{C}^{N \times N}$ 2716, which gives the time domain signal vector $x \in \mathbb{C}^{N \times 1}$. Then, the last G samples of x prepends to the signal vector x and the resulting vector may be transmitted resulting in the time domain signal diagram 2730.

The overall operation that generates the vector x may be expressed as $$X = F_N^H M_f D_M M_t \begin{bmatrix} 0 \\ t \\ h \\ \dot{t} \\ \dot{h} \end{bmatrix} = A \begin{bmatrix} 0 \\ t \\ h \\ \dot{t} \\ \dot{h} \end{bmatrix}$$

where $A = F_N^H M_f D_M M_t \in \mathbb{C}^{N \times M}$ is the waveform matrix that generates the vector x from the vector d, h, t, $\dot{h}$, and $\dot{t}$.

Figure 28:
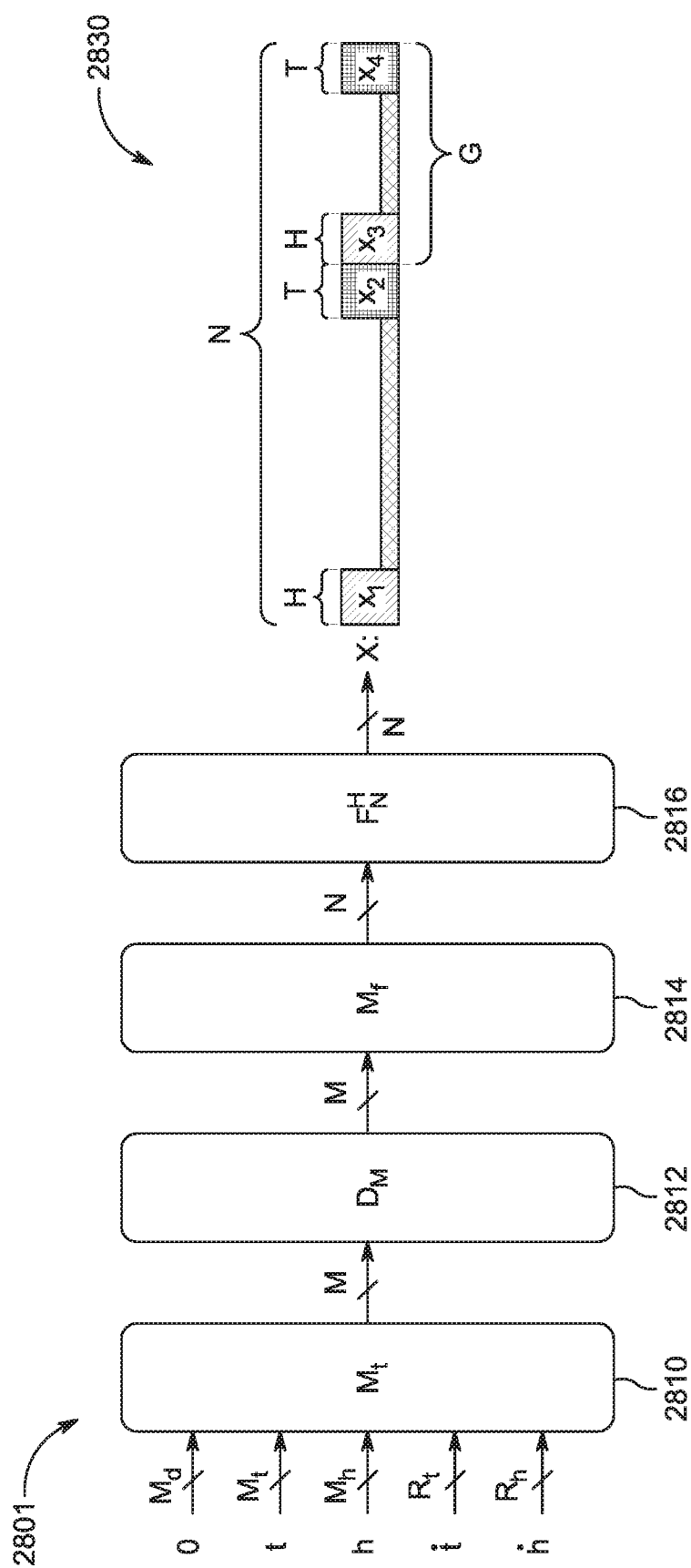
FIG. 28 is a diagram of an example signal structure to achieve virtual CP with the CP extender block.

FIG. 28 illustrates an example of a signal structure designed to achieve virtual CP with the CP extender block. For the sake of explanation, the derivation of the CP extended portion may be based on pre-determined RSs (e.g., PT-RS). The signal structure with the CP portion G may be utilized for the sake of achieving the virtual CP shown when a data vector $M_d$ is set to a zero vector. For a given CP length G, h, t, and mapping matrix $M_t$, a CP extender block may generate $\dot{h}$ and $\dot{t}$ such that the last T samples (denoted by $x_1$) and first H samples (denoted by $x_4$) of the vector x shown in the signal diagram 2830 are approximately equal to T samples until $(N-G+1)^{th}$ sample of x (denoted by $x_2$) and H samples from $(N-G+1)^{th}$ sample of x (denoted by $x_3$), respectively, where $x_1 \approx x_3$ and $x_2 \approx x_4$. The CP may be extended virtually by manipulating the values $\dot{h}$ and $\dot{t}$. To achieve this goal, one may partition the waveform matrix A.

Figure 29:
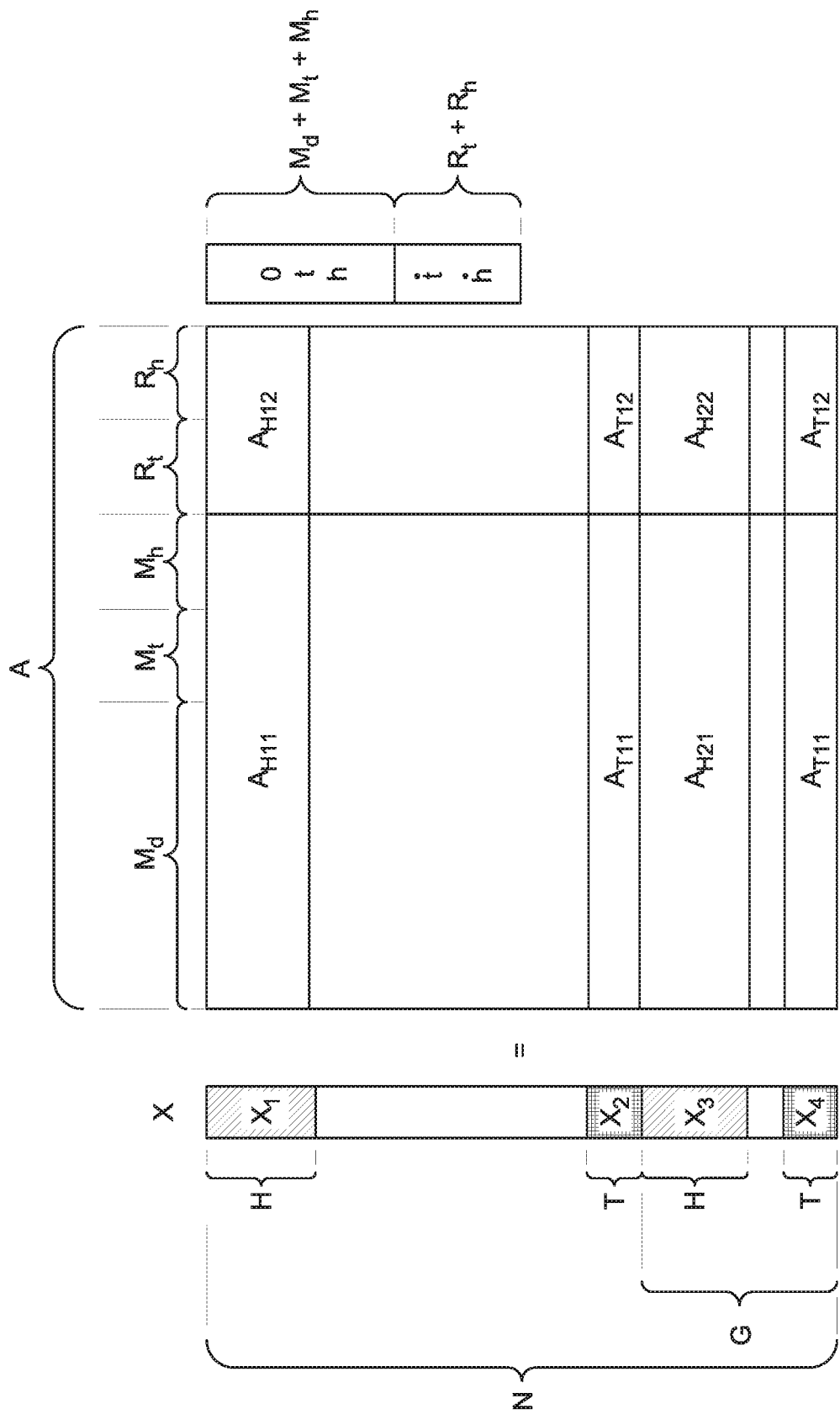
FIG. 29 is a diagram of an example partitions of a waveform matrix to derive CP extender block.

FIG. 29 illustrates an example of partitions of the waveform matrix A to derive CP a extender block. FIG. 29 may be read in the context of the variables as discussed herein, such as with relation to FIGS. 27 and 28. The submatrices may be defined as $A_{H11} = A(1:H, [1:M_d+M_t+M_h])$ $A_{H12} = A(1:H, M_d+M_t+M_h+[1:M])$ $A_{H21} = A(N-G+[1:H], [1:M_d+M_t+M_h])$ $A_{H22} = A(N-G+[1:H], M_d+M_t+M_h+[1:M])$ $A_{T11} = A(N-G-T+[1:T], [1:M_d+M_t+M_h])$ $A_{T12} = A(N-G-T+[1:T], M_d+M_t+M_h+[1:M])$ $A_{T21} = A(N-T+[1:T], [1:M_d+M_t+M_h])$ $A_{T22} = A(N-T+[1:T], M_d+M_t+M_h+[1:M])$ where $A(X+[A_1: A_2], Y+[B_1: B_2])$ gives the submatrix in A from the rows from $X+A_1$ to $X+A_2$ and the columns from $Y+B_1$ to $Y+B_2$.

By using the submatrices noted above, vectors $x_1$, $x_2$, $x_3$, and $x_4$ may be expressed as $$x_1 = A_{H11}\begin{bmatrix} 0 \\ t \\ h \end{bmatrix} + A_{H12}\begin{bmatrix} i \\ h \end{bmatrix},$$

$$x_2 = A_{T11}\begin{bmatrix} 0 \\ t \\ h \end{bmatrix} + A_{T12}\begin{bmatrix} i \\ h \end{bmatrix},$$

$$x_3 = A_{H21}\begin{bmatrix} 0 \\ t \\ h \end{bmatrix} + A_{H22}\begin{bmatrix} i \\ h \end{bmatrix},$$

and $$x_4 = A_{T21}\begin{bmatrix} 0 \\ t \\ h \end{bmatrix} + A_{T22}\begin{bmatrix} i \\ h \end{bmatrix},$$

respectively. Since an objective may be that $x_1 \cong x_3$ and $x_2 \cong x_4$, by reordering the submatrices, the objective function in the CP extender block may be written as $$\begin{bmatrix} i \\ h \end{bmatrix} = \underset{\begin{bmatrix} i \\ h \end{bmatrix}}{\operatorname{argmin}} \left\| \begin{bmatrix} A_{H22} - A_{H12} \\ A_{T22} - A_{T12} \end{bmatrix} \begin{bmatrix} i \\ h \end{bmatrix} - \begin{bmatrix} A_{H11} - A_{H21} \\ A_{T11} - A_{T21} \end{bmatrix} \begin{bmatrix} 0 \\ t \\ h \end{bmatrix} \right\|_2^2$$

Subject to $$\left\| \begin{bmatrix} i \\ h \end{bmatrix} \right\|_2^2 \leq \alpha$$

where $\alpha$ is non-negative value that constraints the energy of the CP extending RSs. An equivalent approach for a given $\alpha$ may be obtained in closed-form in formula (1) below $$\begin{bmatrix} i \\ h \end{bmatrix} = \underbrace{(X^H X + \lambda I_{R_t + R_h})^{-1} X^H \begin{bmatrix} A_{H11} - A_{H21} \\ A_{T11} - A_{T21} \end{bmatrix} \begin{bmatrix} 0 \\ t \\ h \end{bmatrix}}_{\text{Operation in the CP extender block}} \quad \text{Equation (1)}$$

where $\lambda$ is an non-negative internal parameter of the CP extender block.

Figure 30:
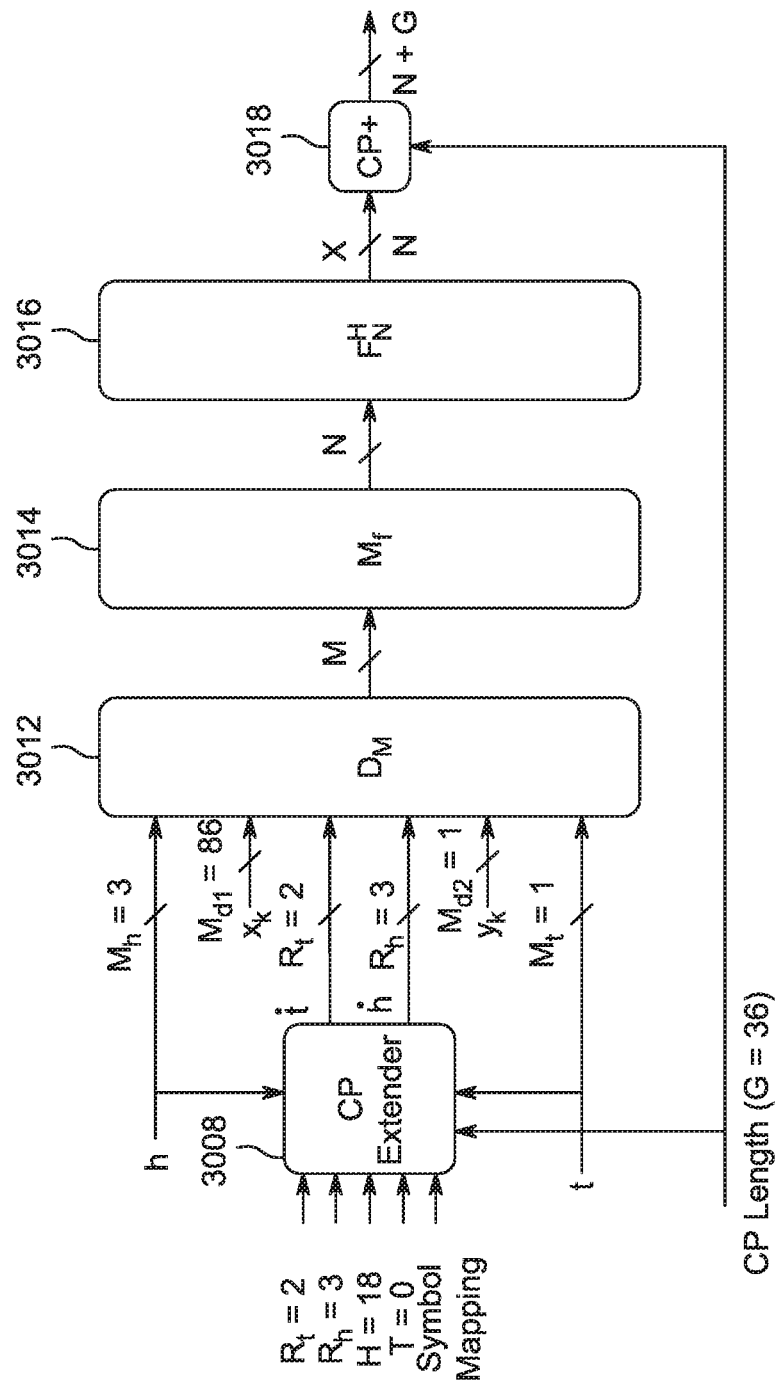
FIG. 30 is a transmission diagram of an example NR numerology with virtual CP.

FIG. 30 illustrates an example transmission (TX) block diagram with hypothetical values for the purposes of further explaining the CP extender block related concepts. FIG. 30 may be read in the context of the variables and processes discussed herein, such as with relation to FIGS. 27, 28, and 29.

Figure 31:
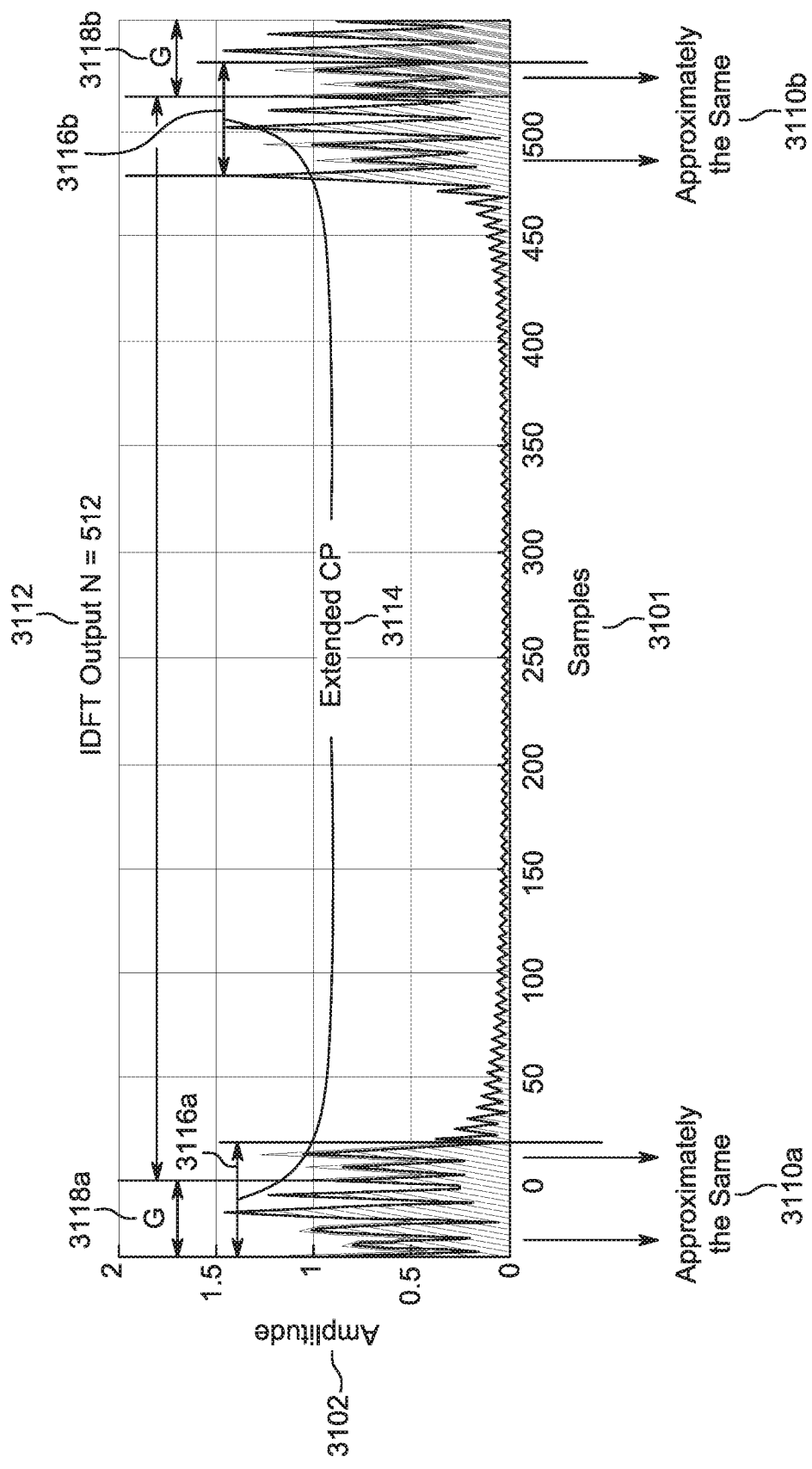
FIG. 31 is a signal diagram of an example NR numerology with virtual CP.

FIG. 31 illustrates an example signal that would result from the hypothetical values of the transmission block illustrated in FIG. 30. FIG. 31 may be read in the context of the variables and processes discussed herein, such as with relation to FIGS. 27, 28, 29, and 30.

Referring to FIG. 30, let M=96 (i.e., 6 RBs since there may be 96 subcarriers in NR), N=512, G=36, and the CP size extended as $G_e$=G+18=54, e.g., H=18 and T=0, samples to increase the robustness of the DFT-s-OFDM symbol against multipath channel interference. For this example, it may be assumed that the independent RS lengths are given by $M_h$=1 and $M_t$=1 and their values are set to 1 ($M_h$ should be larger than $M_h \geq G/N \times M$ to avoid the leakage from data symbols). For the mapping, it may be assumed that $M_{d1}$=86 and $M_{d2}$=1. The size of the depended RS may be set as $R_h$=3 and $R_t$=2. Internal $\lambda$ may be set to 0.0001. Given these parameters, referring to FIG. 31, a resulting signal in time domain may be shown where amplitude is shown on the vertical axis 3102 and the Samples are shown on the horizontal axis 3101. With these settings, the CP extender block generates the following CP extending RSs:

$$\begin{bmatrix} i \\ h \end{bmatrix} = \begin{bmatrix} 1.1741 - 0.9584i \\ 0.5476 - 0.4950i \\ 0.2776 - 0.2631i \\ -0.4799 + 0.4480i \\ -1.4476 + 0.6442 \end{bmatrix}.$$

As may be seen from the time domain signal, extended CP portions 3114 may be approximately the same looking at 3110a and 3110b. Hence, this example shows that the robustness of DFT-s-OFDM against multipath channel may be improved with the approaches disclosed herein.

Figure 32:
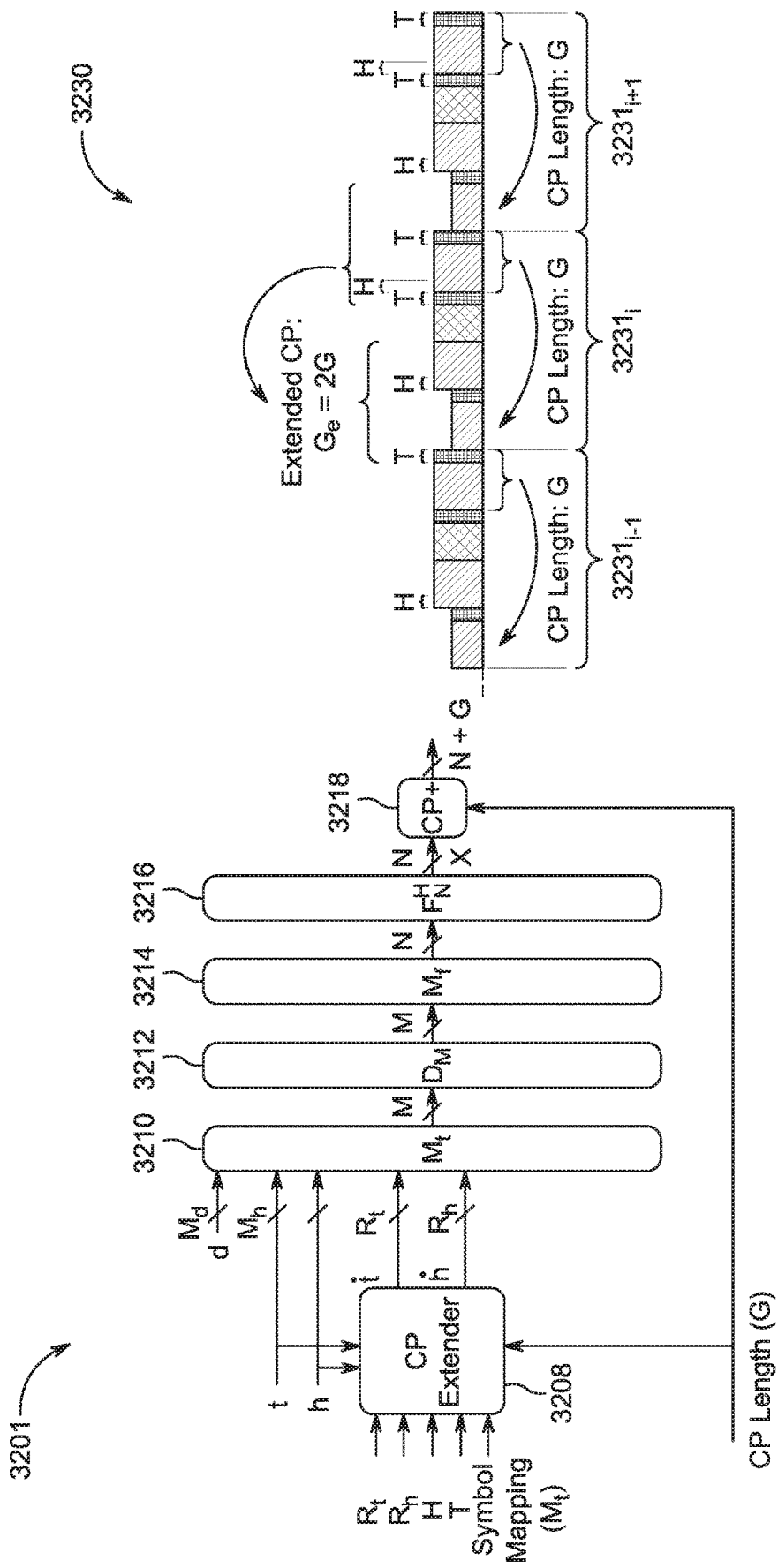
FIG. 32 is a diagram of an example doubling CP extension with CP-extending RSs.

FIG. 32 illustrates an example of doubling CP extensions with CP-extending RSs. For this example, H+T may be equal to G. In order to decrease the error in equation (1), the symbol mapping matrix $M_t$ may be optimized. For example, the mapping matrix $M_t$ may interface CP extending RSs and pre-determined RSs.

Figure 33:
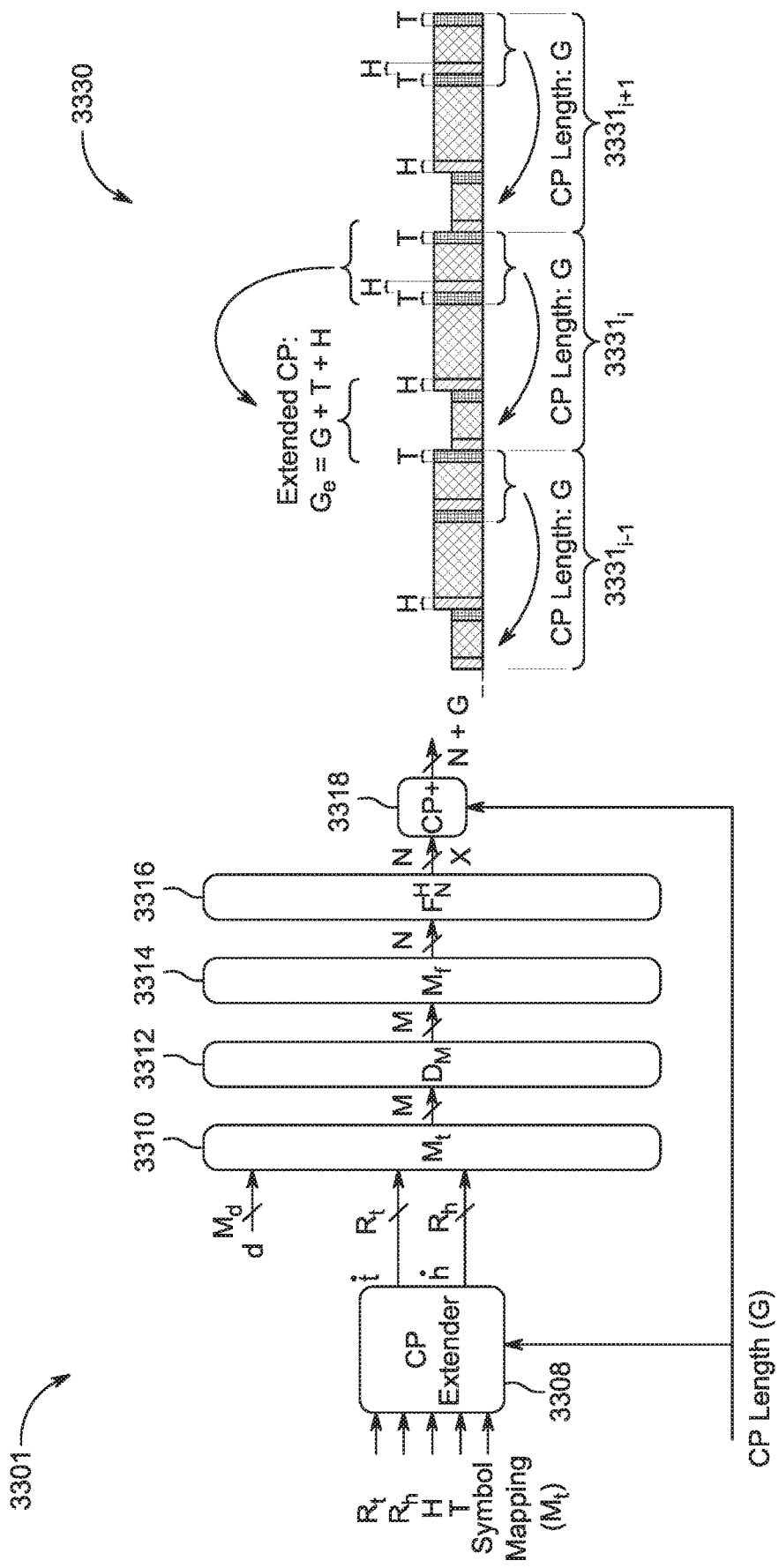
FIG. 33 is a diagram of an example CP extending PT-RS design.

FIG. 33 illustrates an example of CP extending PT-RS design. In an embodiment, all RS or PT-RSs with an energy constraint may be calculated by using a CP extender block 3308 and mapped to the input of DFT-s-OFDM. As shown, there may be a detailed transmitter block diagram 3301 and a corresponding time domain symbols 3330 (i.e., three DFT-s-OFDM symbols back-to-back $3331_{i-1}$, $3331_i$, and $3331_{i+1}$). The CP extender block 3308 may generate the vector $\hat{h}$ and $\hat{t}$ based on a minimization criterion to achieve virtual CP. The output of the CP extender block may be calculated offline and may be stored in a memory in the transmitter. After $\hat{h}$ and $\hat{t}$ are generated, d, $\hat{h}$, and $\hat{t}$ may be mapped to the input of M-DFT via symbol mapping matrix $M_t$. The overall operation that generates the vector x may be expressed as $$X = F_N^H M_f D_M M_t \begin{bmatrix} d \\ i \\ h \end{bmatrix} = A \begin{bmatrix} d \\ i \\ h \end{bmatrix}$$

where $A = F_N^H M_f D_M M_t \in \mathbb{C}^{N \times M}$ is the waveform matrix that generates the vector x from the vector d, $\hat{h}$, and $\hat{t}$.

Figure 34:
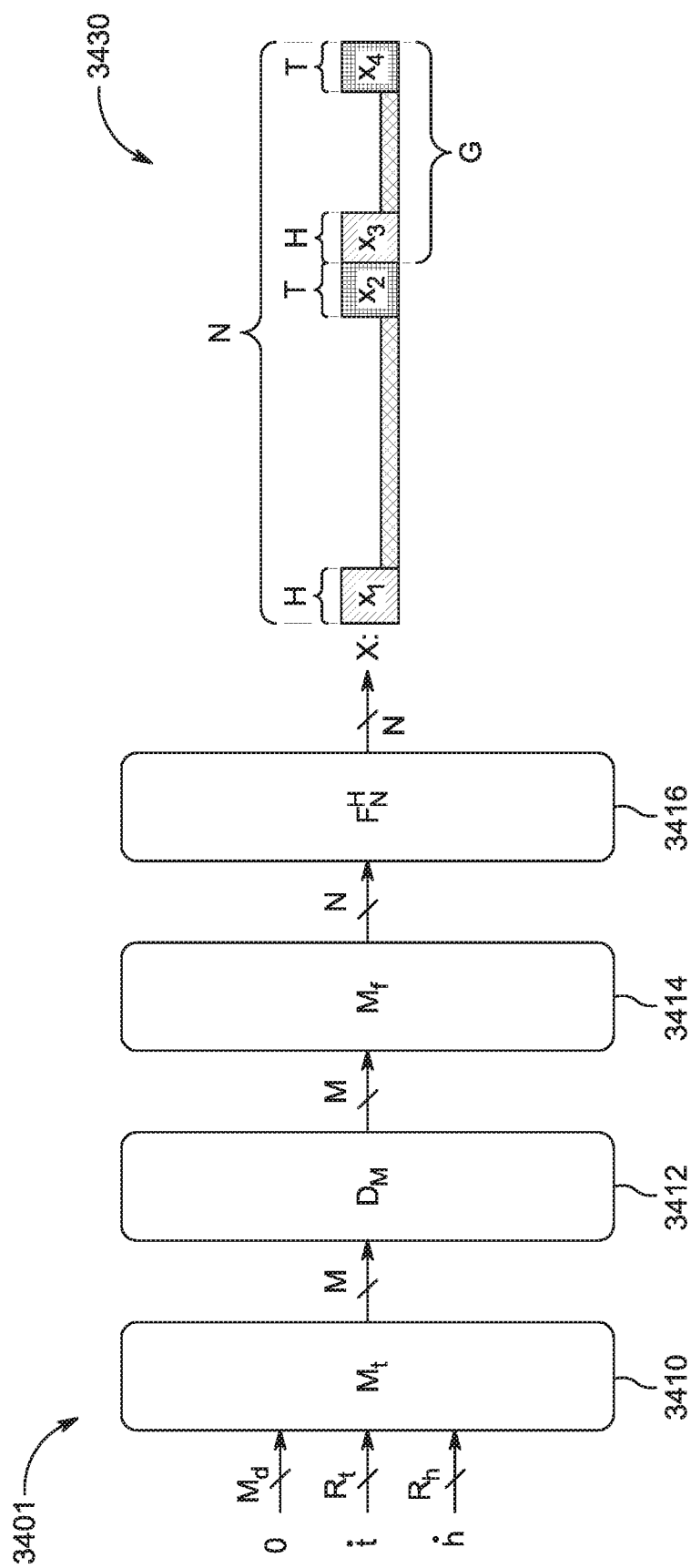
FIG. 34 is a diagram of an example signal structure for virtual CP with CP extender block.

FIG. 34 illustrates an example of a signal structure to achieve virtual CP with the CP extender block. The signal structure 3430 with the CP extension portion for achieving virtual CP may be shown when the data vector $M_d$ is set to a zero vector. For a given CP length G, and mapping matrix $M_t$, the CP extender block may generate $\dot{h}$ and $\dot{t}$ such that the last T samples (denoted by $x_4$) and first H samples (denoted by $x_1$) of the vector x are approximately equal to T samples till $(N-G+1)^{th}$ sample of x (denoted by $x_2$) and H samples from $(N-G+1)^{th}$ sample of x (denoted by $x_3$), respectively, i.e., $x_1 \cong x_3$ and $x_2 \cong x_4$. The CP may be extended virtually by manipulating the values $\dot{h}$ and $\dot{t}$. To achieve this goal, one may partition the waveform matrix A.

Figure 35:
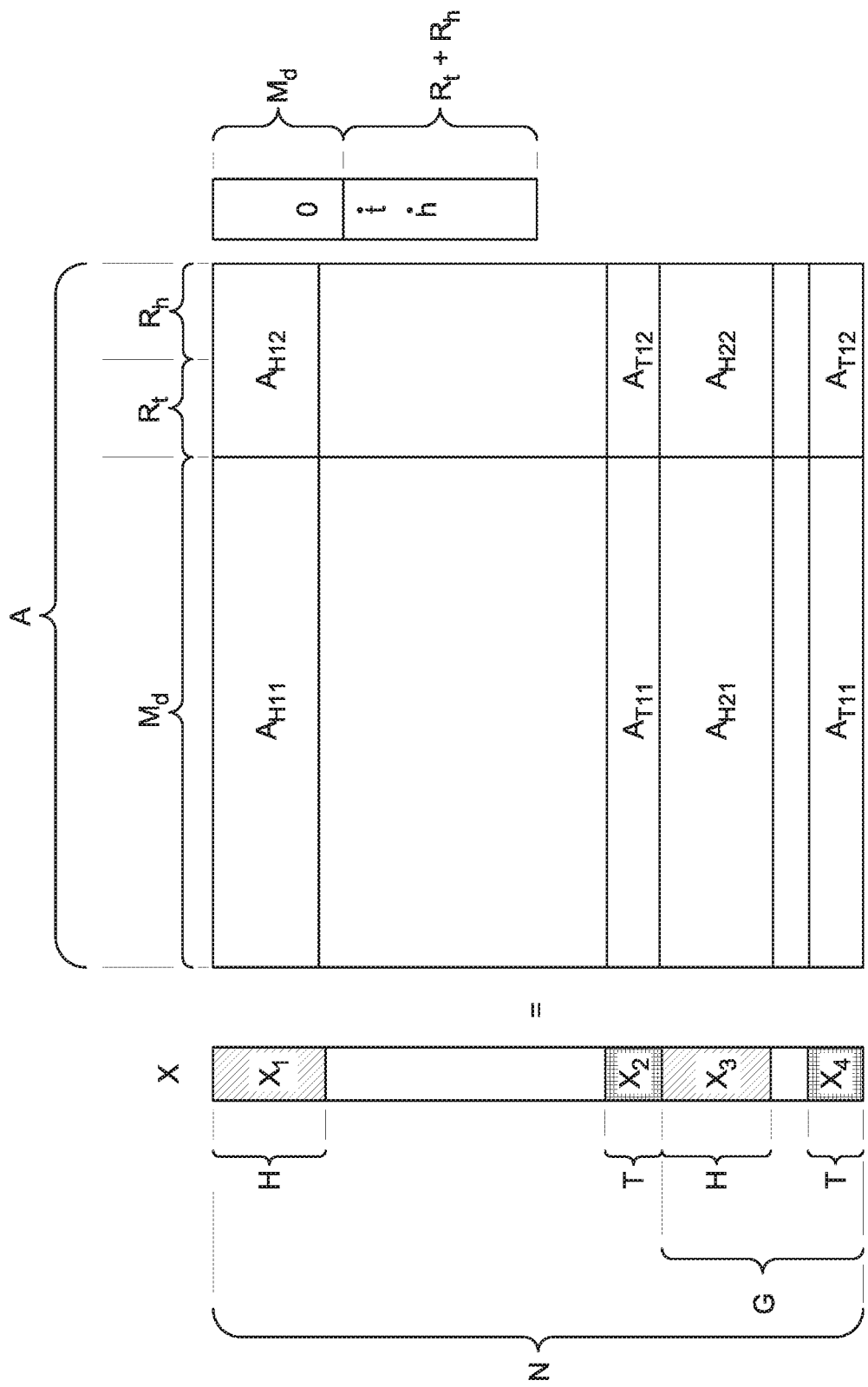
FIG. 35 is a diagram of an example of the partitions of a waveform matrix to derive CP extender block for complete PT-RS.

FIG. 35 illustrates waveform matrix A to derive CP extender block for complete PT-RS. The submatrices may be defined as $A_{H11} = A(1:H, [1: M_d])$
$A_{H12} = A(1:H, M_d + [1:M])$
$A_{H21} = A(N-G+[1: H], [1: M_d])$
$A_{H22} = A(N-G+[1: H], M_d + [1: M])$
$A_{T11} = A(N-G-T+[1:T], [1: M_d])$
$A_{T12} = A(N-G-T+[1: T], M_d + M_t + M_h + [1: M])$
$A_{T21} = A(N-T+[1:T], [1:M_d])$
$A_{T22} = A(N-T+[1: T], M_d + [1: M])$ where $A(X+[A_1: A_2], Y+[B_1: B_2])$ gives the submatrix in A from the rows from $X+A_1$ to $X+A_2$ and the columns from $Y+B_1$ to $Y+B_2$.

By using the submatrices noted above, vectors $x_1$, $x_2$, $x_3$, and $x_4$ may be expressed as $$x_1 = A_{H12} \begin{bmatrix} \dot{t} \\ \dot{h} \end{bmatrix},$$

$$x_2 = A_{T12} \begin{bmatrix} \dot{t} \\ \dot{h} \end{bmatrix},$$

$$x_3 = A_{H22} \begin{bmatrix} \dot{t} \\ \dot{h} \end{bmatrix},$$

and $$x_4 = A_{T22} \begin{bmatrix} \dot{t} \\ \dot{h} \end{bmatrix},$$

respectively. Since one objective may be that $x_1 \cong x_3$ and $x_2 \cong x_4$, by reordering the submatrices, the operation in CP extender block may be written as $$\begin{bmatrix} \dot{t} \\ \dot{h} \end{bmatrix} = \underset{\begin{bmatrix} \dot{t} \\ \dot{h} \end{bmatrix}}{\operatorname{argmin}} \left\| \begin{bmatrix} A_{H22} - A_{H12} \\ A_{T22} - A_{T12} \end{bmatrix} \begin{bmatrix} \dot{t} \\ \dot{h} \end{bmatrix} \right\|_2^2$$

s.t.

$$\left\| \begin{bmatrix} \dot{t} \\ \dot{h} \end{bmatrix} \right\|_2^2 \geq \alpha$$

where $\alpha$ is non-negative value that avoids of a trivial solution. This may be addressed by using any convex optimization toolbox since the problem is convex.

In another approach, another constraint may be introduced to quantize the values for the elements $\dot{t}$ and $\dot{h}$.

In an embodiment, a PT-RS may be used for or with a sidelink transmission or sidelink channel. A sidelink channel may be a channel used between WTRUs.

PT-RS is a non-limiting example of an RS that may be used. In the embodiments and examples described herein, another RS such as a DM-RS may be substituted for PT-RS and still be consistent with this disclosure. For example, the solutions used to determine presence, density, and/or location of PT-RS may be applicable to determine those of another RS such as DM-RS for a channel such as a sidelink channel.

A sidelink channel or transmission is a non-limiting example of a channel or transmission that may be used for communication between WTRUs that may be of the same or different type. For example, a backhaul channel or transmission may be substituted for a sidelink channel or transmission in the examples and embodiments described herein and still be consistent with this disclosure. A backhaul channel or transmission may be between gNBs, a relay and a gNB (e.g., a donor gNB), an integrated access-backhaul (IAB) node, a gNB, IAB nodes, and/or the like.

In one approach, a PSCCH and a PSSCH may use a same structure (e.g., DM-RS RE locations and data RE locations within a RB or scheduled RBs). A sidelink transmission may include a PSCCH and its associated PSSCH, where the PSCCH may provide scheduling information for the PSSCH.

The presence (e.g., transmission) of PT-RS in a PSCCH may be determined based on the presence of PT-RS in a PSSCH. For example, PT-RS may be present (e.g., transmitted) in a PSCCH when PT-RS is present in the associated PSSCH (e.g., the PSSCH scheduled by the PSCCH).

The presence of PT-RS in a PSCCH may be determined based on the presence of PT-RS in the associated PSSCH and the time location of the associated PSCCH. For example, if a PSCCH and its associated PSSCH (e.g., scheduled PSSCH by the PSCCH) are located in the same slot, or a same time location, and the associated PSSCH include a PT-RS, the PSSCH may include the PT-RS. If a PSCCH and its associated PSSCH are located in a different slot, or a different time location, the PSCCH may not include a PT-RS.

The presence of PT-RS in a PSSCH may be determined based on at least one of the following: a frequency range (e.g., FR1, FR2) of a carrier or bandwidth part for a sidelink transmission (e.g., for the PSSCH); a subcarrier spacing of the carrier or BWP for the PSSCH transmission or a subcarrier spacing that may be used for the PSSCH transmission; an MCS level and/or scheduling bandwidth indicated or used for the PSSCH; Doppler frequency (or relative speed between two WTRUs); and/or a higher layer configuration.

The density of PT-RS (e.g., time and/or frequency density) for a PSCCH may be determined based on the density of PT-RS for the associated PSSCH. Additionally/alternatively, the density of PT-RS for the PSCCH may be the same as the density of the PT-RS for the associated PSSCH. Additionally/alternatively, the density of PT-RS for the associated PSSCH may be determined based on a higher layer configuration. Additionally/alternatively, the density of PT-RS for the associated PSSCH may be determined based on the distance, or proximity, between two WTRUs, wherein the WTRUs may be informed about the distance information, or proximity information, from the gNB which may grant the sidelink resource. Additionally/alternatively, the density of PT-RS for the associated PSSCH may be determined based on one or more scheduling parameters (e.g., MCS level, scheduling bandwidth).

The one or more scheduling parameters for a PSSCH which may determine PT-RS density of PSSCH and/or PSCCH may be configured (e.g., preconfigured) or indicated before a WTRU sends a PSCCH. For example, a PDCCH (e.g., a PDCCH that grants one or more sidelink resources) may provide or indicate one or more pieces of scheduling information for a PSSCH that may determine or may be used to determine PT-RS density for PSCCH and/or PSSCH.

One or more PSCCHs may be associated with a PSSCH, wherein a sidelink control information (SCI) that schedules a PSSCH may be split into one or more PSCCH. For example, a first subset of SCI may be transmitted in a first PSCCH and a second subset of SCI may be transmitted in a second PSCCH, and so on. The first PSCCH may include PT-RS. The density and/or location of the PT-RS of the first PSCCH may be configured or predetermined. Alternatively, the first PSCCH may not include PT-RS. Additionally/alternatively the first PSCCH may include one or more pieces of scheduling information for a PSSCH that may determine or may be used to determine PT-RS density and/or PT-RS location of the PSSCH. One or more pieces of scheduling information included in a PSCCH (e.g., the first PSCCH) may determine or be used to determine the PT-RS density and/or PT-RS location of another PSCCH, such as one or more (e.g., all) of the rest of the PSCCH(s).

The presence and/or density of PT-RS for a PSCCH may be determined or predetermined based on the PSCCH configuration. The presence and/or density of PT-RS for a PSSCH may be determined based on a scheduling parameter provided by the associated PSCCH.

In one scenario, when a PSCCH is used to schedule a PSSCH, a scheduling parameter (e.g., MCS or scheduling bandwidth) of the PSSCH may not be known, for example until after the PSCCH is received. A maximum or minimum value for a scheduling parameter (e.g., for a PSSCH) may be configured and/or used to determine the presence and/or density of the PT-RS for the PSCCH.

In an approach, a PSCCH and/or a PSSCH resource may be determined, indicated, and/or granted by a PDCCH. The presence and/or density of PT-RS for a PSCCH may be determined based on information provided by the associated PDCCH. The presence and/or density of PT-RS for a PSSCH may be determined based on the information provided by the associated PSCCH.

A PDCCH (e.g., a DCI) for a PSCCH resource allocation or grant may include one or more of the following: time/frequency location of one or more PSCCH; a number of RBs used for a PSCCH transmission; DM-RS configuration information (e.g., a DM-RS density of a PSCCH, DM-RS locations within a PSCCH, etc.); and/or, PT-RS configuration information (e.g., presence of a PT-RS, PT-RS density, PT-RS locations including RB offset and subcarrier location).

A PSCCH for a PSSCH scheduling may include one or more of following: time/frequency location of the scheduled PSSCH; a number of RBs used for the scheduled PSSCH; DM-RS configuration information (e.g., a DM-RS density of a PSSCH, DM-RS locations within a PSSCH, etc.); PT-RS configuration information (e.g., presence of a PT-RS, PT-RS density, PT-RS locations including RB offset and subcarrier location); and/or, if the PT-RS configuration information is not provided by the associated PSCCH, the PT-RS configuration may be the same as that for PSCCH.

One or more modes of operation may be used for a sidelink. In a first sidelink mode (e.g., SL-Mode-1), the resources for PSCCH and/or PSSCH may be dynamically granted by a gNB (e.g., using a PDCCH). In a second sidelink mode (e.g., SL-Mode-2), one or more resources for PSCCH and/or PSCCH may be configured (e.g., preconfigured) and a WTRU may determine and/or use one of the configured resources.

In the examples and embodiments described herein a first mode may be a mode with dynamically granted resources (e.g., SL-Mode-1) and a second mode may be a mode with WTRU selected resources from a configured pool or set (e.g., SL-Mode-2) or vice versa.

In a solution, the presence, density, and/or location of PT-RS for a sidelink channel (e.g., PSCCH and/or PSSCH) may be determined based on the sidelink mode of operation. For example, the presence of a PT-RS in a sidelink channel may be determined based on the sidelink mode of operation. PT-RS may be present in a sidelink channel in a first sidelink mode and may not be present in the sidelink channel in a second sidelink mode A density and/or location of the PT-RS for the sidelink channel may be configured (e.g., via higher layer signaling) or may be determined as described in examples herein (e.g., based on one or more transmission parameters such as a frequency range, subcarrier spacing, MCS level, scheduling bandwidth, or the like).

The means for determining (e.g., which means to use for determining) the density and/or location of the PT-RS of a sidelink channel may be determined based on a sidelink mode. A means may be an explicit means such as configuration or signaling (e.g., of the density and/or location). A means may be an implicit means such as determination based on one or more parameters (e.g., that are not explicitly the density and/or location). For example the density and/or location of the PT-RS of a sidelink channel may be configured (e.g., by higher layer signaling) for a first sidelink mode. For a second sidelink mode, the density and/or location of the PT-RS of a sidelink channel may be determined based on one or more transmission parameters such as a frequency range, subcarrier spacing, MCS level, scheduling bandwidth, and the like.

In a solution, the presence, density, and/or location of PT-RS for a sidelink channel (e.g., PSCCH and/or PSSCH) may be determined based on one or more of the following transmission parameters: a relative speed between WTRUs; a coverage level (e.g., proximity level) between WTRUs; a geographical location of a WTRU (e.g., Tx WTRU) in a cell; a number of symbols used for a sidelink channel; a frequency range; a time/frequency location or sidelink resource index or identity of a determined sidelink resource where the sidelink resource may be determined based on scheduling, configuration, and/or selection; a DM-RS density (e.g., number of symbols used for a DM-RS); and/or a search space used for the channel or an associated channel (e.g., a search space of an associated PSCCH channel when transmitting the PT-RS in or with the PSSCH).

In an example, one or more sidelink resources may be configured (e.g., preconfigured) and a (e.g., each) sidelink resource may be associated with a sidelink resource identity (e.g., SL-id). A WTRU may determine a sidelink resource for transmission or reception. A presence, density, and/or location of PT-RS for a sidelink channel (e.g., PSCCH, PSSCH) may be determined based on the determined sidelink resource identity.

The location of PT-RS may include one or more RB locations and/or one or more subcarrier locations.

In a solution, the presence, density, and/or location of PT-RS for a sidelink channel (e.g., PSCCH and/or PSSCH) may be determined based on a DM-RS density (e.g., a number of symbols used for a DM-RS). In an example, if a DM-RS density of a sidelink channel is below a threshold, a PT-RS may not present in the sidelink channel; otherwise a PT-RS may present in the sidelink channel. In another example, if a DM-RS density of a sidelink channel is below a threshold, a first PT-RS density may be used for the sidelink channel; otherwise, a second PT-RS density may be used for the sidelink channel. A DM-RS density of a sidelink channel may be indicated in the associated PDCCH for the sidelink channel resource allocation (e.g., SL-Mode-1).

In a solution, an RB offset of a PT-RS for a sidelink channel may be determined based on a WTRU identity (WTRU-id) of a transmitter WTRU or a receiver WTRU. Alternatively, an RB offset of PT-RS for a sidelink channel may be determined based on a destination identity, wherein the destination identity may be a group ID (e.g., ProSe group ID) for which the sidelink channel may be transmitted. A WTRU-id may be a RNTI (e.g., C-RNTI, SL-RNTI) assigned for a WTRU (i.e., transmitter WTRU or receiver WTRU). A WTRU-id and/or a group ID may be provided in a resource grant (e.g., from PDCCH) for a sidelink transmission.

In another solution, an RB offset of a PT-RS for a channel (e.g., a sidelink channel) may be determined based on at least one of: a scrambling code or sequence (e.g., an index or identity of the scrambling code or sequence) that may be used for transmission of the channel; a DM-RS (e.g., an index or identity of the DM-RS such as the index or identity of the DM-RS sequence) that may be transmitted with the channel; and/or a search space used for the channel or an associated channel (e.g., a search space of associated PSCCH channel when transmitting the PT-RS in or with a PSSCH).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU) the method comprising:
   receiving control information indicating a number of scheduled resource blocks (RBs);
   determining a Phase Tracking Reference Signal (PT-RS) density based on the number of scheduled RBs;
   determining a maximum RB offset value based on the PT-RS density;
   determining a RB offset value for the WTRU based on a WTRU identity (WTRU-ID) modulo the maximum RB offset value, wherein the WTRU-ID is an Radio Temporary Network Identifier (RNTI); and
   transmitting or receiving a signal with PT-RS using the RB offset value.

2. The method of claim 1, wherein the PT-RS density has a value of 2 or 4.

3. The method of claim 1, wherein the number of scheduled RBs modulo the PT-RS density is zero.

4. The method of claim 1, wherein the maximum RB offset value is based on both the number of scheduled resource blocks and the PT-RS density on a condition that the number of scheduled resource blocks modulo the PT-RS density is not zero.

5. The method of claim 1, wherein the control information is associated with the WTRU-ID.

6. The method of claim 1, wherein the RNTI is a Cell-RNTI (C-RNTI).

7. The method of claim 1, wherein the RB offset value comprises a set of numbers starting with zero.

8. The method of claim 1, wherein the PT-RS density is a number of RBs in a RB index after which a PT-RS may repeat.

9. The method of claim 1, wherein a signal with PT-RS is transmitted in a scheduled Physical Uplink Shared Channel (PUSCH) transmission or received in a scheduled Physical Downlink Shared Channel (PDSCH) transmission.

10. A wireless transmit/receive unit (WTRU), the WTRU comprising:
    a transceiver operatively connected to a processor,
       the transceiver and processor configured to receive control information indicating a number of scheduled resource blocks (RBs);
       the transceiver and processor configured to determine a Phase Tracking Reference Signal (PT-RS) density based on the number of scheduled RBs;
       the transceiver and processor configured to determine a maximum RB offset value based on both of the number of scheduled RBs and the PT-RS density;
       the transceiver and processor configured to determine a RB offset value for the WTRU based on a WTRU identity (WTRU-ID) modulo the maximum RB offset value, wherein the WTRU-ID is an Radio Temporary Network Identifier (RNTI); and
       the transceiver and processor configured to transmit or receive a signal with PT-RS using the RB offset value.

11. The apparatus of claim 10, wherein the PT-RS density has a value of 2 or 4.

12. The apparatus of claim 10, wherein the number of scheduled RBs modulo the PT-RS density is zero.

13. The apparatus of claim 10, wherein the number of scheduled resource blocks modulo the PT-RS density is not zero.

14. The apparatus of claim 10, wherein the control information is associated with the WTRU-ID.

15. The apparatus of claim 10, wherein the RNTI is a Cell-RNTI (C-RNTI).

16. The apparatus of claim 10, wherein the RB offset value comprises a set of numbers starting with zero.

17. The apparatus of claim 10, wherein the PT-RS density is a number of RBs in a RB index after which a PT-RS may repeat.

18. The apparatus of claim 10, wherein a signal with PT-RS is transmitted in a scheduled Physical Uplink Shared Channel (PUSCH) transmission or received in a scheduled Physical Downlink Shared Channel (PDSCH) transmission.

* * * * *

UNITED STATES PATENT AND TRADEMARK OFFICE
CERTIFICATE OF CORRECTION

PATENT NO. : 11,283,567 B2
APPLICATION NO. : 16/764258
DATED : March 22, 2022
INVENTOR(S) : Moon-il Lee et al.

Page 1 of 1

It is certified that error appears in the above-identified patent and that said Letters Patent is hereby corrected as shown below:

In the Claims

Please correct Column 42, Lines 45-64 as follows:

11. The WTRU of claim 10, wherein the PT-RS density has a value of 2 or 4.

12. The WTRU of claim 10, wherein the number of scheduled RBs modulo the PT-RS density is zero.

13. The WTRU of claim 10, wherein the number of scheduled resource blocks modulo the PT-RS density is not zero.

14. The WTRU of claim 10, wherein the control information is associated with the WTRU-ID.

15. The WTRU of claim 10, wherein the RNTI is a Cell-RNTI (C-RNTI).

16. The WTRU of claim 10, wherein the RB offset value comprises a set of numbers starting with zero.

17. The WTRU of claim 10, wherein the PT-RS density is a number of RBs in a RB index after which a PT-RS may repeat.

18. The WTRU of claim 10, wherein a signal with PT-RS is transmitted in a scheduled Physical Uplink Shared Channel (PUSCH) transmission or received in a scheduled Physical Downlink Shared Channel (PDSCH) transmission.

Signed and Sealed this
Twenty-eighth Day of June, 2022

Katherine Kelly Vidal
*Director of the United States Patent and Trademark Office*